(12) United States Patent
Fukuhara et al.

(10) Patent No.: US 8,873,871 B2
(45) Date of Patent: Oct. 28, 2014

(54) IMAGE PROCESSING APPARATUS AND METHOD

(75) Inventors: Takahiro Fukuhara, Kanagawa (JP); Hitoshi Kiya, Tokyo (JP)

(73) Assignees: Sony Corporation, Tokyo (JP); Tokyo Metropolitan University, Tokyo (JP)

(*) Notice: Subject to any disclaimer, the term of this patent is extended or adjusted under 35 U.S.C. 154(b) by 405 days.

(21) Appl. No.: 13/217,730

(22) Filed: Aug. 25, 2011

(65) Prior Publication Data
US 2012/0057788 A1 Mar. 8, 2012

(30) Foreign Application Priority Data

Sep. 6, 2010 (JP) ................................ 2010-199270

(51) Int. Cl.
*G06K 9/36* (2006.01)
*G06K 9/46* (2006.01)

(52) U.S. Cl.
USPC ........................................................ 382/232

(58) Field of Classification Search
USPC .................. 382/232, 233, 234, 240, 248, 251
See application file for complete search history.

(56) References Cited

U.S. PATENT DOCUMENTS

| | | | |
|---|---|---|---|
| 2003/0063810 A1* | 4/2003 | Chebil | 382/240 |
| 2007/0217695 A1* | 9/2007 | Nakamura | 382/232 |
| 2009/0097561 A1 | 4/2009 | Chiu et al. | |
| 2009/0245384 A1* | 10/2009 | Fukuhara et al. | 375/240.24 |
| 2009/0285498 A1* | 11/2009 | Sakuyama | 382/233 |
| 2010/0111432 A1* | 5/2010 | Mohr | 382/247 |
| 2010/0128786 A1* | 5/2010 | Gao et al. | 375/240.13 |

FOREIGN PATENT DOCUMENTS

| | | |
|---|---|---|
| CN | 101507284 A | 8/2009 |
| CN | 101540910 A | 9/2009 |
| CN | 101601298 A | 12/2009 |
| CN | 101729896 A | 6/2010 |
| JP | 61-067182 | 4/1986 |
| JP | 2004-531924 | 10/2004 |
| JP | 2006-262161 | 9/2006 |
| JP | 2009-100125 | 5/2009 |

OTHER PUBLICATIONS

Ward et al., "JPEG-HDR: A Backwards-Compatible, High Dynamic Range Extension to JPEG", Nov. 2005, pp. 1-8.*
Xu et al., "High-Dynamic-Range Still-Image Encoding in JPEG 2000", Dec. 2005, pp. 69-76.*
Takeshi Ito, et al., "A Study of Coding Method for High Bit Depth Image Using Bit Depth Transform", Institute of Electronics, Information, Communication Engineers General Conference, Mar. 17-20, 2009, pp. S-5 to S-6.
Martin Winken, et al., "Bit-Depth Scalable Video Coding", ICIP, 2007, pp. I-5 to I-8.
Combined Chinese Office Action and Search Report issued Dec. 4, 2013 in Patent Application No. 201110251514.0 with English Translation.

(Continued)

Primary Examiner — Phuoc Tran
(74) Attorney, Agent, or Firm — Oblon, Spivak, McClelland, Maier & Neustadt, L.L.P.

(57) ABSTRACT

There is provided an image processing apparatus which includes a division unit dividing an image into a plurality of images in a bit depth direction, and an encoding unit encoding respectively some or all of the plurality of images acquired by dividing the image in the bit depth direction by the division unit.

20 Claims, 40 Drawing Sheets

(56) References Cited

OTHER PUBLICATIONS

Japanese Office Action issued May 8, 2014 in Japanese Application No. 2010-199270, 6 pages (no English translation).

Decision of Refusal issued Jul. 28, 2014 in Japanese Patent Application No. 2010-199270 (no English translation), 3 pages.
Chinese Office Action issued Aug. 14, 2014 in Chinese Patent Application No. 201110251514.0 (with English translation).

* cited by examiner

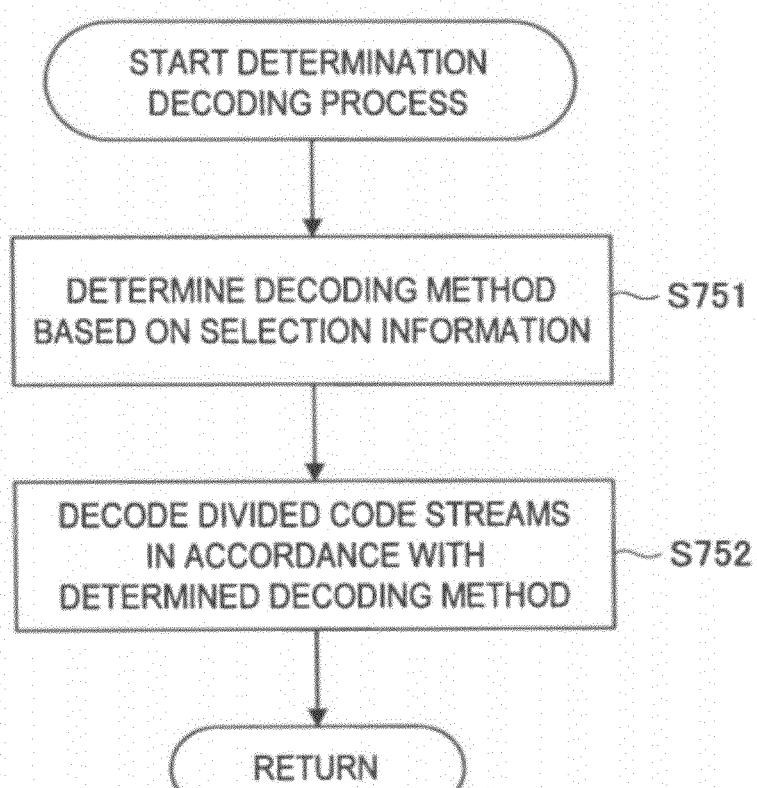

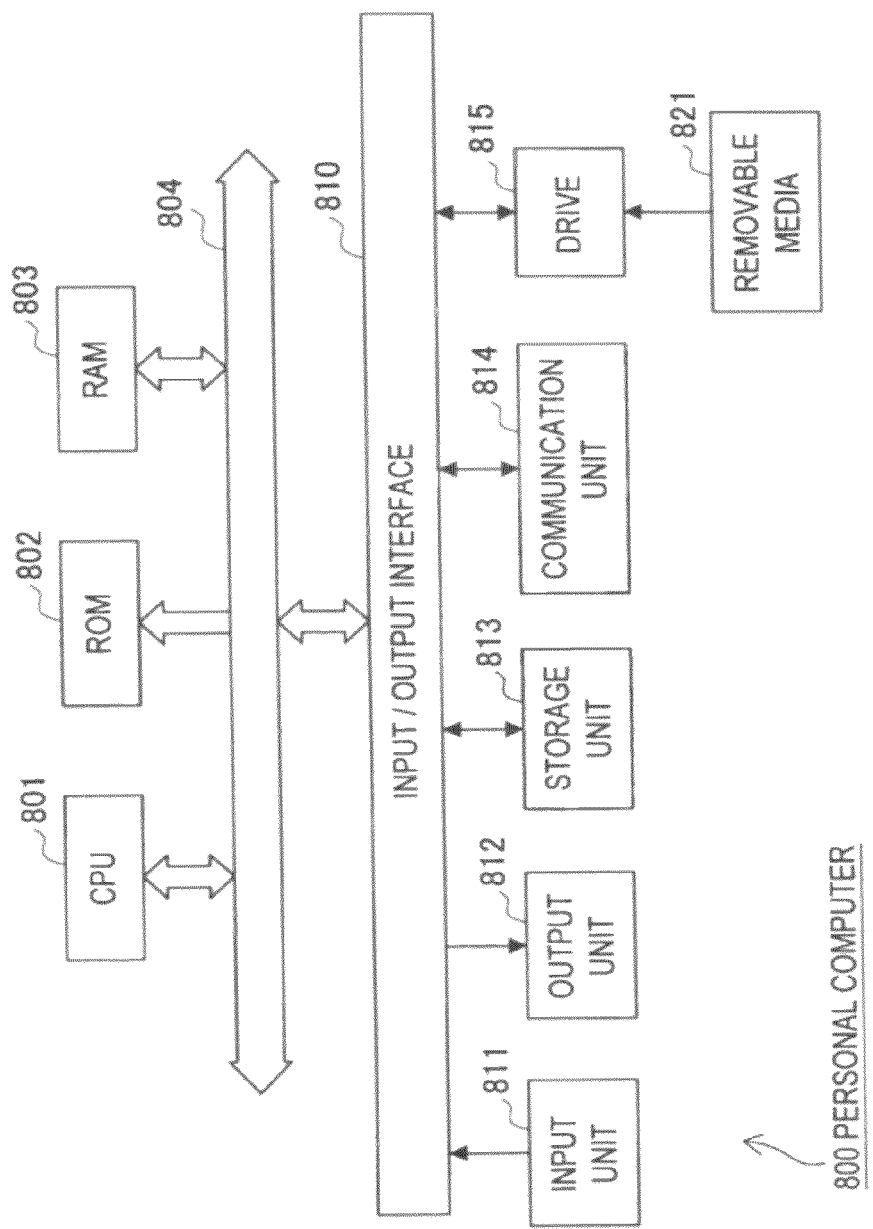

IMAGE PROCESSING APPARATUS AND METHOD

BACKGROUND

The present disclosure relates to an image processing apparatus and method, and more particularly, to an image processing apparatus and method capable of improving encoding efficiency in encoding an image.

To meet a need for the higher quality of an image, there has been an attempt to improve the resolution of an image from that of a standard image to an image for a high definition television (HDTV) and a 4 k×2 k image for a digital cinema. Further, an increase in a high bit depth of an image is in progress. For example, some imaging devices can acquire an image with a bit depth of 12 bits or more. Moreover, some liquid display devices can express gray scales of 10 bits or more.

On the other hand, image encoding schemes, such as the moving picture experts group-2 (MPEG-2) for a video and the joint photographic experts group (JPEG) for a still image, can process only an image with a bit depth of 8 bits or less. However, image encoding schemes, such as high profile of the advanced video coding (AVC) or JPEG 2000, can process an image with a bit depth of 8 bits or more.

For example, there has been suggested a method of efficiently encoding an image with a high bit depth by executing an encoding process with a two-step configuration of a bit depth conversion process and a reverse bit depth conversion process (for example, see "Preview on Encoding of High Bit Depth Image Using Bit Depth Conversion Process" by Ken Ito, Kogi Bando, Seishi Takamura, Kazoto Kamikura, Yoshiyuki Yashima, Institute of Electronics, Information, Communication Engineers General Conference s-5, 2009).

SUMMARY

However, since an encoding process has to be executed on both an image subjected to a bit conversion process and a difference image, i.e., twice, there is a concern that the encoding load may increase due to calculation processing complexity. Further, there is a concern that the quality of a decoded image may depend on the accuracy of the conversion process and the reverse conversion process described above.

In light of the foregoing, it is desirable to provide an image processing apparatus and method capable of improving encoding efficiency in an encoding process of an image.

According to an embodiment of the present disclosure, there is provided an image processing apparatus which includes a division unit dividing an image into a plurality of images in a bit depth direction, and an encoding unit encoding respectively some or all of the plurality of images acquired by dividing the image in the bit depth direction by the division unit.

The image processing apparatus may further include a division information generation unit generating division information indicating at least a division number of images divided by the division unit and division positions indicating bit positions at which the image is divided by the division unit.

The encoding unit may encode some or all of the plurality of images acquired by dividing the image in the bit depth direction by the division unit in accordance with encoding methods respectively set for the images.

The encoding unit may encode coefficient data acquired by executing, with a level number set in each image, a wavelet transform process on some or all of the plurality of images acquired by dividing the image in the bit depth direction by the division unit.

The image processing apparatus may further include a bit rate allocation unit allocating a target bit rate to an encoding process of the encoding unit on each of some or all of the plurality of images acquired by dividing the image in the bit depth direction by the division unit. The encoding unit may execute rate control in the encoding process on some or all of the plurality of images acquired by dividing the image in the bit depth direction by the division unit using the target bit rate allocated by the bit rate allocation unit.

The image processing apparatus may further include a non-zero coefficient boundary detection unit detecting a non-zero coefficient boundary, which is a boundary between a bit with a zero value continuous from a highest-order bit and a bit with a non-zero value, in a bit depth of the image. The encoding unit may not encode an image that is formed by high-order bits of the non-zero boundary detected by the non-zero coefficient boundary detection unit.

The image processing apparatus may further include a selection unit selecting whether the image is encoded or not depending on data sizes before and after the encoding process executed by the encoding unit, for each of the images divided in the bit depth direction by the division unit.

The image processing apparatus may further include a selection unit selecting an encoding method used by the encoding unit for each of the images divided in the bit depth direction by the division unit.

The image processing apparatus may further include a multiplexing unit multiplexing code streams acquired by the encoding unit encoding some or all of the plurality of images acquired by dividing the image in the bit depth direction by the division unit.

According to an embodiment of the present disclosure, there is also provided an image processing method of an image processing apparatus which includes dividing an image into a plurality of images in a bit depth direction by a division unit, and encoding respectively some or all of the plurality of images divided in the bit depth direction by an encoding unit.

According to another embodiment of the present disclosure, there is provided an image processing apparatus which includes a separation unit separating a code stream of one system, which is formed by encoding a plurality of images separated from a same image in a bit depth direction and multiplexing code streams of the encoded images, for each code stream of each of the images, and a decoding unit decoding the code stream of each of the images obtained by separating the code stream of one system by the separation unit.

The image processing apparatus may further include a structure analysis unit analyzing a structure of the code stream of one system. The separation unit may separate the code stream of one system based on the analysis result of the structure analyzed by the structure analysis unit.

The structure analysis unit may extract division information which is included in the code stream of one system and indicates at least a division number of images divided from the image in the bit depth direction and bit position at which the images are divided. The separation unit may separate the code stream of one system based on the division information extracted from the code stream of one system by the structure analysis unit.

The code stream of each image may be encoded in accordance with an encoding method set for each image. The decoding unit may decode the code stream of each image in accordance with a decoding method corresponding to the encoding method.

In the code stream of each image, coefficient data acquired through wavelet transform by a level number set for each image may be encoded. The decoding unit may decode the code stream of each image and executes reverse-wavelet transform by the level number set for each image.

The image processing apparatus may further include a zero coefficient generation unit generating a bit with a zero value which is deleted in the encoding of the code stream of each image and is continuous from a highest-order bit in the bit depth of the image.

The separation unit may separate data of one system, which is formed by multiplexing data of the respective images generated from the plurality of images acquired by dividing the same image in the bit depth direction, for the data of each image. The image processing apparatus may further include a determination unit determining whether the data of the respective images separated by the separation unit are encoded or not. The decoding unit may decode the data of the respective images determined to be encoded by the determination unit.

The image processing apparatus may further include a determination unit determining a decoding method of the code stream of each image based on encoding method information indicating an encoding method of the code stream of each image. The decoding unit may decode the code stream of each image in accordance with the decoding method determined by the determination unit.

The image processing apparatus may further include a bit depth synthesis unit synthesizing the respective images decoded by the decoding unit in the bit depth direction.

According to another embodiment of the present disclosure, there is also provided an image processing method of an image processing apparatus, which includes separating, by a separation unit, a code stream of one system, which is formed by encoding a plurality of images separated from a same image in a bit depth direction and multiplexing code streams of the encoded images, for each code stream of each of the images, and decoding, by a decoding unit, the code stream of each of the images obtained by separating the code stream of one system.

According to the embodiment of the disclosure, the image is divided into the plurality of images in the bit depth direction and some or all of the plurality of images acquired by dividing the image in the bit depth direction are encoded.

According to another embodiment of the disclosure, the code stream of one system, which is formed by multiplexing the code streams of the respective images acquired by dividing the same image in the bit depth direction into the plurality of images and encoding the plurality of images, is separated for the code scream of each image, and the code streams of the respective images acquired by separating the code stream of one system are decoded.

According to the embodiments of the disclosure, it is possible to process an image. In particular, it is possible to improve the encoding efficiency.

BRIEF DESCRIPTION OF THE DRAWINGS

FIG. 39 is a flowchart illustrating an example of the flow of a determination decoding process; and FIG. 40 is a block diagram illustrating an example of the configuration of a personal computer to which an embodiment of the disclosure is applied.

DETAILED DESCRIPTION OF THE EMBODIMENTS

Figure 1:
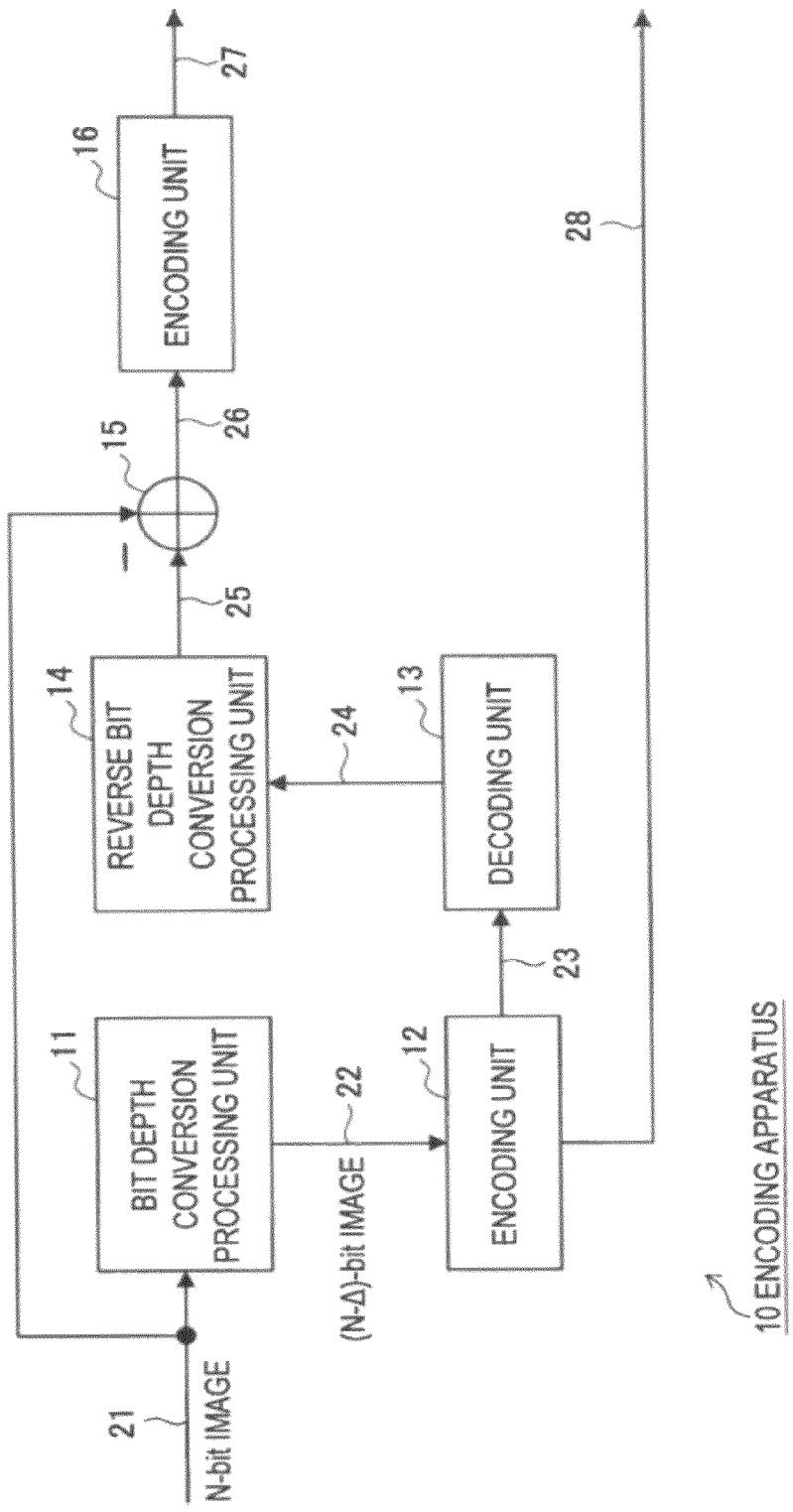
FIG. 1 is a block diagram illustrating an encoding apparatus according to the related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Preferred embodiments (hereinafter, referred to as embodiments) of the disclosure will be described below. The description thereof will be made in the following order.

1. First Embodiment (Encoding Apparatus)
2. Second Embodiment (Decoding Apparatus)
3. Third Embodiment (Encoding Apparatus)
4. Fourth Embodiment (Decoding Apparatus)
5. Fifth Embodiment (Encoding Apparatus)
6. Sixth Embodiment (Encoding Apparatus)
7. Seventh Embodiment (Decoding Apparatus)
8. Eighth Embodiment (Encoding Apparatus)
9. Ninth Embodiment (Decoding Apparatus)
10. Tenth Embodiment (Encoding Apparatus)
11. Eleventh Embodiment (Decoding Apparatus)
12. Twelfth Embodiment (Personal Computer)

1. First Embodiment

[Image Encoding According to Related Art]

First, image encoding according to the related art will be described.

An encoding apparatus 10 shown in FIG. 1 is an apparatus that encodes an input image of N bits. As shown in FIG. 1, the encoding apparatus 10 includes a bit depth conversion processing unit 11, an encoding unit 12, a decoding unit 13, a reverse bit depth conversion processing unit 14, a calculation unit 15, and an encoding unit 16.

When an input image 21 with the bit depth of N bits is input, the bit depth conversion processing unit 11 converts the bit depth of the input image to generate an image 22 with the bit depth of (N−Δ) and supplies the image 22 to the encoding unit 12.

The encoding unit 12 executes a predetermined encoding process on the image 22 with the bit depth of (N−Δ) supplied from the bit depth conversion processing unit 11 to generate an encoded code stream 23 and supplies the generated encoded code stream 23 to the decoding unit 13.

The decoding unit 13 decodes the supplied encoded code stream 23 and supplies the decoded image 24 to the reverse bit depth conversion processing unit 14. The reverse bit depth conversion processing unit 14 executes a reverse bit depth conversion process on the decoded image 24 to generate a decoded image 25 of N bits and supplies the decoded image 25 to the calculation unit 15.

The calculation unit 15 generates a difference image 26 between the input image 21 of N bits and the decoded image 25 of N bits and supplies the difference image 26 to the encoding unit 16. The encoding unit 16 encodes the difference image 26 to generate an encoded code stream 27 and outputs the encoded code stream 27 to the outside of the encoding apparatus 10.

The encoding unit 12 outputs an encoded code stream 28 of (N−Δ) bits to the outside of the encoding apparatus 10.

In this way, the encoding apparatus 10 according to the related art converts the image (of N bits) of a high bit depth into an image (of ((N−Δ) bits) of a lower bit depth, and then executes an encoding process in accordance with the international standard scheme, such as the MPEG-2 or the JPEG, that can process (N−Δ) bits.

In the case of the encoding apparatus 10 according to the related art, since the input image 21 has N bits and the decoded image 25 subjected to the reverse bit depth conversion also has N bits, the bit depth of the difference image between the input image 21 and the decoded image 25 becomes (N+1) bits. Therefore, the bit depth may be higher than the original bit depth. For this reason, the encoding unit 16 has to execute encoding in accordance with an encoding scheme that can process the higher bit depth.

Further, when the amount of information of the difference image 26 is sufficiently small, the overall compression effect is high. However, the amount of information of the difference image 26 depends on the capability of the bit depth conversion processing unit 11 or the reverse bit depth conversion processing unit 14. That is, in the encoding apparatus 10 according to the related art, there is a concern that the quality of the decoded image may depend on the capability of the bit depth conversion processing unit 11 or the reverse bit depth conversion processing unit 14.

[Configuration of Encoding Apparatus]

Figure 2:
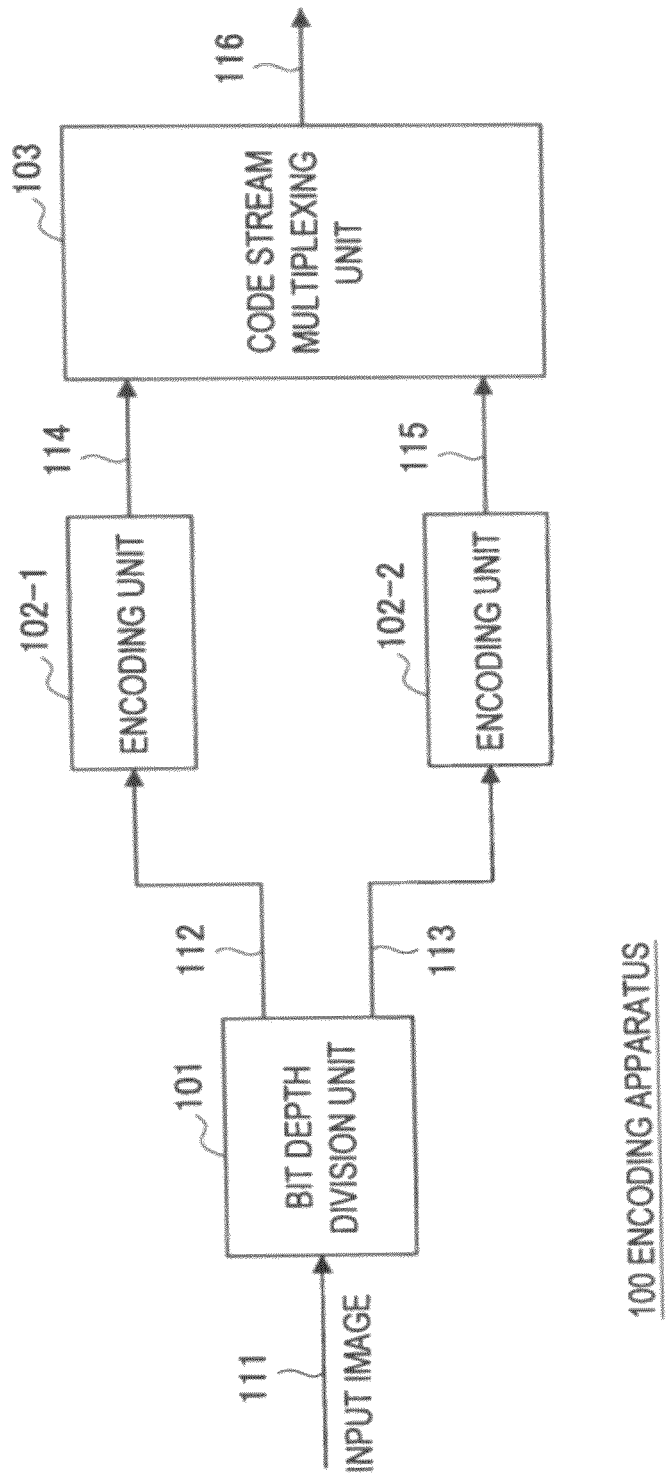
FIG. 2 is a block diagram illustrating an example of the main configuration of an encoding apparatus according to an embodiment of the disclosure.

FIG. 2 is a block diagram illustrating an example of the main configuration of an encoding apparatus according to an embodiment of the disclosure.

The encoding apparatus 100 shown in FIG. 2 is an apparatus that encodes an input image and outputs the code stream of the input image. Here, the encoding apparatus 100 divides the input image into two images in a bit depth direction for executing an encoding process so as to efficiently encode the input image, even when the bit depth of the input image is a high bit depth of 9 bits or more.

Of course, the encoding apparatus 100 can encode the input image of an arbitrary bit depth. In particular, the encoding apparatus 100 can encode the input image of a higher bit depth with high efficiency. Hereinafter, for facilitating description, a bit depth of 9 bits or more is referred to as a high bit depth and a bit depth of 8 bits or less is referred to as a low bit depth.

As shown in FIG. 2, the encoding apparatus 100 includes a bit depth division unit 101, an encoding unit 102-1, an encoding unit 102-2, and a code stream multiplexing unit 103.

The bit depth division unit 101 divides an input image 111 of a bit depth of X bits into two images with a predetermined number of bits in a bit depth direction. That is, when the bit depth of each pixel value of the input image is X bits, the bit depth division unit 101 divides the pixel value of the input image 111 into two pixel values with predetermined bits and generates two images: an image with high-order bits from the division position and an image with low-order bits from the division position.

Figure 3:
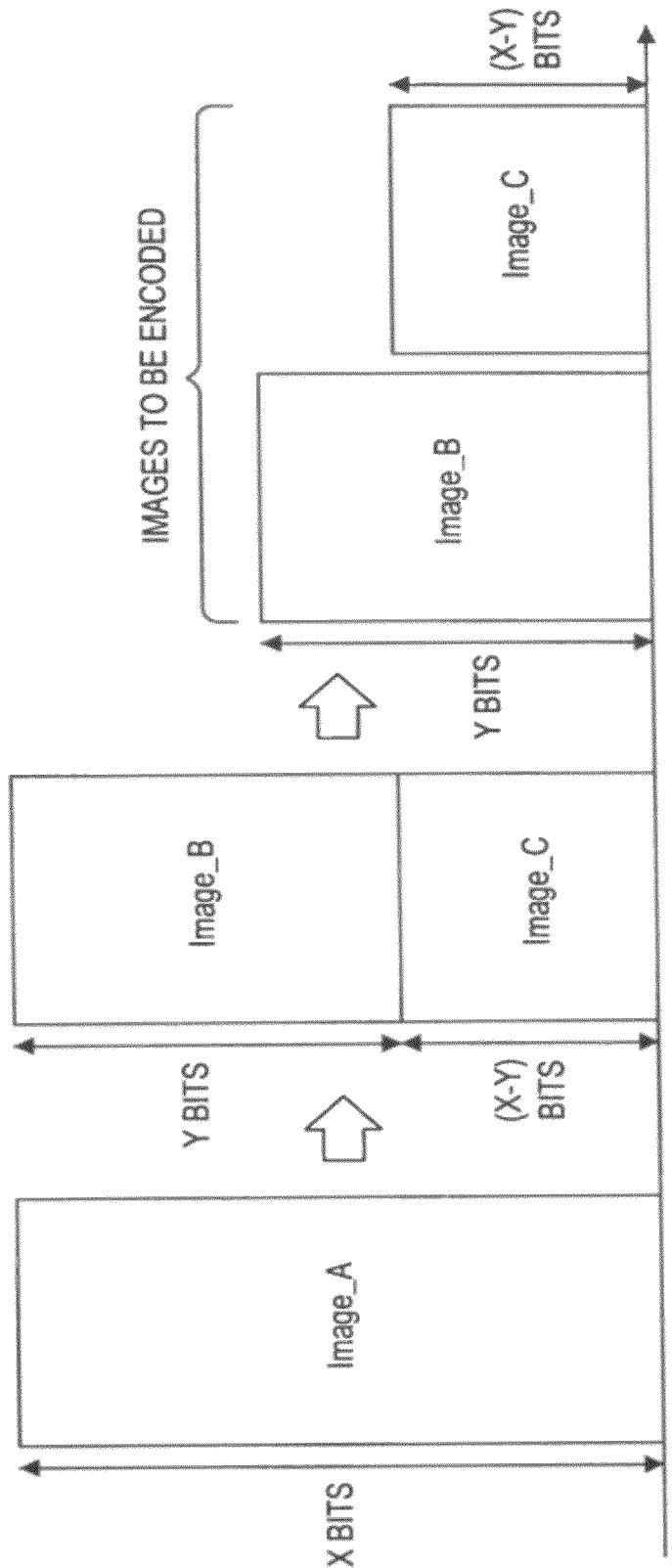
FIG. 3 is a diagram illustrating an overview of encoding.

For example, as shown in FIG. 3, the bit depth division unit 101 divides image data Image_A with a bit depth of X bits at the positions of Y bits from the most significant bit (MSB) to form image data Image_B (with a bit depth of Y bits) formed by the high-order bits from the division position and image data Image_C formed by the low-order bits (X−Y bits from the less significant bit (LSB)) from the division position.

The bit depth division unit 101 supplies image data 112 (in the example of FIG. 3, the Image_B) on the side of the high-order bits among the generated two images to the encoding unit 102-1. Further, the bit depth division unit 101 supplies image data 113 (in the example of FIG. 3, the Image_C) on the side of the low-order bits among the generated two images to the encoding unit 102-2.

The encoding unit 102-1 divides the image data 112 with the bit depth of Y bits in accordance with, for example, the JPEG 2000 scheme, generates a code stream 114, and supplies the code stream 114 to the code stream multiplexing unit 103.

The encoding unit 102-2 divides the image data 113 with the bit depth of (X−Y) bits in accordance with, for example, the JPEG 2000 scheme, generates a code stream 115, and supplies the code stream 115 to the code stream multiplexing unit 103.

Hereinafter, when it is not necessary to distinguish the encoding units 102-1 and 102-2 from each other, the encoding units 102-1 and 102-2 are simply referred to as the encoding units 102.

The code stream multiplexing unit 103 multiplexes the code streams 114 and 115 to generate a single code stream 116 and outputs the code stream 116 to the outside of the encoding apparatus 100.

The code stream multiplexing unit 103 adds, to the code stream 116, information (multiplexing information) indicating how the code stream multiplexing unit 103 multiplexes the code streams 114 and 115. That is, the multiplexing information is supplied to the destination of the code stream 116.

The multiplexing information is stored at an arbitrary place. For example, the multiplexing information may be described as a syntax in the bit stream or may be stored as auxiliary information in a predetermined region so as to be transmitted. Further, the multiplexing information may be stored in a parameter set (for example, a header or the like of a sequence or a picture) such as supplemental enhancement information (SEI).

Furthermore, the multiplexing information may be supplied separately from encoded data (as another file) to a decoding side. In this case, it is necessary to clarify correspondence between the multiplexing information and the encoded data (so that the correspondence can be recognized at the decoding side), but any method may be used. For example, table information indicating the correspondence may be separately generated, or link information indicating data regarding the counterpart may be embedded in the data of each side.

In this way, the encoding apparatus 100 can encode the image data with the high bit depth as the image data with the low bit depth by dividing the image data into two images in the bit depth direction and executing the encoding process on the two images.

The case in which both the encoding units 102-1 and 102-2 execute the encoding process in accordance with the JPEG 2000 scheme will be described below, but any encoding method for the encoding units 102 can be used. The encoding units 102-1 and 102-2 may execute the encoding process in accordance with different methods. The bit depths of the image data processed by the encoding units 102-1 and 102-2 may be different from each other.

The encoding conditions (for example, encoding parameters such as the number of levels (the number of divisions) of wavelet transform process, a code block size, and a quantization step size) of the encoding units 102-1 and 102-2 may be the same as or different from each other.

[Configuration of Encoding Unit]

Figure 4:
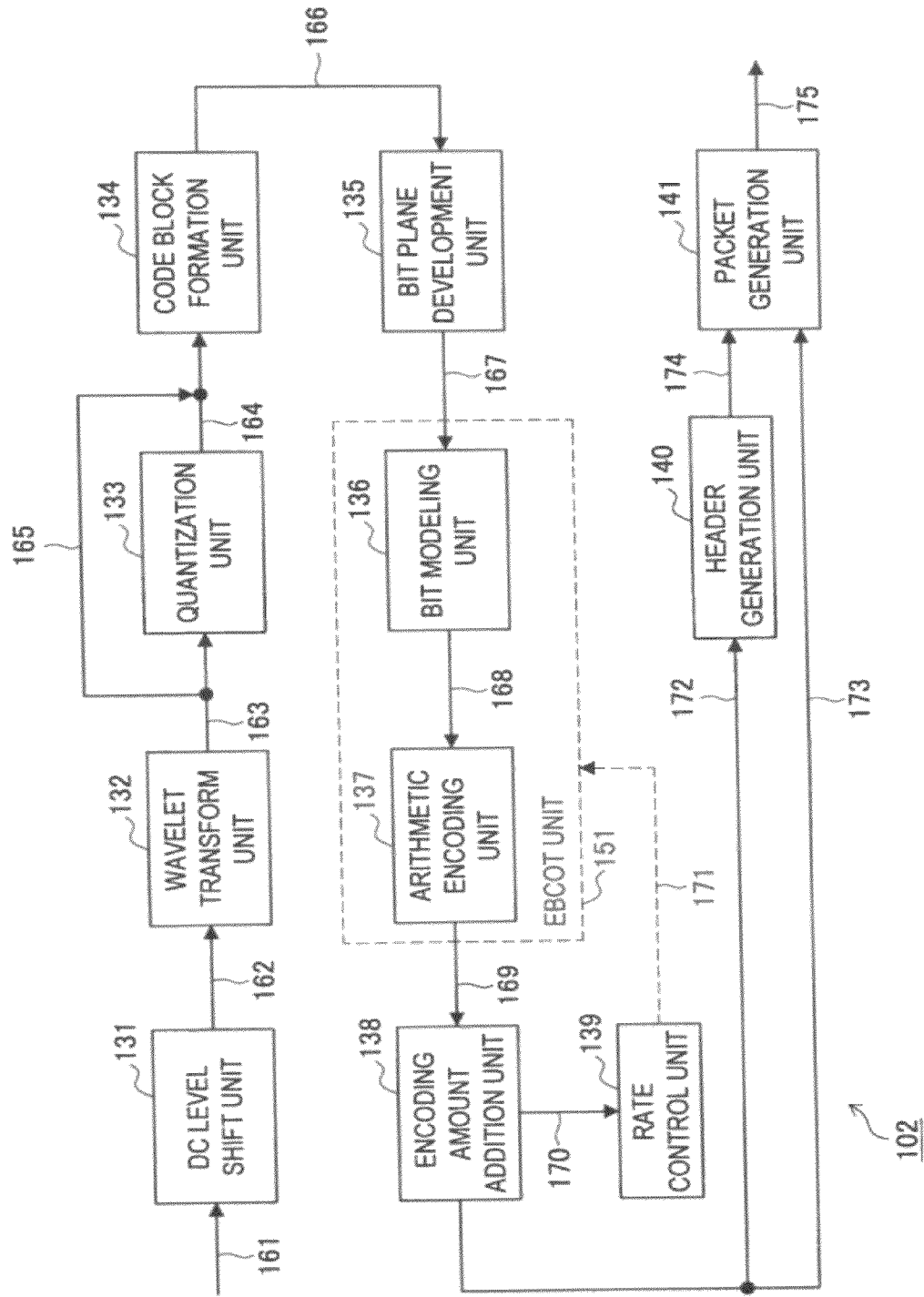
FIG. 4 is a block diagram illustrating an example of the main configuration of a JPEG 2000 encoding unit.

FIG. 4 is a block diagram illustrating an example of the main configuration of the encoding units 102 shown in FIG. 1. As shown in FIG. 4, the encoding unit 102 includes a DC level shift unit 131, a wavelet transform unit 132, a quantization unit 133, a code block formation unit 134, and a bit plane development unit 135.

The DC level shift unit 131 executes DC component level shift on the image data (the input image 111 in FIG. 2) input to the encoding unit 102, as indicated by an arrow 161, in order to efficiently execute wavelet transform process in the subsequent stage. For example, an RGB signal has a positive value (integer with no sign). Thus, the DC level shift unit 131 tries to improve compression efficiency by executing the level shift to halve the dynamic range of the original signal by taking advantage of the property of the RGB signal. Accordingly, when the original signal is a signal with sign integer values (both positive and negative integer values) such as color difference data Cb or color difference data Cr of a YCbCr signal, no level shift is executed.

The wavelet transform unit 132 is realized by a filter bank that generally includes a lowpass filter and a highpass filter. Since a digital filter normally has an impulse response (filter coefficient) with a plurality of tap lengths, the wavelet transform unit 132 has a buffer that buffers an input image in advance by the sufficient amount for filtering.

When the wavelet transform unit 132 acquires the image data output from the DC level shift unit 131, as indicated by an arrow 162, by the minimum data amount or more necessary for a filtering process, the wavelet transform unit 132 filters the image data subjected to the DC level shift using a predetermined wavelet transform filter to generate a wavelet coefficient. Further, the wavelet transform unit 132 executes a filtering process in vertical and horizontal directions of the image to separate the image data into lowpass and highpass components.

The wavelet transform unit 132 iterates the filtering process on sub-bands separated as the lowpass component recursively for a predetermined number of times in both the vertical and horizontal directions. This is because most energy of the image is concentrated on the lowpass component, as in FIG. 5, for example.

Figure 5:
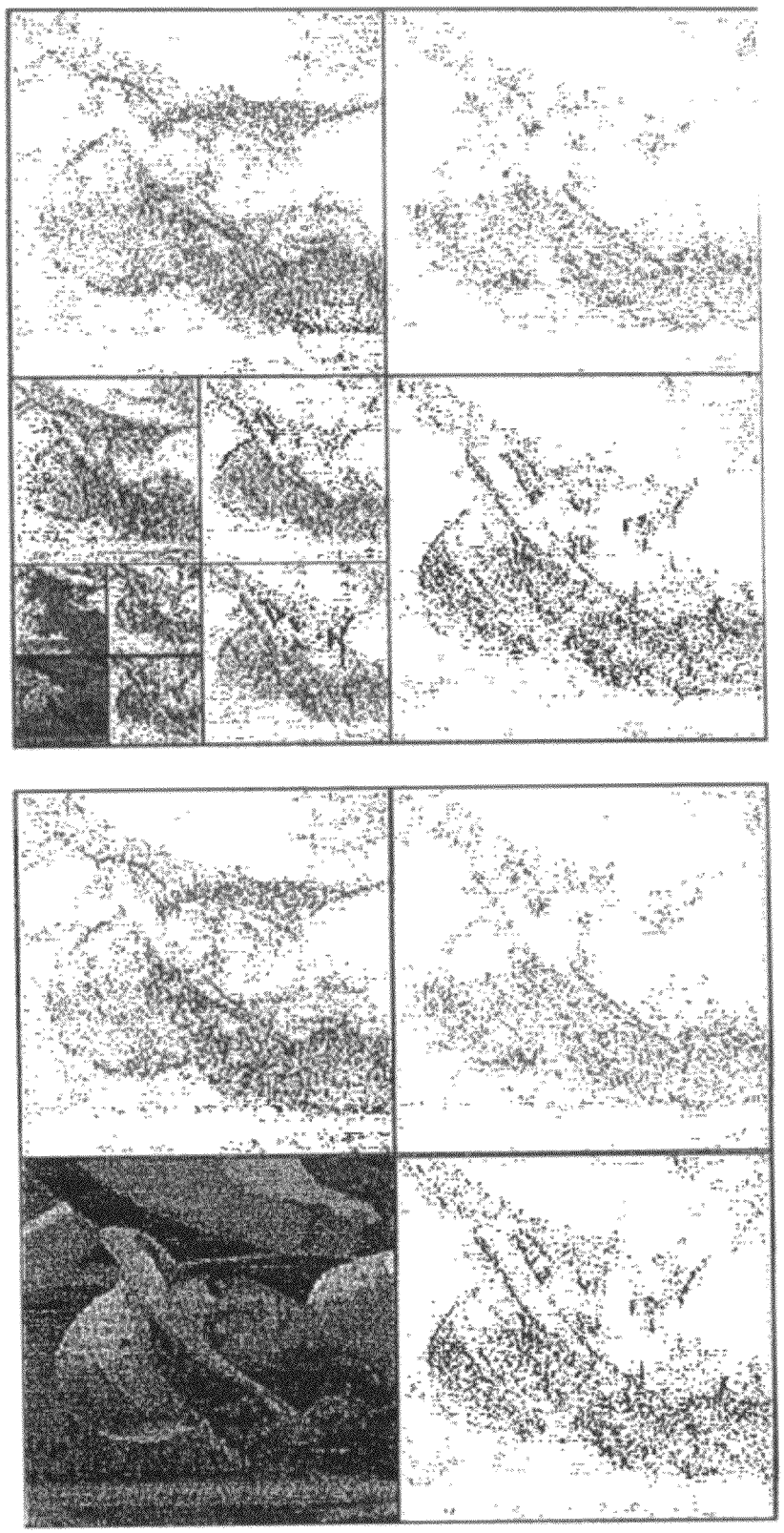
FIG. 5 is a diagram illustrating an example of the structure of sub-bands.

FIG. 5 is a diagram illustrating an example of the structure of the sub-bands. As in FIG. 5, both when the division level is 1 and when the division level is 3, most energy of the image is concentrated on the lowpass component.

Figure 6:
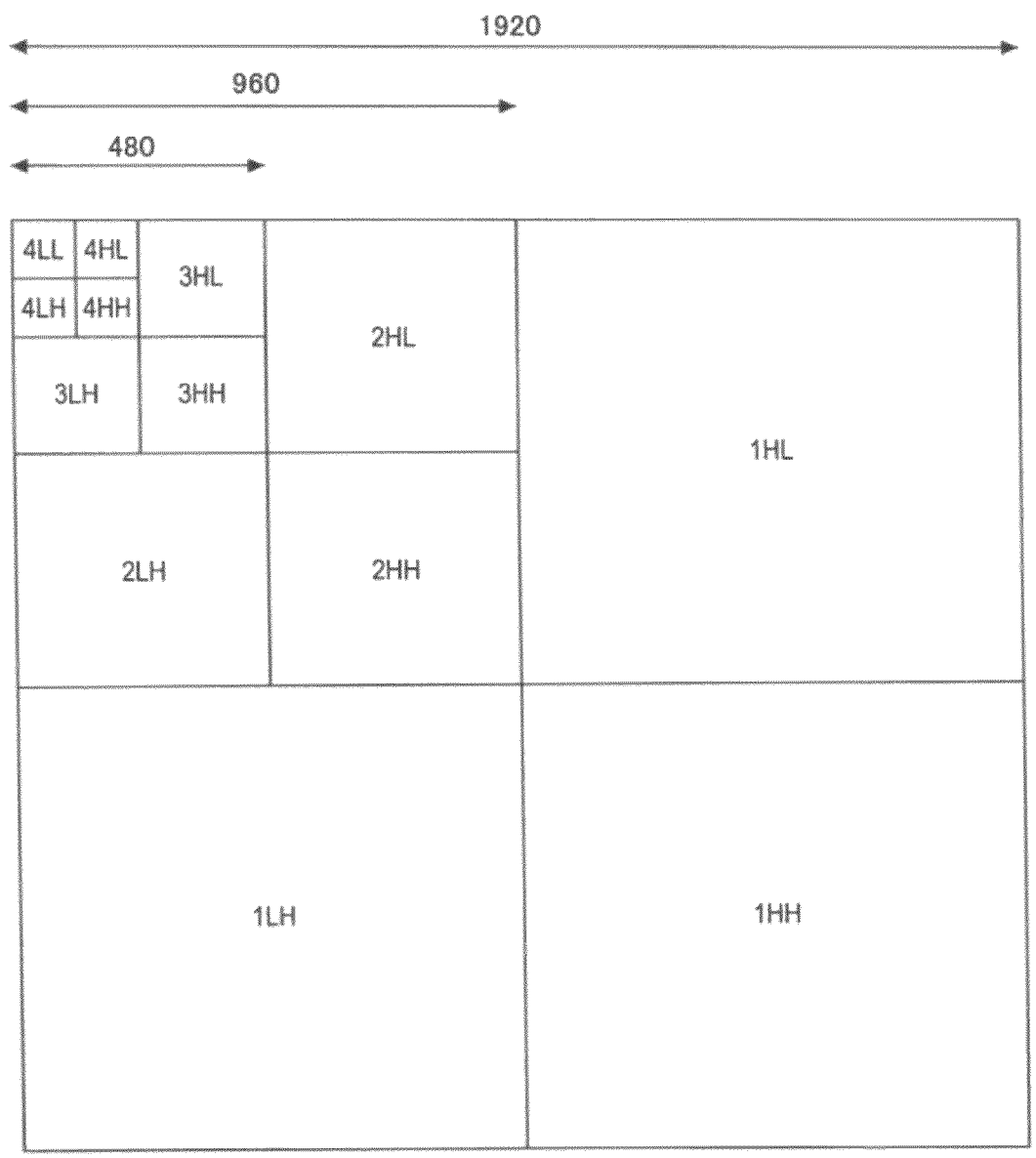
FIG. 6 is a diagram illustrating an example of the structure of sub-bands.

FIG. 6 is a diagram illustrating an example of the structure of the sub-bands generated by the wavelet transform process when the division level number is four.

In this case, the wavelet transform unit 132 first filters the entire image to generate sub-bands 1LL (not shown), 1HL, 1LH, and 1HH. Next, the wavelet transform unit 132 filters the generated sub-band 1LL again to generate sub-bands 2LL (not shown), 2HL, 2LH, and 2HH. Further, the wavelet transform unit 132 filters the generated sub-band 2LL again to generate sub-bands 3LL, 3HL, 3LH, and 3HH. Furthermore, the wavelet transform unit 132 again filters the generated sub-band 3LL to generate 4LL, 4HL, 4LH, and 4HH.

Thus, when an analysis filtering process is executed up to the division level number 4, thirteen sub-bands are generated.

As shown in FIG. 6, the size of each sub-band is halved in the vertical and horizontal directions each time the division level increases by one.

That is, when the image data of a baseband of an image with 1920 pixels in the horizontal direction is subjected to the analysis filtering process once, four sub-bands (1LL, 1HL, 1LH, and 1HH) with 960 pixels in the horizontal direction each are generated. When the sub-band 1LL is subjected to the analysis filtering process once, four sub-bands (2LL, 2HL, 2LH, and 2HH) with 480 pixels in the horizontal direction each are generated. When the sub-band 2LL is subjected to the analysis filtering process, four sub-bands (3LL, 3HL, 3LH, and 3HH) with 240 pixels in the horizontal direction each are generated. When the sub-band 3LL is subjected to the analysis filtering process once, four sub-bands (4LL, 4HL, 4LH, and 4HH) with 120 pixels in the horizontal direction each are generated.

The division level number of the wavelet transform process is arbitrary.

The wavelet transform unit 132 supplies the wavelet coefficient for each sub-band acquired by the filtering process to the quantization unit 133, as indicated by an arrow 163. The quantization unit 133 quantizes the supplied wavelet coefficient. Any quantization method may be used, but a scalar quantization method of executing division with a quantization step size is generally used. The quantization unit 133 supplies the quantization coefficient acquired through the quantization to the code block formation unit 134, as indicated by an arrow 164.

The quantization coefficient is supplied to the units at the subsequent stage instead of the wavelet coefficient. The quantization coefficient is processed basically in the same way as that of the wavelet coefficient. Accordingly, hereinafter, the description thereof will not be repeated, if not necessary, and the quantization coefficient is simply referred to as a coefficient or coefficient data.

When the encoding unit 102 encodes the image data in accordance with a lossless encoding method by which the original data can completely be restored by a decoding process, the process of the quantization unit 133 is not performed and the output from the wavelet transform unit 132 is supplied to the code block formation unit 134, as indicated by an arrow 165.

Figure 7:
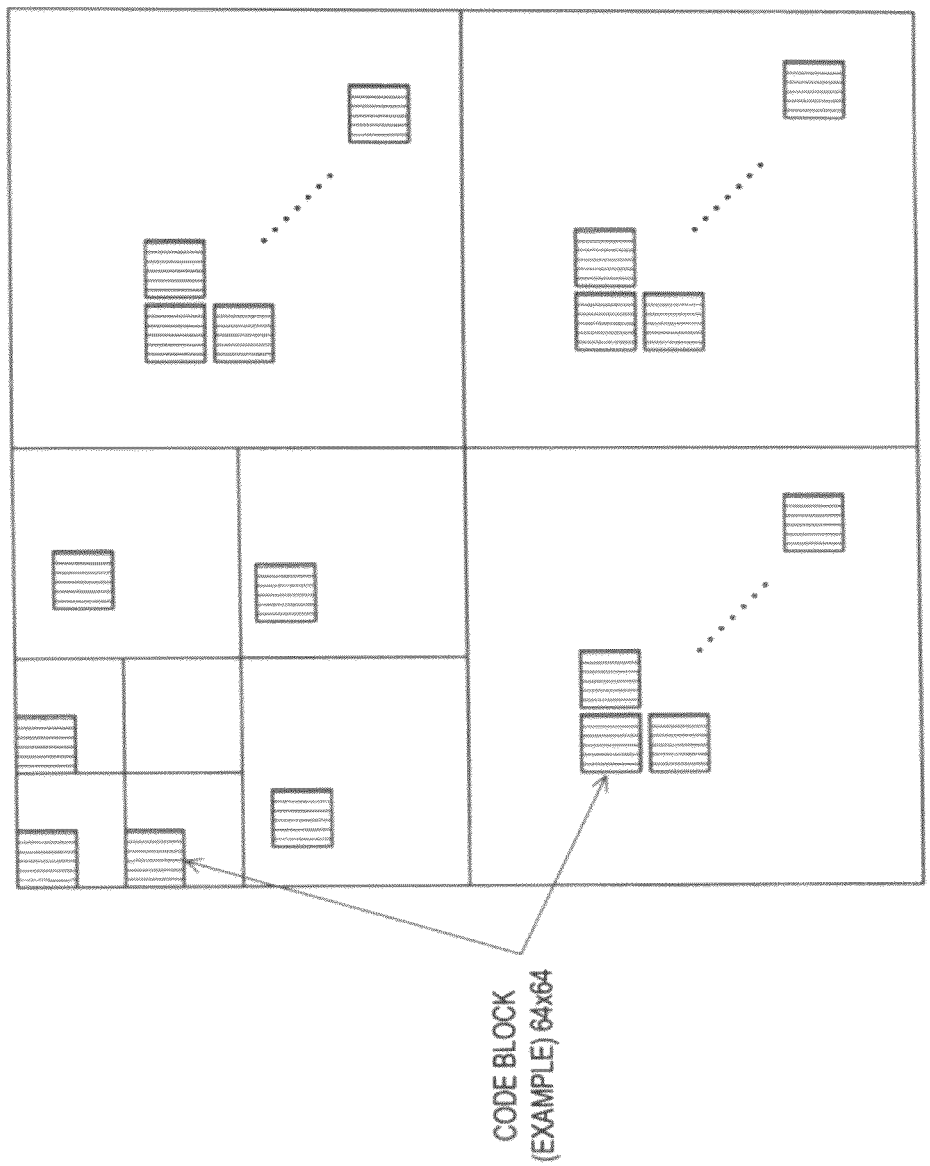
FIG. 7 is a diagram illustrating an example of a code block in each sub-band.

The wavelet coefficient is divided into code blocks with a predetermined size, which is a processing unit of an entropy encoding process, by the code block formation unit 134. FIG. 7 is a diagram illustrating a positional relationship between the code blocks in the sub-bands. For example, the code block with the size of about 64×64 pixels is generated in each of all the divided sub-bands. Each processing unit at the subsequent stage executes the process on each code block.

The code block formation unit 134 supplies each code block to the bit plane development unit 135, as indicated by an arrow 166. The bit plane development unit 135 develops the coefficient data into a bit plane for the position of each bit.

The bit plane is acquired by dividing (slicing) a coefficient group formed by the predetermined number of wavelet coefficients bit by bit, that is, position by position. That is, the bit plane is a set of bits (coefficient bits) having the same position as the coefficient group.

Figure 8:
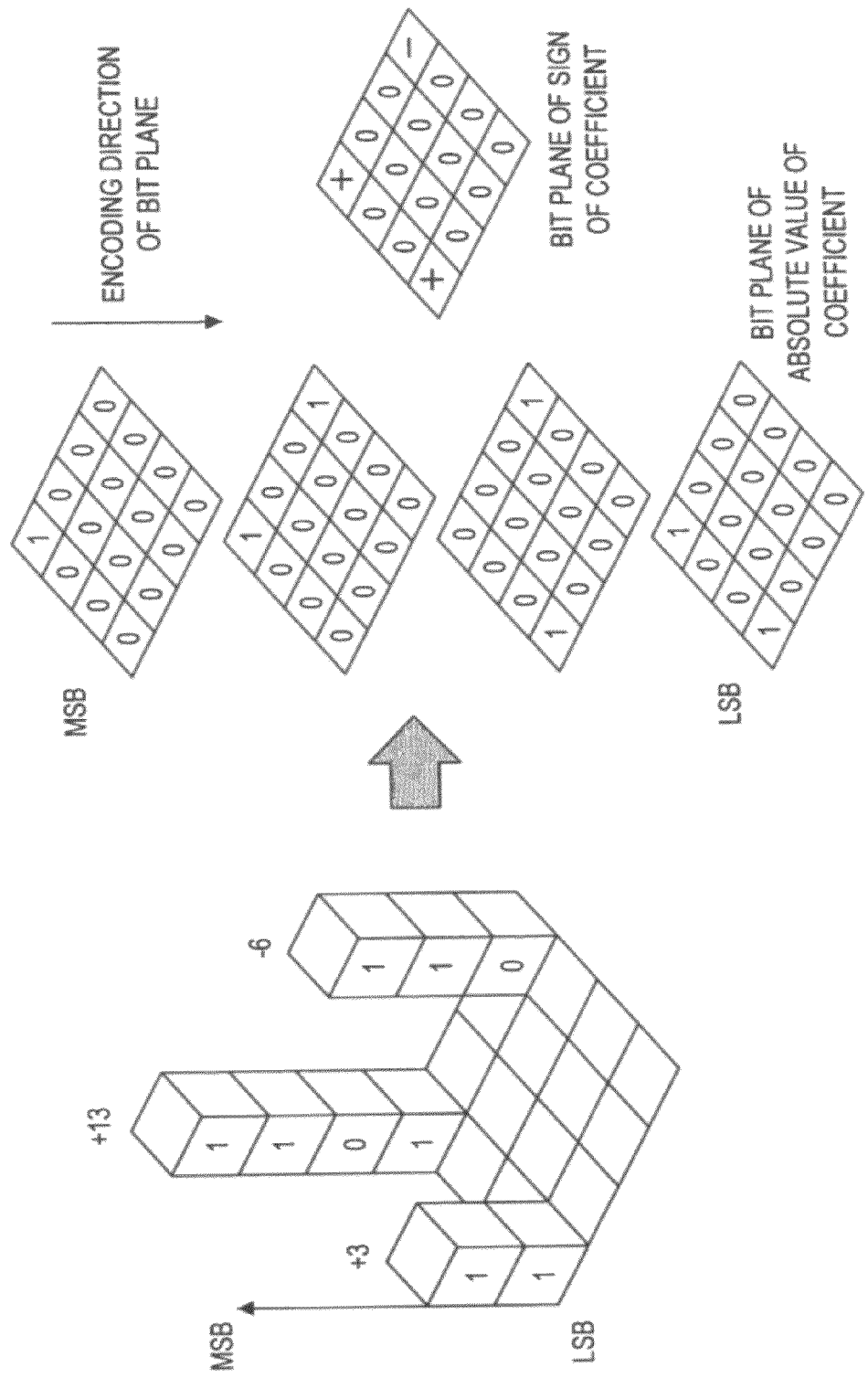
FIG. 8 is a diagram illustrating an example of a bit plane.

A specific example is shown in FIG. 8. The left drawing of FIG. 8 shows a total of sixteen coefficients: vertical four coefficients by horizontal four coefficients. The largest absolute value is 13 among the sixteen coefficients and is expressed as binary numbers of 1101. The bit plane development unit 135 develops this coefficient group into four bit planes (bit planes of absolute values) representing the absolute values and a single bit plane (bit plane of signs) representing the signs. That is, the coefficient group shown in the left drawing of FIG. 8 is developed into the four bit planes of the absolute values and the single bit plane of the signs, as shown in the right drawing of FIG. 8. Here, all the components of the bit planes of the absolute values have 0 or 1. The components of the bit plane representing the signs have any one of a value indicating the positive value of the coefficient, a value indicating the zero value of the coefficient, and a value indicating the negative value of the coefficient.

The encoding unit 102 further includes a bit modeling unit 136, an arithmetic encoding unit 137, a sign amount addition unit 138, a rate control unit 139, a header generation unit 140, and a packet generation unit 141.

The bit plane development unit 135 supplies the developed bit plane to the bit modeling unit 136, as indicated by an arrow 167.

The bit modeling unit 136 and the arithmetic encoding unit 137 operate as an embedded coding with optimized truncation (EBCOT) unit 151 and execute an entropy encoding process, which is called EBCOT defined in the JPEG 2000 standard, on the input coefficient data. The EBCOT is a method of executing an encoding process while measuring the statistic of the coefficient in a block for each block with a predetermined size.

The bit modeling unit 136 executes a bit modeling process on the coefficient data in an order defined in the JPEG 2000 standard and supplies information such as control information, a symbol, a context, or the like to the arithmetic encoding unit 137, as indicated by an arrow 168. The arithmetic encoding unit 137 executes an arithmetic encoding process on the bit plane of the coefficient.

The code block has the horizontal and vertical sizes of power-of-two from 4 to 256 and the normally used sizes are 32×32, 64×64, 128×32, and the like. The coefficient value is expressed by the binary number of n bits with a sign and bit 0 to bit (n−2) represent bits from LSB to the MSB, respectively. The remaining one bit represents a sign. The sign block is encoded sequentially from the bit plane of the MSB in accordance with the following three kinds of encoding passes.

(1) Significant Propagation Pass
(2) Magnitude Refinement Pass
(3) Cleanup Pass

Figure 9:
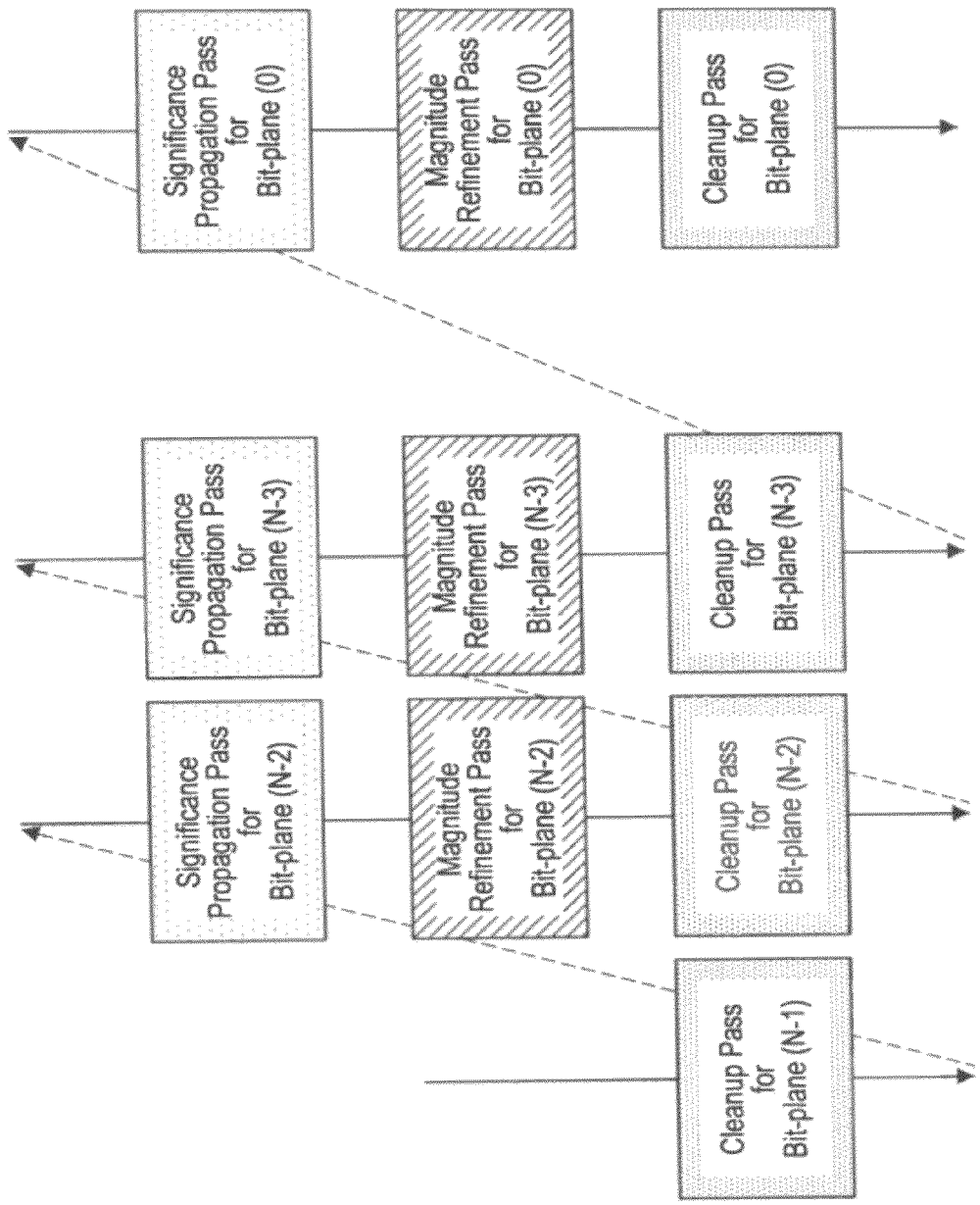
FIG. 9 is a diagram illustrating an example of an encoding pass.

The use order of the three encoding passes is shown in FIG. 9. Initially, the bit-plane (n−1) (MSB) is encoded by Cleanup Pass. Subsequently, the bit planes are encoded sequentially toward the LSB in the order of three encoding passes: Significant Propagation Pass, Magnitude Refinement Pass, and Cleanup Pass.

In effect, information indicating which numbered-bit plane from the MSB initially has 1 is written in the header, and the bit plane (which is referred to as a zero bit plane) that has all 0 continuously from the MSB is not encoded. The encoding amount and the image quality is traded off by executing the encoding process repeatedly in this order using the three kinds of encoding passes and stopping the encoding process in an arbitrary encoding pass of an arbitrary bit plane (that is, rate control is executed).

Figure 10:
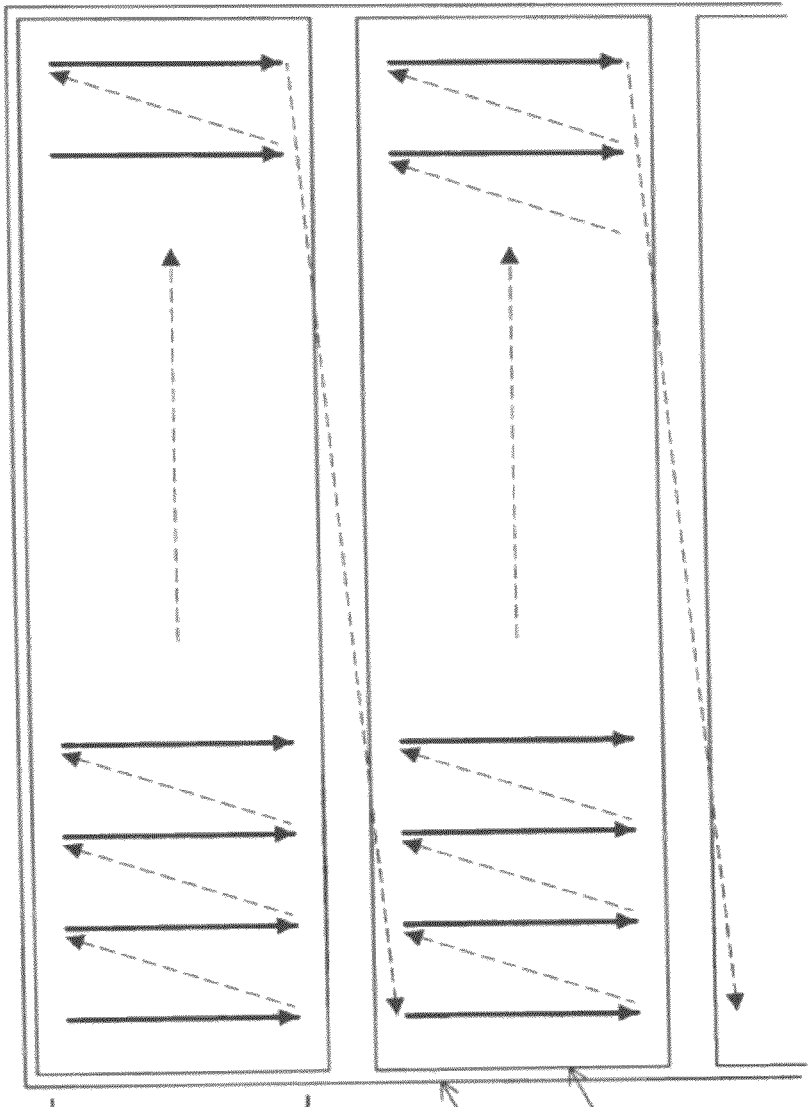
FIG. 10 is a diagram illustrating an example of scanning of coefficients.

Next, a coefficient scanning process will be described with reference to FIG. 10. The code block can be separated into stripes for four coefficients in height. The width of the stripe is the same as the width of the code block. The scanning order is an order in which all of the coefficients are traced in a single code block in sequences from the upper stripe to the lower stripe in the code block, from the left column to the right column in the stripe, and from the upper side to the lower side in the column. All of the coefficients in the code block at each encoding pass are processed in this scanning order.

Hereinafter, the three encoding passes will be described. The following details are all described in the JPEG 2000 standard (reference document: ISO/IEC 15444-1, Information technology-JPEG 2000, Part 1: Core Coding System).

(1) Significance Propagation Pass (SP Pass)

In the Significance Propagation Pass of encoding a certain bit plane, the value of the bit plane of the non-significant coefficient in which at least one coefficient of near eight coefficients is significant is arithmetically encoded. When the value of the encoded bit plane is 1, MQ encoding is continuously executed to determine whether the sign is "+" or "−."

Here, "significance" the term specific to the JPEG 2000 will be described. As for the significance, in a state where an encoder belongs to each coefficient, the initial value 0 of the significance indicating a non-significant state is varied to 1 indicating a significant state when 1 is encoded with the coefficient, and the value 1 of the significance subsequently continues. Accordingly, the significance can also be considered to be a flag indicating whether significant digit information has already been encoded. When a certain bit plane becomes significant, the significant state remains in the subsequent bit planes.

(2) Magnitude Refinement Pass (MR Pass)

In the Magnitude Refinement Pass of encoding the bit plane, the value of the bit plane of the significant coefficient which is not encoded is MQ-encoded through the significance propagation pass of encoding the bit plane.

(3) Cleanup Pass (CD Pass)

In the cleanup pass of encoding the bit plane, the value of the bit plane of the non-significant coefficient which is not encoded is subjected to MQ-encoded through the significance propagation pass of encoding the bit plane. When the value of the encoded bit plane is 1, whether the sign is "+" or "−" (Sign information) is continuously MQ-encoded.

In the MQ encoding of the three encoding passes described above, zero coding (ZC), run-length coding (RLC), sign coding (SC), and magnitude refinement (MR) can separately be used depending on cases. Here, an arithmetic sign called the MQ encoding is used. The MQ encoding is a learning binary arithmetic sign defined in the JBIG2 (reference document: ISO/IEC FDIS 14492, "Lossy/Lossless Coding of Bi-level Images," March 2000).

Referring back to FIG. 4, the arithmetic encoding unit 137 supplies the generated code stream to the encoding amount addition unit 138, as indicated by an arrow 169. The encoding amount addition unit 138 counts and accumulates the encoding amounts of the code streams.

The encoding amount addition unit 138 supplies the code streams to the header generation unit 140 and the packet generation unit 141, as indicated by arrows 172 and 173, respectively, and supplies the accumulation value of the encoding amounts to the rate control unit 139, as indicated by an arrow 170. The rate control unit 139 controls the EBCOT unit 151 based on the accumulation value of the supplied encoding amounts as indicated by arrow 171, and ends the encoding process when the accumulation value reaches a target encoding amount. That is, the rate control unit 139 executes control (rate control of the code streams) of the generated encoding amounts.

The packet generation unit 141 packets the supplied code stream. The header generation unit 140 generates header information regarding the packet and supplies the header information to the packet generation unit 141, as indicated by an arrow 174. The packet generation unit 141 generates a packet based on the header information.

Figure 11:
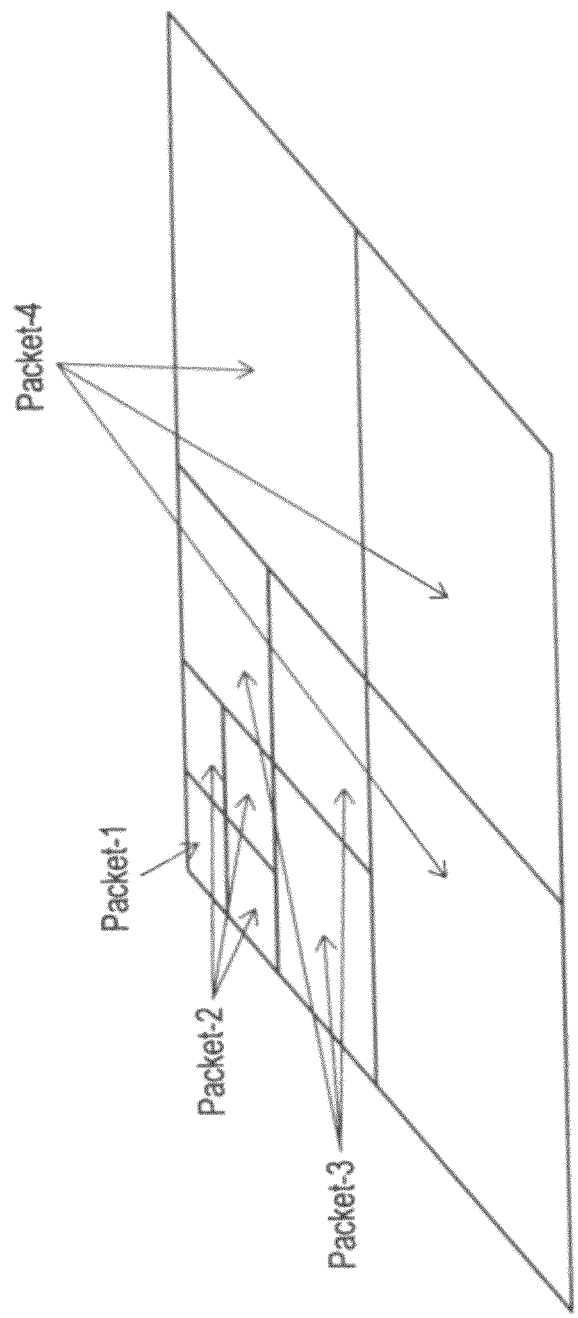
FIG. 11 is a diagram illustrating a layer.

The concept of the packet is shown in FIG. 11. In the example shown in FIG. 11, the wavelet transform process is executed three times, and four packets from the lowest-region Packet-1 to the highest-region Packet-4 are generated as the result. Accordingly, the encoded code streams of all the encoding blocks existing in the sub-bands in the individual packets are packed for each packet.

Figure 12:
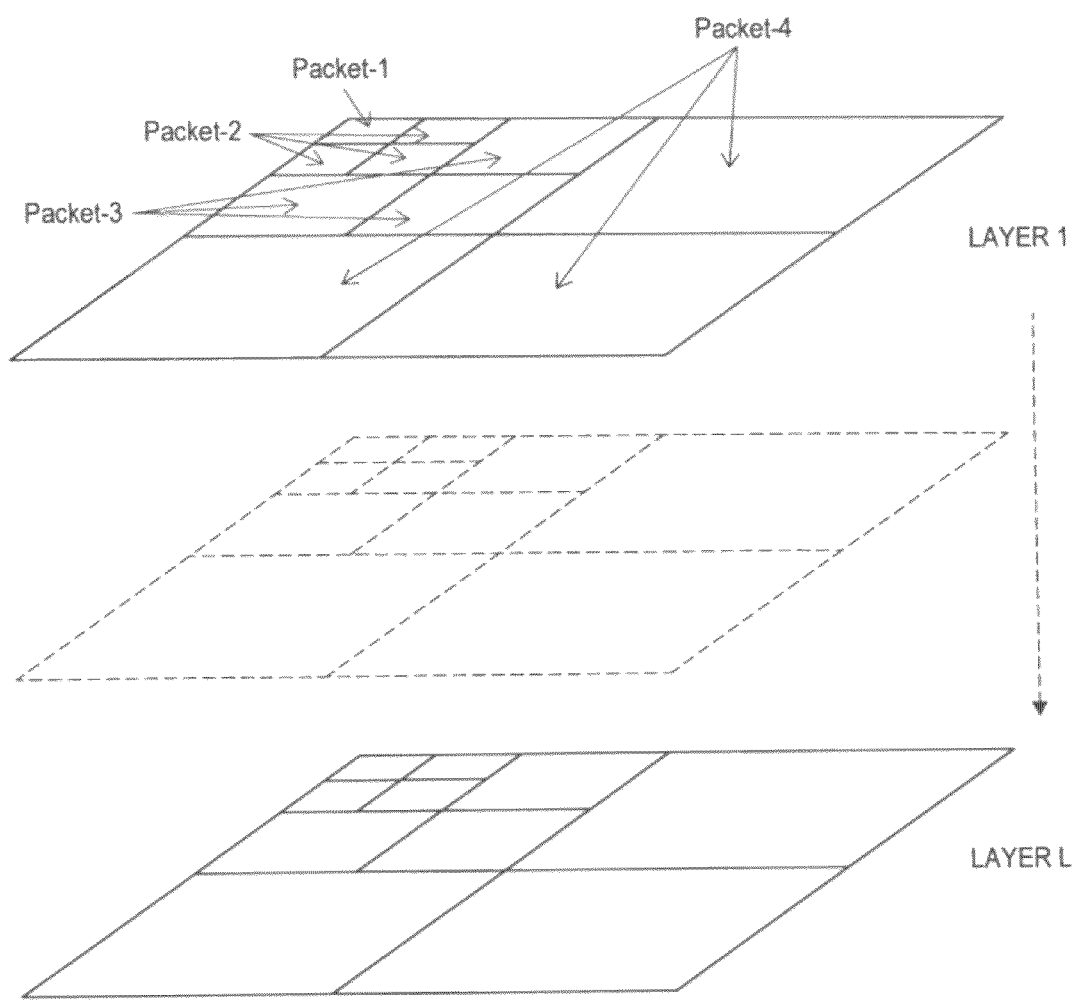
FIG. 12 is a diagram illustrating an example of the structure of the layer.

FIG. 12 is a diagram illustrating a case where the encoding pass is divided into L layers from Layer 1 to Layer L. In a given code block, the beginning encoding pass of the layer n is located immediately after the last encoding pass of the layer (n−1).

The generated packet is output to the outside of the encoding unit 102, as indicated by an arrow 175, and is supplied to the code stream multiplexing unit 103.

As described above, each encoding unit 102 can encode the respective image data divided in the bit depth direction in accordance with the JPEG 2000 scheme, as in normal image data which is not divided.

[Flow of Bit Depth Division Encoding Process]

Next, the flow of each process executed in the encoding apparatus 100 will be described.

When the input image 111 is supplied, the encoding apparatus 100 executes a bit depth division encoding process. An example of the bit depth division encoding process will be described with reference to the flowchart of FIG. 13.

When the bit depth division encoding process starts, the bit depth division unit 101 divides the input image 111 into two images in the bit depth direction in step S101, as shown in FIG. 3.

In step S102, the encoding unit 102-1 encodes the divided image data 112 acquired in step S101 in accordance with the JPEG 2000 scheme to generate the code stream 114. Likewise, the encoding unit 102-2 encodes the divided image data 113 acquired in step S101 in accordance with the JPEG 2000 scheme to generate the code stream 115.

In step S103, the code stream multiplexing unit 103 multiplexes the code streams 114 and 115 acquired in step S102 to generate the single code stream 116.

When the process of step S103 ends, the encoding apparatus 100 ends the bit depth division encoding process.

[Flow of Encoding Process]

Next, an example of the flow of the encoding process executed in step S102 of FIG. 13 will be described with reference to the flowchart of FIG. 14.

When the encoding process starts, the DC level shift unit 131 shifts the DC level of the image data input from the corresponding input system in step S121. In step S122, the wavelet transform unit 132 executes the wavelet transform process on the image data subjected to the DC level shift.

In step S123, the quantization unit 133 quantizes the wavelet coefficient generated in step S122 in a case of the lossy encoding method. In a case of the lossless encoding method, this process is not performed.

In step S124, the code block formation unit 134 divides the quantized coefficient in a code block unit. In step S125, the bit plane development unit 135 develops the coefficient for each code block into the bit plane.

In step S126, the EBCOT unit 151 encodes the coefficient developed into the bit plane. In step S127, the rate control unit 139 controls the rate of the generated encoding amounts using the encoding amounts or the like added by the encoding amount addition unit 138.

In step S128, the header generation unit 140 generates a packet header. In step S129, the packet generation unit 141 generates the packet. In step S130, the encoding unit 102 outputs the packet to the outside.

Figure 13:
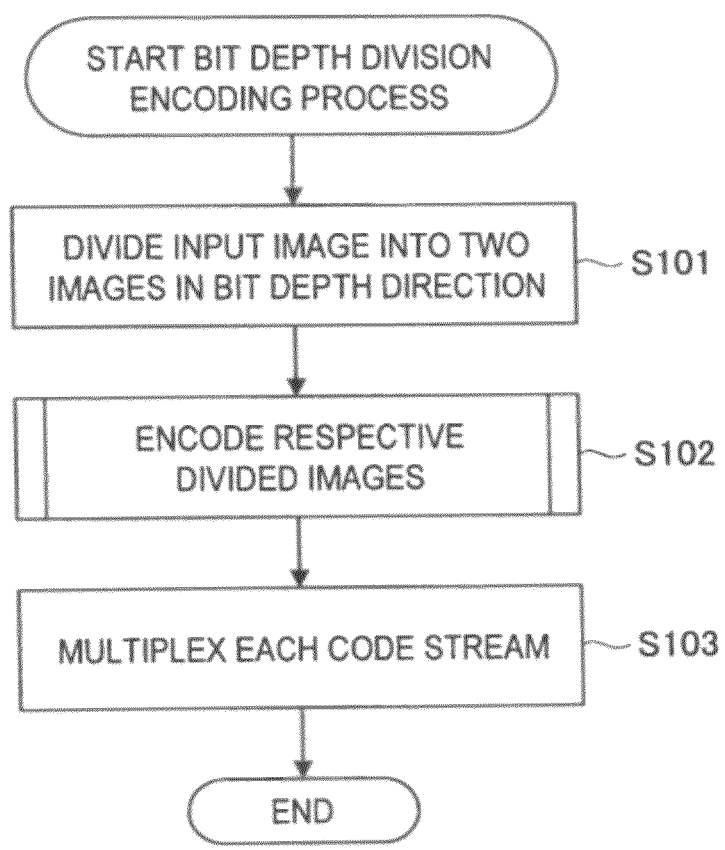
FIG. 13 is a flowchart illustrating an example of the flow of a bit depth division encoding process.
Figure 14:
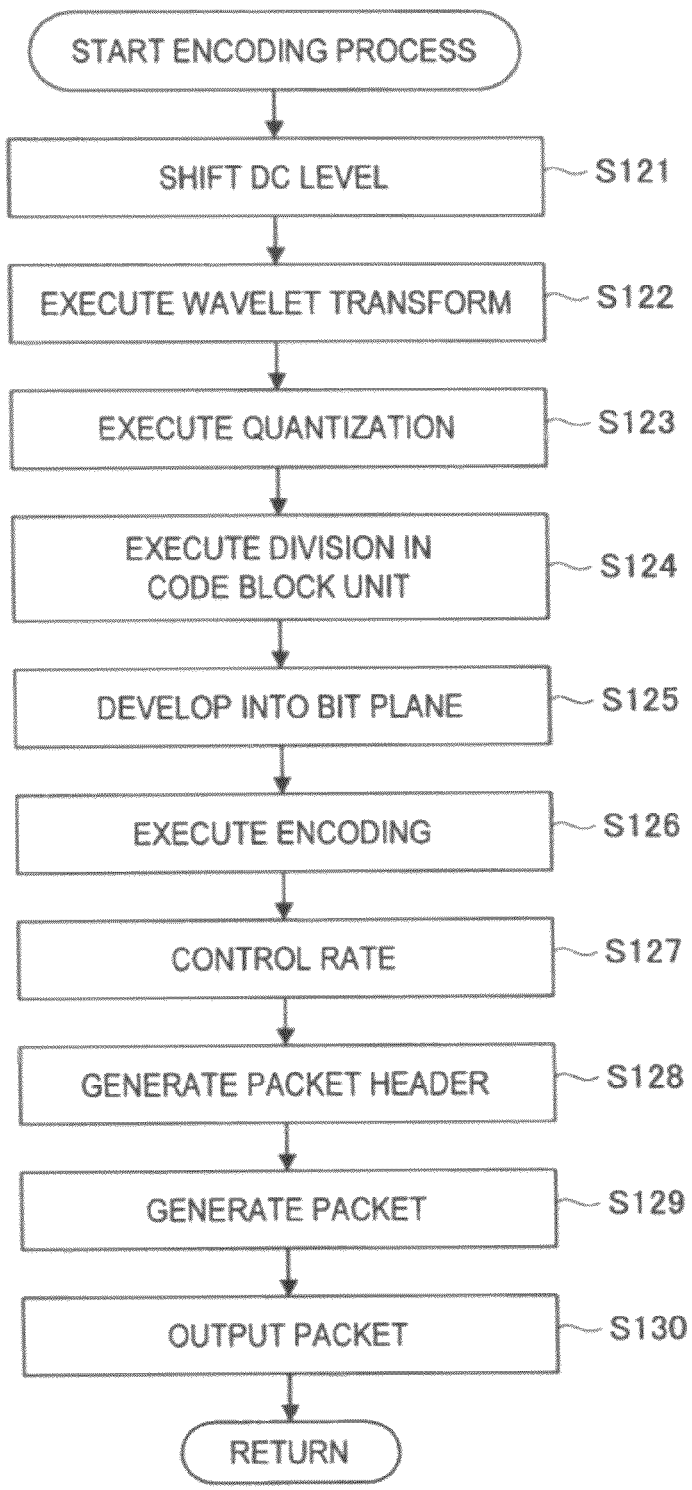
FIG. 14 is a flowchart illustrating an example of the flow of an encoding process.

When the process of step S130 ends, the encoding unit 102 ends the encoding process and returns the process to step S102 of FIG. 13 to execute the processes subsequent to step S103.

By executing the above-described processes, the encoding apparatus 100 can encode the image data with the high bit depth as the image data with the low bit depth.

[Encoding Amount]

The information amount (encoding amount) of the code stream 116 acquired by dividing the image in the bit depth direction and encoding the divided images as described above will be described.

For example, the size of the code stream (Codestream_A) acquired by executing the lossless encoding process on the image data (Image_A) is assumed to be Size_A. Further, the size of the code stream (Codestream_B) acquired by executing the lossless encoding process on the image data (Image_B) is assumed to be Size_B. Furthermore, the size of the code stream (Codestream_C) acquired by executing the lossless encoding process on the image data (Image_C) is assumed to be Size_C.

At this time, in order to improve the encoding efficiency, the encoding apparatus 100 may execute the encoding process so as to satisfy Expression (1) below.

$$Size\_A > Size\_B + Size\_C \qquad (1)$$

An example of an experiment result will be described when a G0 image, which is one component in RAW data (R, G0, G1, and B) extracted from a certain image sensor, is subjected to the JPEG 2000 Lossless encoding process.

For example, the original size of the one component G0 (with 12-bit depth) of the RAW image to be encoded is assumed to be 1,036,818 bytes. At this time, when the component G0 is subjected to the JPEG 2000 Lossless encoding process, the size of the code stream becomes 561,540 bytes.

On the other hand, it is supposed that the encoding apparatus 100 divides the component G0 into an image (image with high-order 10 bits) with bit depth high-order 10 bits and an image (image with low-order 2 bits) with bit depth low-order 2 bits and encodes these images. In this case, when the image with the high-order 10 bits is subjected to the JPEG 2000 Lossless encoding process, the size of the code stream becomes 426,262 bytes. Further, when the image with the low-order 2 bits is subjected to the JPEG 2000 Lossless encoding process, the code stream has the size of 2,688 bytes. That is, the sum is 428,950 bytes.

In this way, the encoding apparatus 100 can reduce 25% of the information amount compared to a case where the encoding process is executed without dividing the image into two images (on the image with the 12-bit depth). That is, Expression (1) above can be satisfied.

Thus, the encoding apparatus 100 can improve the encoding efficiency in the encoding process of the image. In particular, when the input image 111 has the high bit depth, the great advantage can be achieved in that the information amount (encoding amount) of the code stream is apt to increase.

As described above, the level number of the wavelet transform process can be set independently in the image with the high-order bits and the image with the low-order bits. The number of the wavelet transform process and the information amount (encoding amount) of the code stream will be described.

It is supposed that the image with the high-order 10 bits and the image with the low-order 2 bits are encoded (where 0 indicates that the transform is not executed) in accordance with the JPEG 2000 scheme, when the level number of the wavelet transform process (DWT: Discrete Wavelet Transform) is in the range from 0 to 5.

As a consequence, the results of the JPEG 2000 Lossless encoding process on the image with the high-order 10 bits are as follows.

DWT0: 5,698,403 byte
DWT1: 4,501,068 byte
DWT2: 4,315,214 byte
DWT3: 4,270,851 byte
DWT4: 4,262,794 byte
DWT5: 4,261,438 byte In the case of the image with the high-order 10 bits, the encoding amount of the code stream acquired through the encoding decreases, as the level number of the wavelet transform process increases. That is, the encoding efficiency is improved, as the level number of the wavelet transform process is larger.

On the other hand, the results of the JPEG 2000 Lossless encoding process on the image with the low-order 2 bits are as follows.

DWT0: 1,871,597 byte
DWT1: 2,171,301 byte
DWT2: 2,229,017 byte
DWT3: 2,242,885 byte
DWT4: 2,246,923 byte
DWT5: 2,248,336 byte In the case of the image with the low-order 2 bits, the encoding amount of the code stream acquired through the encoding decreases, as the level number of the wavelet transform process decreases. That is, the encoding efficiency is improved, as the level number of the wavelet transform process is smaller.

In general, an image with the high-order bits has a high possibility that the image has an important portion before the division and is apt to have the lowpass component. Accordingly, the encoding efficiency is expected to be improved as the level number of the wavelet transform process is larger. On the other hand, an image with the low-order bits has a high possibility that the image generally has many noise components and is apt to have the highpass component. Accordingly, it is difficult to improve the encoding efficiency by the wavelet transform process.

For this reason, the number of the wavelet transform process for the image with high-order bits is set to be larger, whereas the number of the wavelet transform process for the image with low-order bits is set to be smaller. In this way, the encoding apparatus 100 can improve the encoding efficiency.

As described above, the encoding apparatus 100 divides the input image 111 in the bit depth direction into two images and encodes the two images. Thus, the encoding apparatus 100 can reduce the bit depth number of the image data to be encoded. That is, the encoding apparatus 100 can reduce the memory capacity necessary for the encoding process.

Further, as described above, the encoding apparatus 100 can independently set the encoding method for the image with the high-order bits and the encoding method for the image with the low-order bits. Accordingly, for example, the Image_B may be subjected to the JPEG 2000 Lossless encoding process and the Image_C with many noise components may be encoded in an appropriate Lossless codec. Thus, since the encoding apparatus 100 can select an encoding method depending on the characteristics of the data, the encoding process can be executed more efficiently.

As shown in FIG. 2, two encoders may be prepared for the encoding units 102, but a single encoder may be shared in a time division manner. In the latter way, the circuit scale or an increase in cost can be suppressed. However, since the processing time of the encoding increases, the single encoder is sometimes required a high processing capability compared to the case where two encoding units are used. In particular, when a video is encoded in real time (instantly), it is necessary to encode each frame image more rapidly than a frame rate at the input time.

2. Second Embodiment

[Configuration of Decoding Apparatus]

Figure 15:
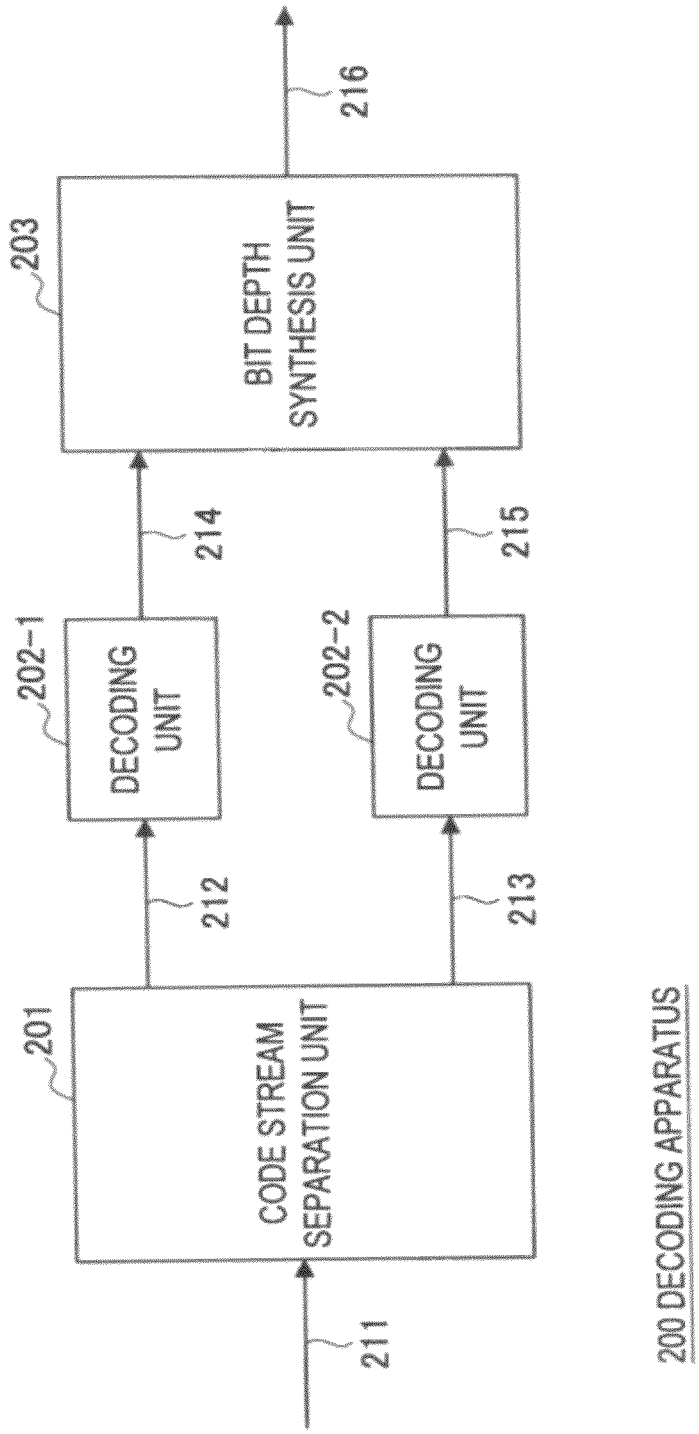
FIG. 15 is a block diagram illustrating an example of the main configuration of a decoding apparatus to which an embodiment of the disclosure is applied.

Next, a decoding apparatus corresponding to the encoding apparatus 100 described above will be described. FIG. 15 is a block diagram illustrating an example of the main configuration of the decoding apparatus to which an embodiment of the disclosure is applied. A decoding apparatus 200 shown in FIG. 15 is an apparatus that decodes the code stream generated by the encoding apparatus 100 shown in FIG. 2 to acquire a decoded image.

That is, the decoding apparatus 200 can acquire the decoded image by decoding a single code stream, which is formed by multiplexing the code streams acquired by dividing an image into the images in the bit depth direction and encoding the images.

As shown in FIG. 15, the decoding apparatus 200 includes a code stream separation unit 201, a decoding unit 202-1, a decoding unit 202-2, and a bit depth synthesis unit 203.

When the code stream separation unit 201 acquires a code stream 211 encoded by the encoding apparatus 100, the code stream separation unit 201 generates two code streams, that is, a code stream 212, which is acquired by encoding the image with the high-order bits of the bit depth, and a code stream 213, which is acquired by encoding the image with the low-order bits of the bit depth, based on the multiplexing information (which is added to the code stream 211 or is associated with the code stream 211 separately from the code stream 211 for supply) of the code stream.

The code stream separation unit 201 supplies the code stream 212, which is one of the divided code streams, to the decoding unit 202-1 and supplies the code stream 213, which is the other of the divided code streams, to the decoding unit 202-2.

The decoding unit 202-1 decodes the code stream 212 in accordance with a decoding method corresponding to the encoding method of the encoding unit 102-1 of the encoding apparatus 100 and supplies a decoded image 214 to the bit depth synthesis unit 203.

The decoding unit 202-2 decodes the code stream 213 in accordance with a decoding method corresponding to the encoding method of the encoding unit 102-2 of the encoding apparatus 100 and supplies a decoded image 215 to the bit depth synthesis unit 203.

Hereinafter, when it is not necessary to distinguish the decoding units 202-1 and 202-2 from each other, the decoding units 202-1 and 202-2 are simply referred to as the decoding units 202.

The decoded image 214 is an image with high-order bits of the bit depth and the decoded image 215 is an image with low-order bits of the bit depth.

Figure 16:
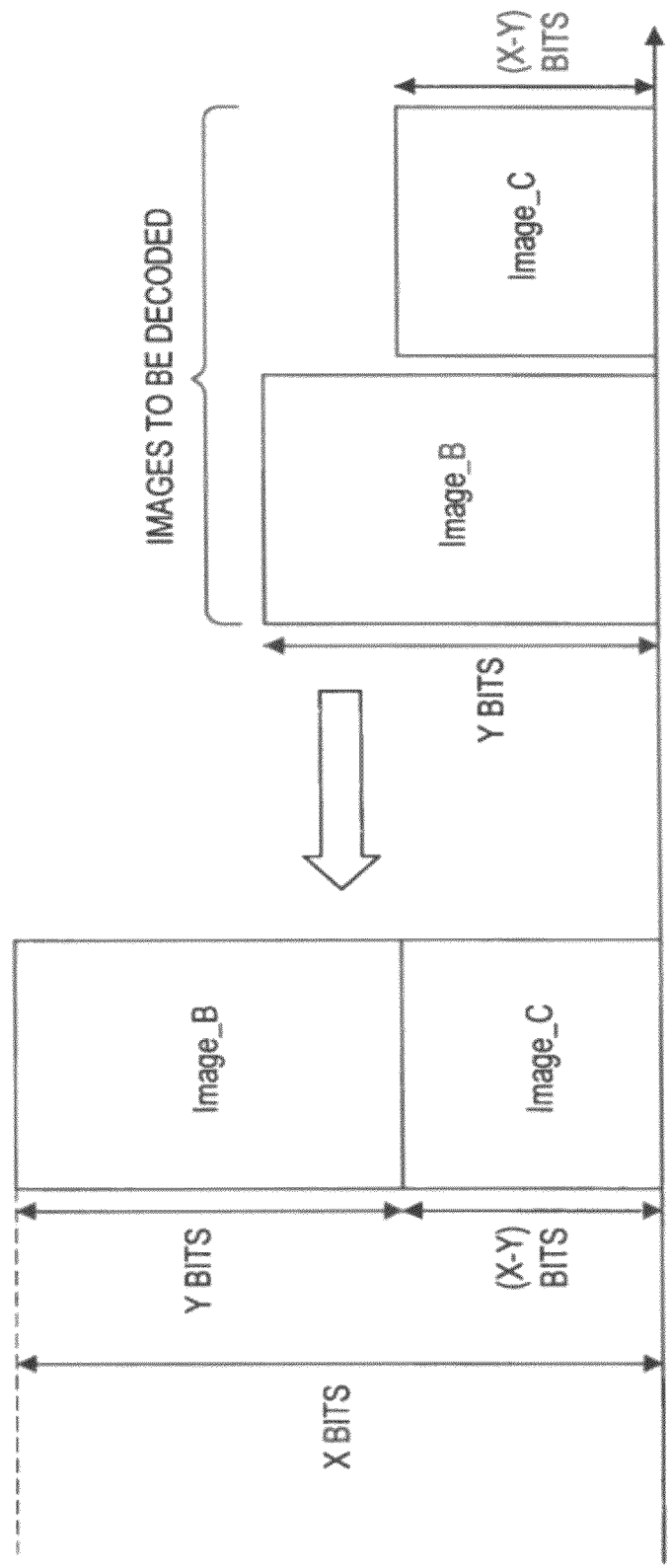
FIG. 16 is a diagram illustrating the overview of a decoding process.

The bit depth synthesis unit 203 synthesizes these decoding images 214 and 215 in a bit depth direction to generate a single decoded image 216 of one system with the same bit depth as that of the input image of the encoding apparatus 100, for example, as shown in FIG. 16, and outputs the decoded image 216 to the outside of the decoding apparatus 200.

In the example shown in FIG. 16, image data Image_B with a Y-bit depth and image data Image_C with a (X−Y)-bit depth are decoded, so that an image with an X-bit depth is restored.

For example, the decoding units 202 may be configured to use a JPEG 2000 decoder that executes a decoding process in accordance with the JPEG 2000 scheme. As in the encoding units 102, the plurality of decoding units 202 may be prepared or the single decoding unit 202 may be shared in a time division manner.

As various kinds of encoding parameters such as the level number of the wavelet transform process, the encoding parameters determined and supplied in the encoding apparatus 100 are used.

In this way, the decoding apparatus 200 can acquire the decoded image by appropriately decoding the single code stream formed by multiplexing the respective code streams acquired by dividing the code stream encoded by the encoding apparatus 100, that is, the input image, into two images in the bit depth direction and encoding the images.

[Configuration of Decoding Unit]

Figure 17:
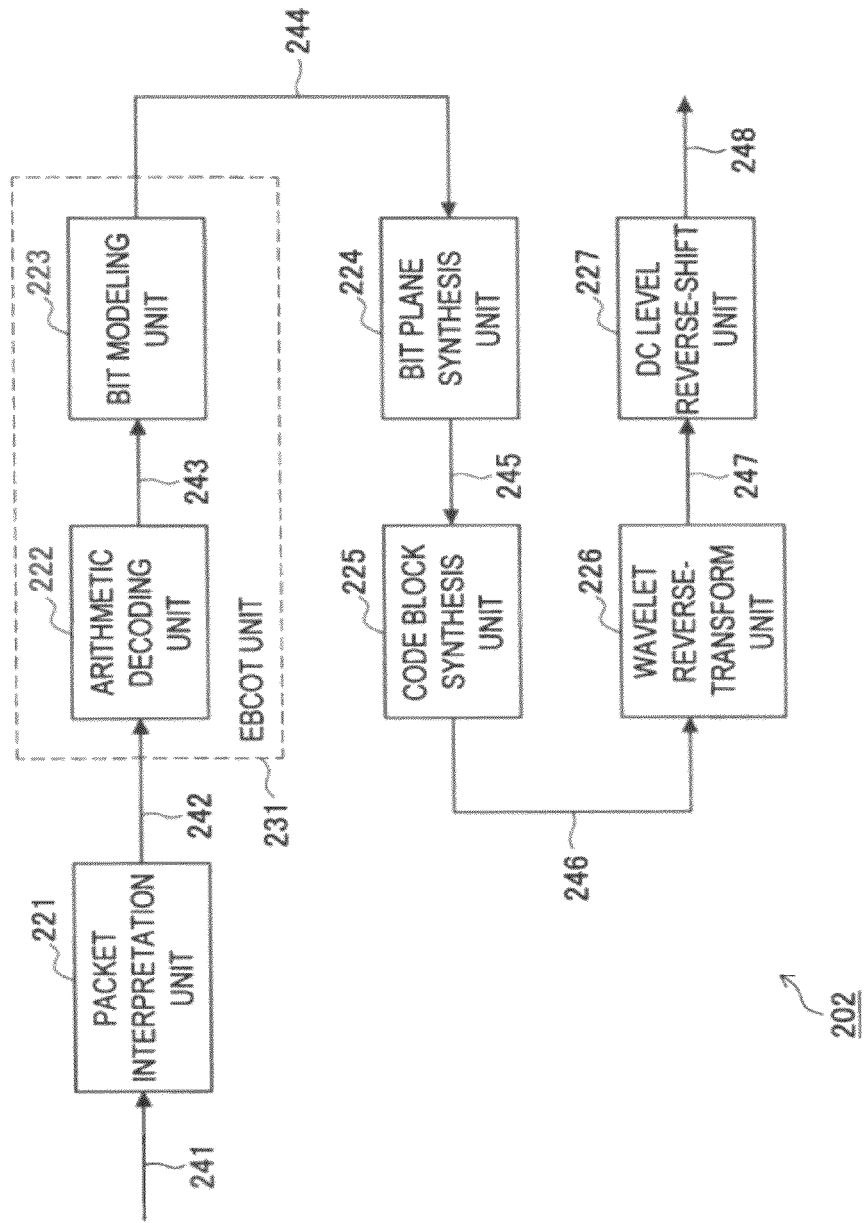
FIG. 17 is a block diagram illustrating an example of the main configuration of a JPEG 2000 decoding unit.

FIG. 17 is a block diagram illustrating an example of the main configuration of the decoding unit 202. The decoding unit 202 corresponds to the encoding unit 102 shown in FIG. 4 and decodes the code stream generated through the encoding process by the encoding unit 102. As shown in FIG. 17, the decoding unit 202 includes a packet interpretation unit 221, an arithmetic decoding unit 222, a bit modeling unit 223, a bit plane synthesis unit 224, a code block synthesis unit 225, a wavelet reverse-transform unit 226, and a DC level reverse-shift unit 227.

The packet interpretation unit 221 interprets the packet supplied from the encoding apparatus 100, as indicated by an arrow 241, and supplies the code stream to the arithmetic decoding unit 222, as indicated by an arrow 242.

The arithmetic decoding unit 222 and the bit modeling unit 223 operate as an EBCOT unit 231 and execute an entropy decoding process, which is called EBCOT defined in, for example, the JPEG 2000 scheme, on the input code stream.

The arithmetic decoding unit 222 decodes the code stream in accordance with the method corresponding to that of the arithmetic encoding unit 137 and supplies a context to the bit modeling unit 223, as indicated by an arrow 243. The bit modeling unit 223 generates a wavelet coefficient developed into the bit plane in accordance with the method corresponding to that of the bit modeling unit 136. The bit modeling unit 223 supplies the coefficient data for each generated bit plane to the bit plane synthesis unit 224, as indicated by an arrow 244.

The bit plane synthesis unit 224 synthesizes the wavelet coefficients developed into the bit planes. The bit plane synthesis unit 224 supplies the wavelet coefficients synthesized by bit plane to the code block synthesis unit 225, as indicated by an arrow 245.

The code block synthesis unit 225 generates the coefficient data of the code block unit using the supplied bit planes and further synthesizes the wavelet coefficients to generate the coefficient data for each sub-band. The code block synthesis unit 225 supplies the coefficient data to the wavelet reverse-transform unit 226, as indicated by an arrow 246.

The wavelet reverse-transform unit 226 executes a wavelet reverse-transform process on the supplied wavelet coefficient to generate the image data of a baseband. The wavelet reverse-transform unit 226 supplies the generated image data of the baseband to the DC level reverse-shift unit 227, as indicated by an arrow 247.

The DC level reverse-shift unit 227 executes a DC level reverse-shift process of returning the DC component of the image data to the origin by the amount shifted by the DC level shift unit 131. The DC level reverse-shift unit 227 outputs the image data (decoded image data) subjected to the DC level reverse-shift process to the outside of the decoding unit 202, as indicated by an arrow 248.

[Flow of Bit Depth Division Decoding Process]

Next, each process executed by the decoding apparatus 200 described above will be described below. First, an example of the flow of the bit depth division decoding process will be described with reference to the flowchart of FIG. 18.

When the code stream encoded by the encoding apparatus 100 is supplied, the decoding apparatus 200 starts the bit depth division decoding process.

When the bit depth division decoding process starts, the code stream division unit 201 divides the multiplexed code stream into two code streams based on the multiplexing information corresponding to the supplied code stream in step S201. That is, the code stream is divided into the code stream of the image with the high-order bits of the bit depth and the code stream of the image with the low-order bits of the bit depth.

In step S202, the decoding units 202 decode the respective code streams divided in step S201 in accordance with the decoding method (for example, JPEG 2000) corresponding to the encoding method of the encoding units 102.

In step S203, the bit depth synthesis unit 203 synthesizes the respective image data decoded in step S202 in the bit depth direction. That is, the bit depth synthesis unit 203 synthesizes the respective pixel values of the decoded images 214 and 215 by setting the pixel values of the decoded image 214 as the high-order bits and the pixel values of the decoded image 215 as the low-order bits.

When the decoded image 216 is generated, the bit depth synthesis unit 203 ends the bit depth division decoding process.

[Flow of Decoding Process]

Figure 18:
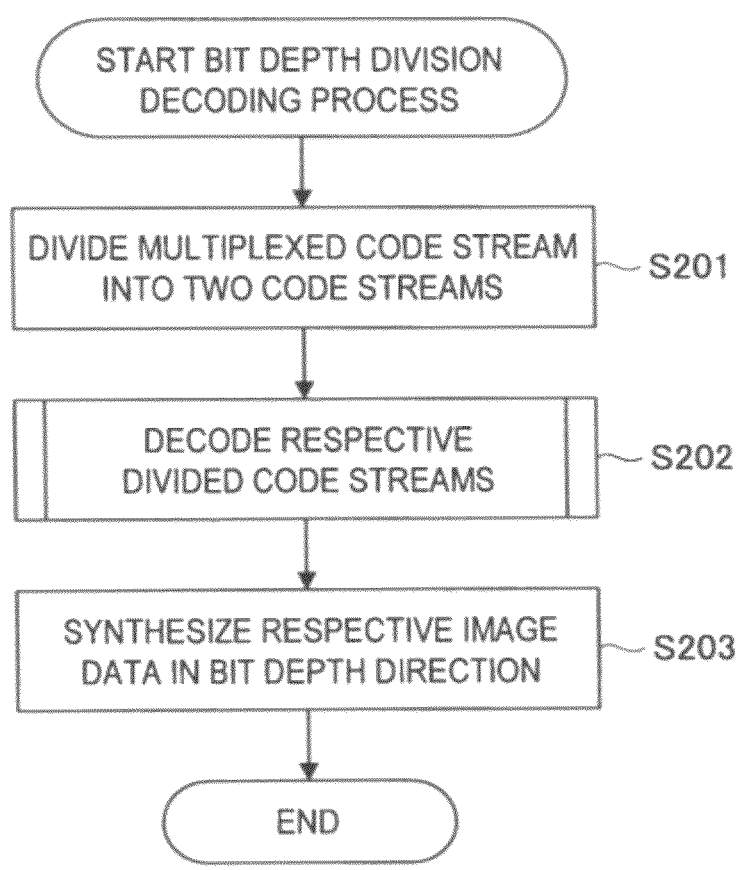
FIG. 18 is a flowchart illustrating an example of a bit depth division decoding process.
Figure 19:
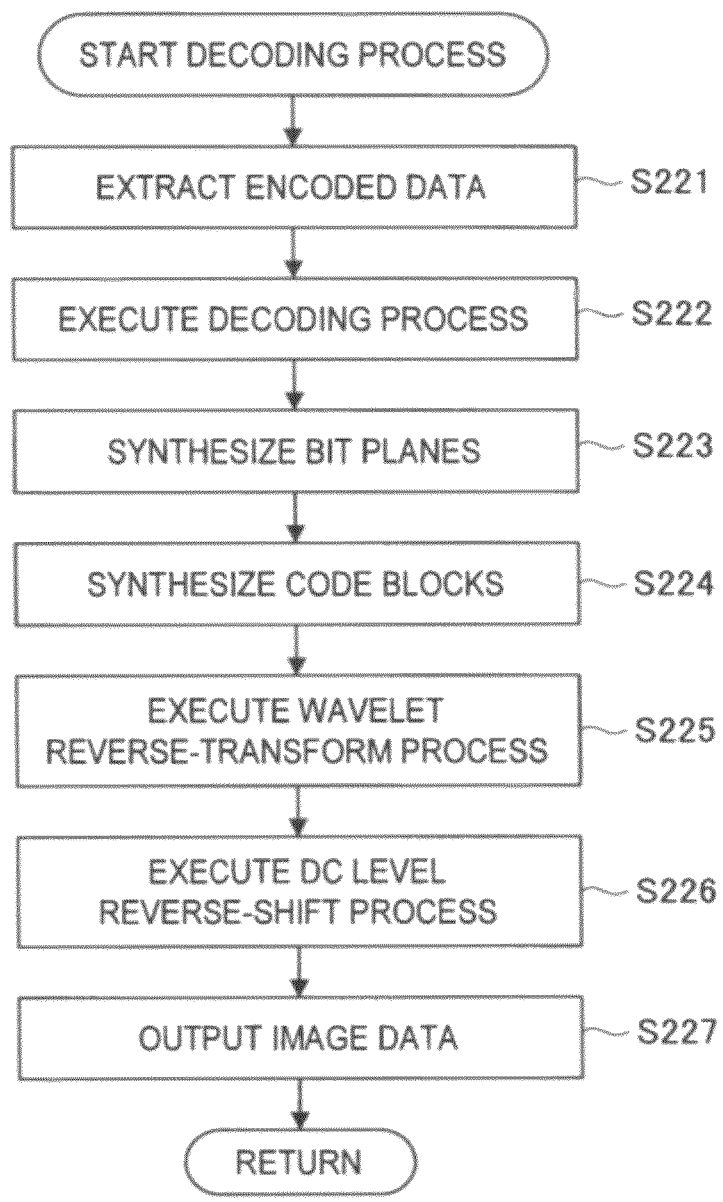
FIG. 19 is a flowchart illustrating an example of the flow of the decoding process.

Next, an example of the detailed flow of the decoding process executed in step S202 of FIG. 18 will be described with reference to the flowchart of FIG. 19.

When the decoding process starts, the packet interpretation unit 221 extracts encoded data from the acquired packet in step S221.

In step S222, the EBCOT unit 231 decodes the encoded data extracted in step S221. In step S223, the bit plane synthesis unit 224 synthesizes the bit planes of the coefficient data obtained through the decoding process to generate the coefficient data for each code block. In step S224, the code block synthesis unit 225 synthesizes the code blocks of the coefficient data for each code block to generate the coefficient data for each sub-band.

In step S225, the wavelet reverse-transform unit 226 executes the wavelet reverse-transform process on the coefficient data for each sub-band to generate the image data of the baseband. Further, when the coefficient data is quantized in the encoding apparatus 100, the coefficient data is subjected to reverse quantization corresponding to the quantization and then is subjected to the wavelet reverse-transform process.

In step S226, the DC level reverse-shift unit 227 executes a DC level reverse-shift process on the image data of the baseband obtained through the wavelet reverse-transform process.

In step S227, the decoding unit 202 outputs the image data subjected to the DC level reverse-shift process as the decoded image data to the bit depth synthesis unit 203. When the process in step S227 ends, the decoding unit 202 ends the decoding process.

In this way, the decoding apparatus 200 can acquire the decoded image of one system by dividing the code stream into two code streams, decoding the respective divided code streams, and synthesizing the respective decoded images obtained through the decoding process in the bit depth direction.

That is, the decoding apparatus 200 can appropriately decode the code stream generated by the encoding apparatus 100. Accordingly, the decoding apparatus 200 can improve the encoding efficiency in the encoding process of the image.

3. Third Embodiment

[Configuration of Encoding Apparatus]

The case has hitherto been described in which the image is divided into two images. However, the image may be divided into any number of images. For example, the image may be divided into three images. Further, the division positions (bits serving as the boundary at the dividing time) may arbitrarily be determined.

However, when the decoding apparatus decoding the code stream of the image know no division number or division positions of the image in the encoding apparatus, the encoding apparatus needs to notify the decoding apparatus of the division number or the division positions of the image.

Figure 20:
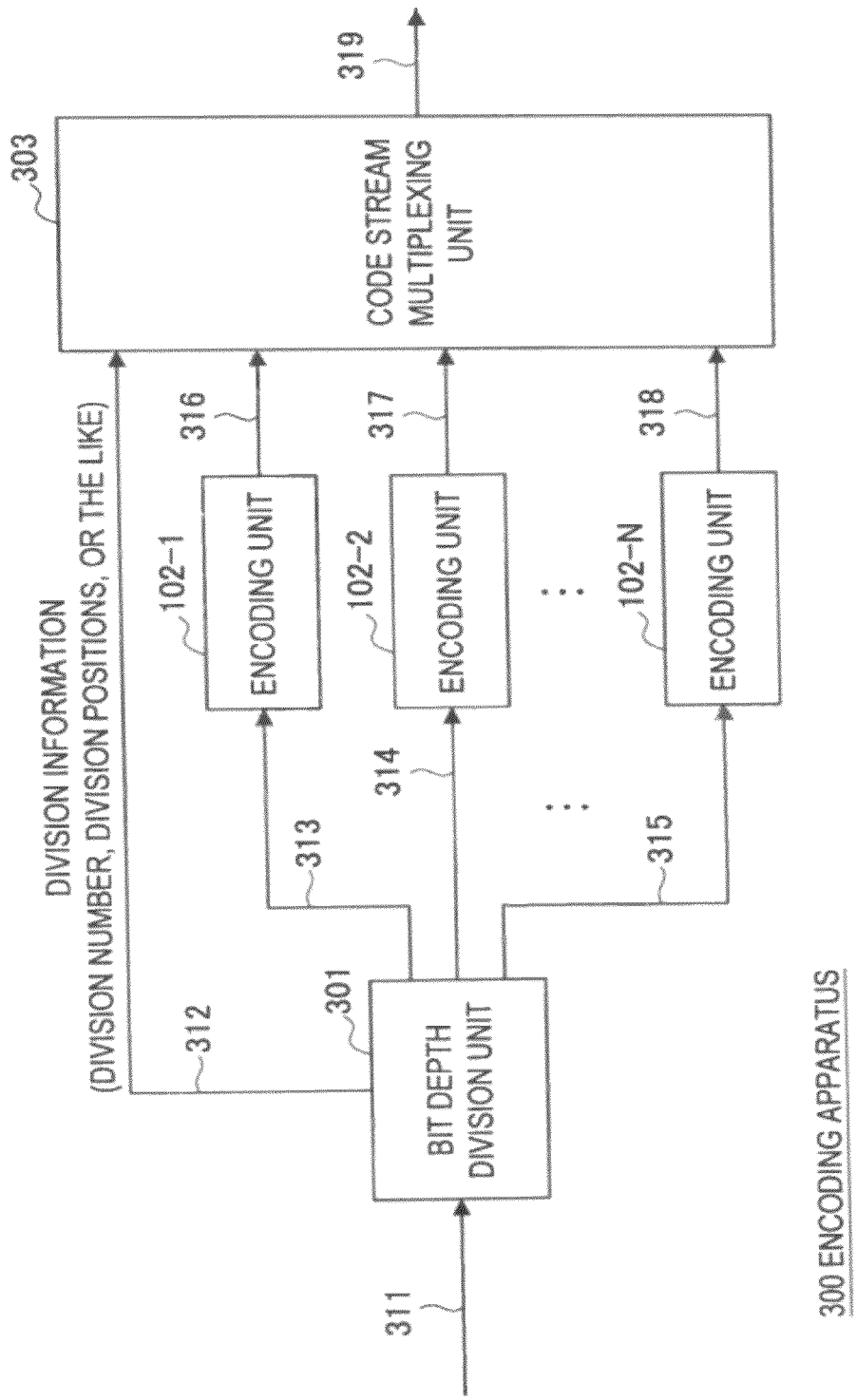
FIG. 20 is a block diagram illustrating an example of the main configuration of an encoding apparatus to which an embodiment of the disclosure is applied.

FIG. 20 is a block diagram illustrating an example of the main configuration of the encoding apparatus to which an embodiment of the disclosure is applied. An encoding apparatus 300 shown in FIG. 20 is an encoding apparatus that corresponds to the encoding apparatus 100 shown in FIG. 2 and basically the same configuration as that of the encoding apparatus 100 so as to execute the same processes. However, the encoding apparatus 300 is different from the encoding apparatus 100 in that the encoding apparatus 300 divides the input image into N (where N is any natural number) images in the bit depth direction, encodes the N images, and multiplexes the N images. Further, the encoding apparatus 300 is different from the encoding apparatus 100 in that the encoding apparatus 300 outputs not only the code stream generated from the input image but also outputs information (division information) regarding the division number or the division positions.

As shown in FIG. 20, the encoding apparatus 300 includes a bit depth division unit 301 instead of the bit depth division unit 101 and a code stream multiplexing unit 303 instead of the code stream multiplexing unit 103.

The bit depth division unit 301 divides an input image 311 into N images in the bit depth direction and supplies the divided images to the encoding units 102, respectively.

For example, the bit depth division unit 301 supplies, to the encoding unit 102-1, an image 313 with the first bit group from the high-order side among the divided images and supplies, to the encoding unit 102-2, an image 314 with the second bit group from the high-order side among the divided images.

The bit depth division unit 301 executes the same process on images with the third bit group and the subsequent bit groups from the high-order side. For example, the bit depth division unit 301 supplies, to the encoding unit 102-N, an image 315 with the bit group of the lowest-order side (N-th group from the high-order side).

The bit depth division unit 301 supplies the division information, which is information regarding the division that includes the division number and the division positions, to the code stream multiplexing unit 303.

Each encoding unit 102 encodes the image supplied from the bit depth division unit 301. That is, each encoding unit 102 can encode the image with the bit depth smaller than X bits, when the bit depth of the input image is X bits.

Each encoding unit 102 supplies each of the generated code streams (code streams 316 to 318) to the code stream multiplexing unit 303.

The code stream multiplexing unit 303 multiplexes the plurality of code streams supplied from the encoding units 102 to generate the code stream 319 of one system.

The code stream multiplexing unit 303 multiplexes not only the kinds of code streams supplied from the respective encoding units 102 but also division information 312 supplied from the bit depth division unit 301.

An arbitrary method can be used to multiplex the division information 312. For example, the code stream multiplexing unit 303 may multiplex the division information 312 as data together with the respective code streams or may multiplex the respective code streams and embed the division information 312 at a predetermined position of its header.

The division information 312 may be associated with the multiplexed code stream without being multiplexed. For example, the code stream multiplexing unit 303 may describe the division information 312 in the header or the like of the code stream of one system formed by multiplexing the respective code streams generated from the divided images, associate the division information 312 with the code stream, and output the division information 312 together with the code stream.

[Flow of Bit Depth Division Encoding Process]

Figure 21:
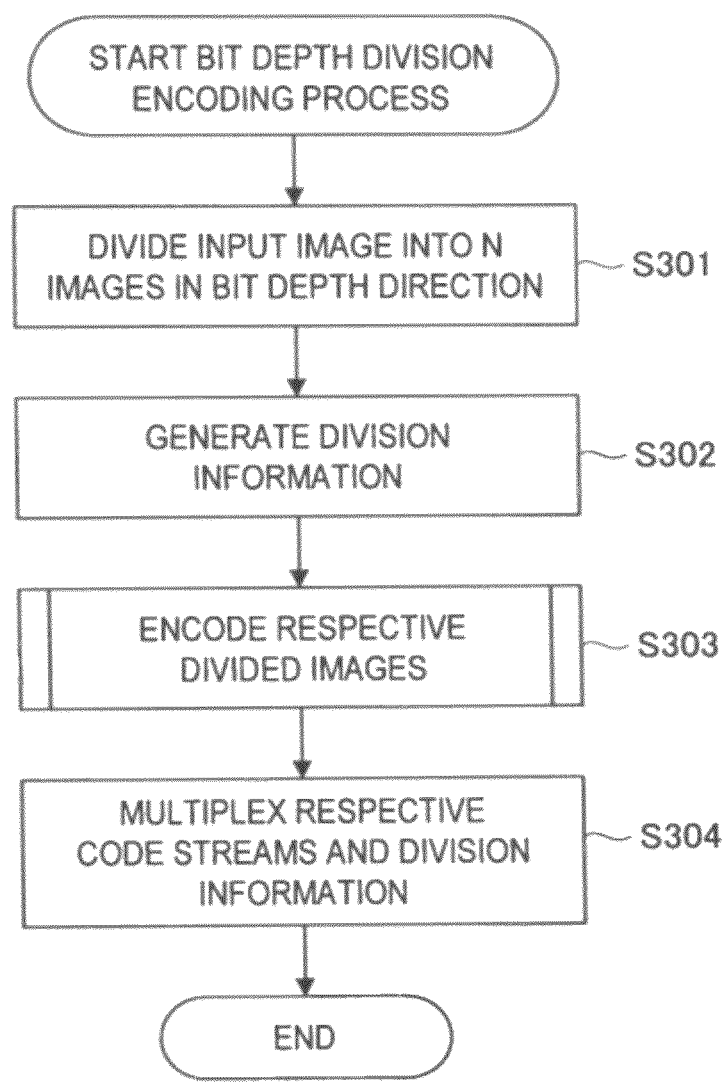
FIG. 21 is a flowchart illustrating an example of the flow of a bit depth division encoding process.

Next, an example of the flow of the above bit depth division encoding process will be described with reference to the flowchart of FIG. 21. This bit depth division encoding process is basically executed in the same way as the way described with reference to the flowchart of FIG. 13.

In step S301, however, the bit depth division unit 301 divides the input image 311 into N images in the bit depth direction. In step S302, the bit depth division unit 301 generates the division information 312 regarding the division number or the division positions.

In step S303, the encoding units 102 encode the divided images, respectively. In step S304, the code stream multiplexing unit 303 multiplexes the code streams (for example, the code streams 316 to 318) generated into the images in step S303 and the division information 312 generated in step S302 to generate the code stream 319 of one system and outputs the code stream 319. When the code stream multiplexing unit 303 outputs the code stream 319, the code stream multiplexing unit 303 ends the bit depth division encoding process.

As described above, the encoding apparatus 300 can divide the image into three or more images in the bit depth direction and encode the images, thereby improving the encoding efficiency.

Further, since the encoding apparatus 300 can supply the division information indicating the division number, the division positions, or the like together with the code stream to the decoding apparatus, it is possible to appropriately decode the code stream generated by the encoding apparatus 300.

In the encoding apparatus 300, as in the first embodiment, the single encoding unit 102 may be used in a time division manner to encode the divided images of a plurality of systems.

4. Fourth Embodiment

[Configuration of Decoding Apparatus]

Figure 22:
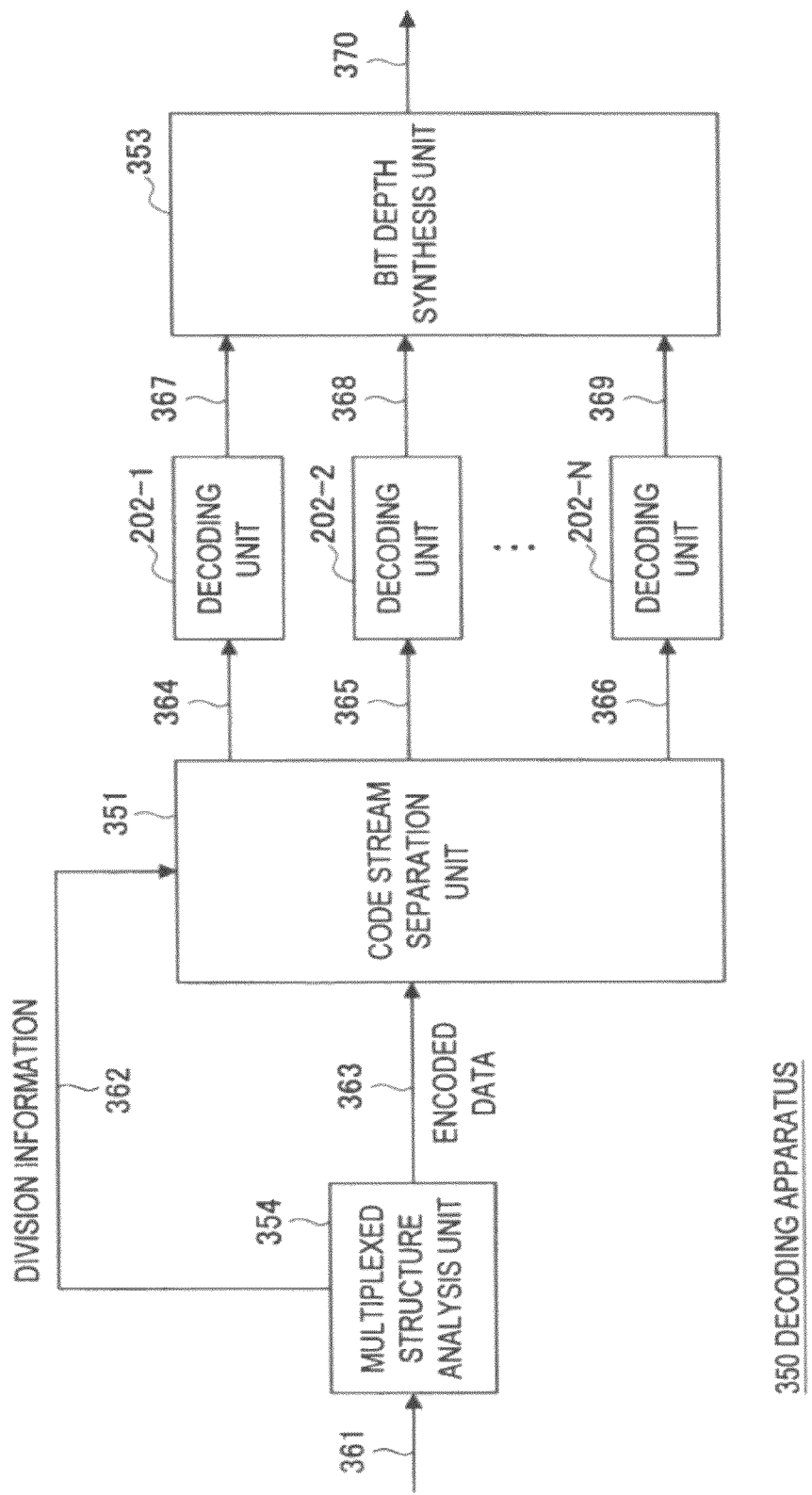
FIG. 22 is a block diagram illustrating an example of the main configuration of a decoding apparatus to which an embodiment of the disclosure is applied.

Next, a decoding apparatus corresponding to the encoding apparatus 300 will be described. FIG. 22 is a block diagram illustrating an example of the main configuration of the decoding apparatus to which an embodiment of the disclosure is applied. A decoding apparatus 350 shown in FIG. 22 corresponds to the encoding apparatus 300 and appropriately decodes the code stream generated by the encoding apparatus 300.

As shown in FIG. 22, the decoding apparatus 350 basically has the same configuration as that of the decoding apparatus 200 described with reference to FIG. 15 according to the second embodiment and executes the same processes.

However, the decoding apparatus 350 includes a code stream separation unit 351 instead of the code stream separation unit 201, N (where N is any natural number) decoding units 202, and a bit depth synthesis unit 353 instead of the bit depth synthesis unit 203.

The decoding apparatus 350 further includes a multiplexing structure analysis unit 354.

The multiplexing structure analysis unit 354 analyzes a code stream 361 supplied from the encoding apparatus 300, extracts division information 362, and supplies the division information to the code stream separation unit 351. Further, the multiplexing structure analysis unit 354 supplies encoded data 363, which is the code stream from which the division information 362 is extracted, to the code stream separation unit 351.

The code stream separation unit 351 divides the encoded data 363 based on the division information 362 to generate a plurality (N systems) of code streams before the multiplexing. The code stream separation unit 351 supplies the divided code streams to the corresponding decoding units 202, respectively.

For example, the code stream separation unit 351 supplies, to the decoding unit 202-1, a code stream 364 generated from an image with the first bit group from the high-order side among the code streams of the N systems and supplies, to the decoding unit 202-2, a code stream 365 generated from an image with the second bit group from the high-order side among the code streams. Further, the code stream separation unit 351 supplies, to the decoding unit 202-N, a code stream 366 generated from an image with the N-th bit group from the high-order side.

The decoding units 202 decode the supplied code streams, respectively, and supply decoded images (decoded images 367 to 369) to the bit depth synthesis unit 353. The bit depth synthesis unit 353 synthesizes the supplied decoded images in the bit depth direction to generate a decoded image 370 of one system with the same bit depth as that of the input image of the encoding apparatus 300.

[Flow of Bit Depth Division Decoding Process]

Figure 23:
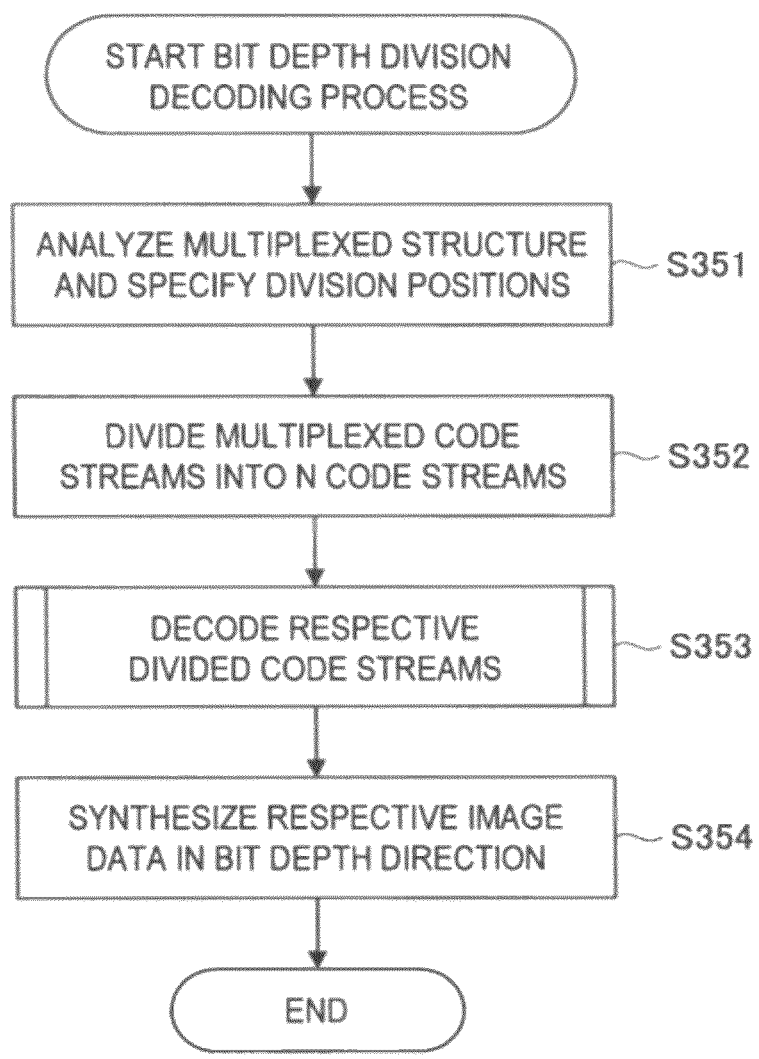
FIG. 23 is a flowchart illustrating an example of the flow of a bit depth division decoding process.

Next, an example of the flow of this bit depth division decoding process will be described with reference to the flowchart of FIG. 23.

When the bit depth division decoding process starts, the multiplexed structure analysis unit 354 analyzes the multiplexed structure and specifies the division positions in step S351. In step S352, the code stream separation unit 351 divides the multiplexed code stream into N code streams based on the division positions specified in step S351.

In step S353, the decoding units 202 decode the divided code streams, respectively. In step S354, the bit depth synthesis unit 353 synthesizes the respective decoded image data in the bit depth direction to generate a decoded image 370 of one system.

When the bit depth synthesis unit 353 generates the decoded image 370, the bit depth synthesis unit 353 ends the bit depth division decoding process.

In this way, the decoding apparatus 350 can appropriately decode the code stream generated by the encoding apparatus 300 more easily. Accordingly, the decoding apparatus 350 can improve the encoding efficiency in the encoding process of the image.

5. Fifth Embodiment

[Configuration of Encoding Apparatus]

The encoding process has hitherto been executed in accordance with the lossless encoding method, but the disclosure is not limited thereto. Instead, a lossy encoding method may be used.

Figure 24:
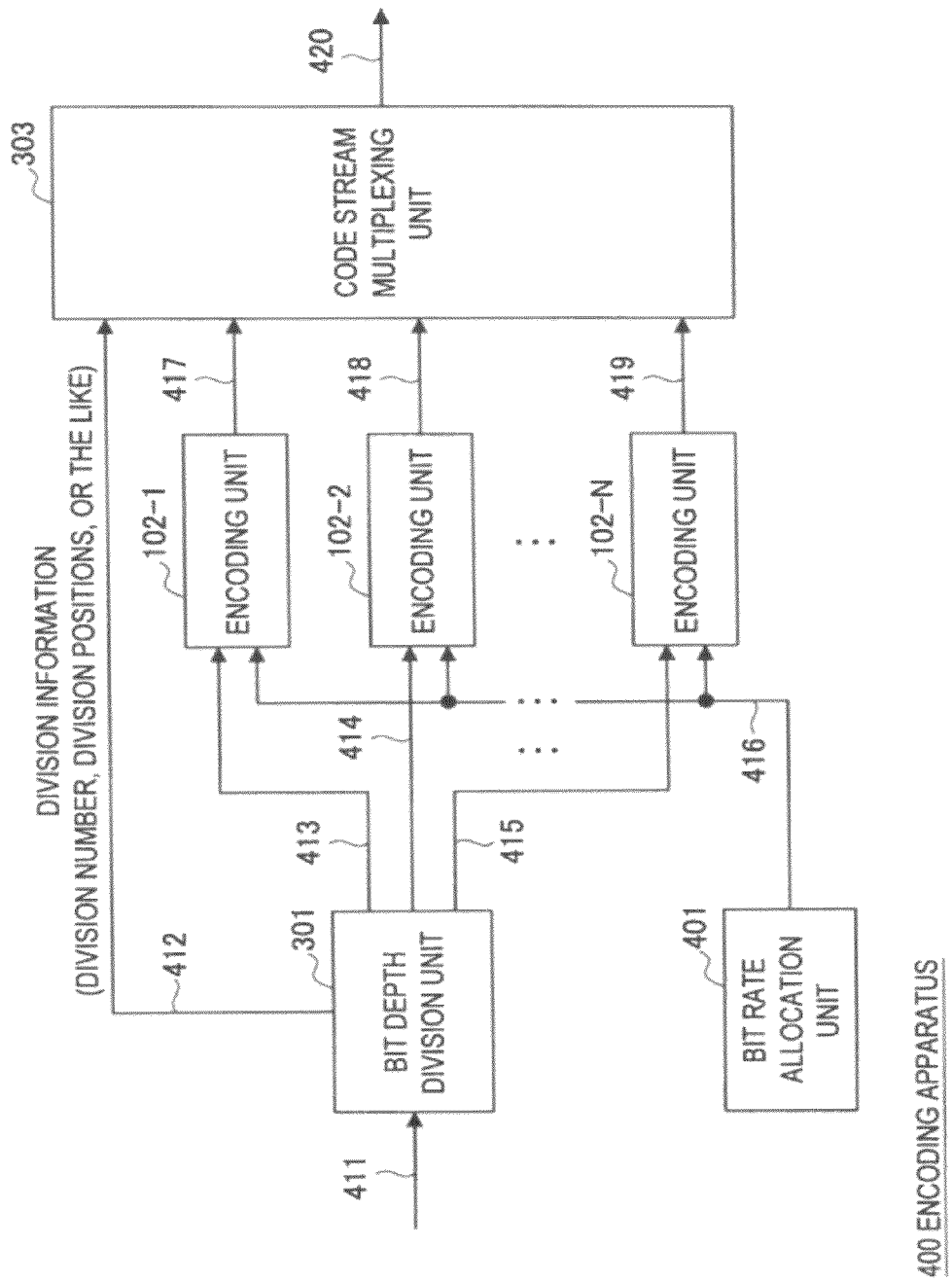
FIG. 24 is a block diagram illustrating an example of the main configuration of an encoding apparatus to which an embodiment of the disclosure is applied.

FIG. 24 is a block diagram illustrating an example of the main configuration of an encoding apparatus to which an embodiment of the disclosure is applied. An encoding apparatus 400 shown in FIG. 24 is an encoding apparatus which is basically the same as the encoding apparatus 300 described with reference to FIG. 20, but is different from the encoding apparatus 300 in that the encoding apparatus 400 executes an encoding process in accordance with a lossy encoding method.

As shown in FIG. 24, the encoding apparatus 400 includes a bit rate allocation unit 401 in addition to the configuration of the encoding apparatus 300.

The bit rate allocation unit 401 designates a target bit rate (or a target compression rate) for each encoding unit 102. The encoding unit 102 executes an encoding process while controlling the rate so as to be close to the designated target bit rate (or the target compression rate).

In this way, the encoding apparatus 400 can control the rate. That is, the encoding apparatus 400 can improve the quality of the decoded image by generating the code stream with the same bit rate as the rate of, for example, a case where an image is encoded without being divided.

For example, in the example shown in FIG. 3, the image data (Image_A) is set to the code stream (Codestream_A) generated through a lossy encoding process with a target bit rate (Rate-A), the image data (Image_B) is set to the code stream (Codestream_B) generated through a lossy encoding process with a target bit rate (Rate-B), and the image data (Image_C) is set to the code stream (Codestream_C) generated through a lossy encoding process with a target bit rate (Rate-C).

Further, the decoded image of the code stream (Codestream_A) is set to Decode_Image_A, the decoded image of the code stream (Codestream_B) is set to Decode_Image_B, and the decoded image of the code stream (Codestream_C) is set to Decode_Image_C.

When the bit rate allocation unit 401 satisfies the relation of "Rate-A=Rate_B+Rate_C," the image qualities of the respective images are as follows.

Image Quality of Decode_Image_*A*<Image Qualities of Decode_Image_*B*+Decode_Image_*C*

[Flow of Bit Depth Division Encoding Process]

Figure 25:
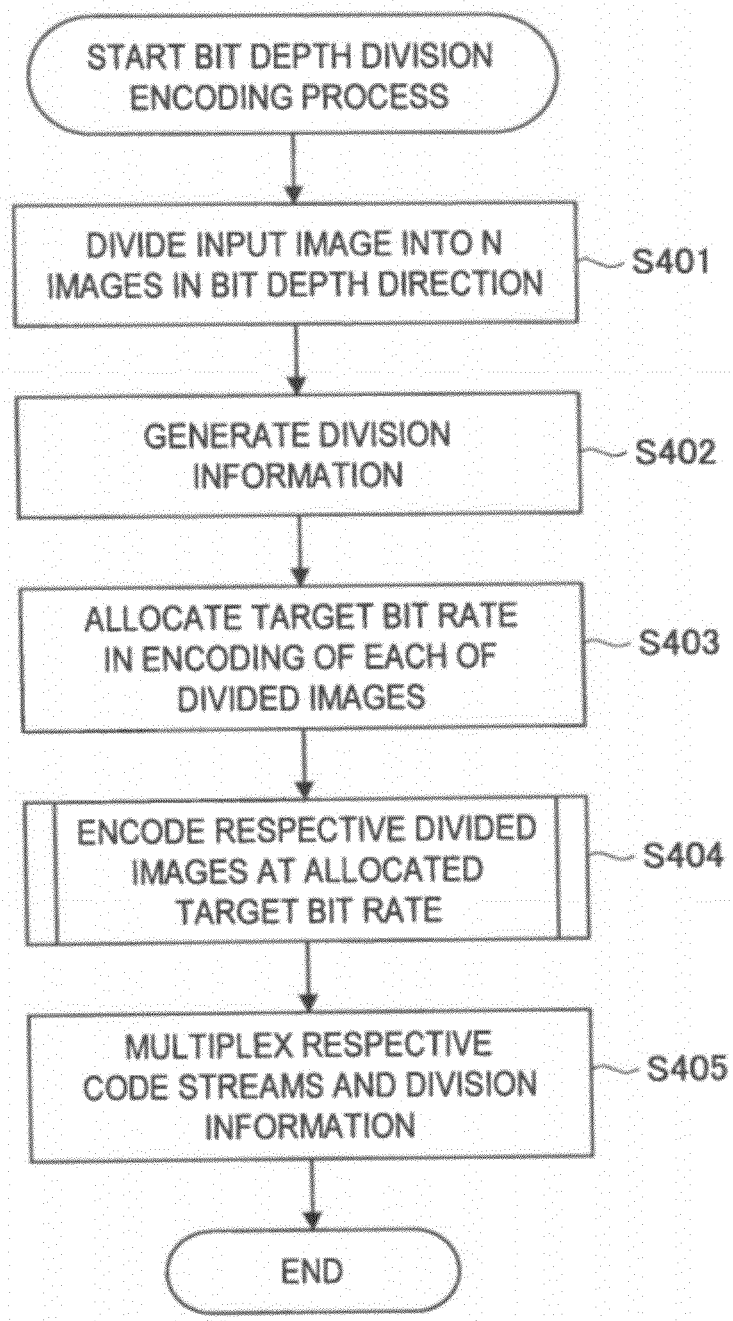
FIG. 25 is a flowchart illustrating an example of the flow of a bit depth division encoding process.

An example of the flow of the bit depth division encoding process executed by the encoding apparatus 400 will be described with reference to the flowchart of FIG. 25.

When the bit depth division encoding process starts, the bit depth division unit 301 divides the input image into N images in the bit depth direction in step S401 and generates the division information in step S402.

In step S403, the bit rate allocation unit 401 allocates the target bit rate in the encoding process of each of the divided images.

In step S404, the encoding units 102 encode the respective divided images at the allocated target bit rate.

In step S405, the code stream multiplexing unit 303 multiplexes the respective code streams and the division information. When the process of step S405 ends, the code stream multiplexing unit 303 ends the bit depth division encoding process.

In this way, since the encoding apparatus 400 can set the target bit rate, the encoding apparatus 400 can improve the quality of the decoded image instead of improving the encoding efficiency.

Further, the bit rate allocation unit 401 can independently allocate the target bit rate for the respective encoding units 102. For example, the bit rate allocation unit 401 may allocate many bit rates to an image with a generally higher importance and the high-order bits, and may reduce the bit rates allocated to an image with a generally lower importance and the low-order bits.

Even when the lossy encoding method is used, as in the above-described embodiment, it is possible to execute the encoding process more efficiently by setting the number of the wavelet transform processes of the high-order bit image (Image_B) to be large and the number of the wavelet transform processes of the low-order bit image (Image_C) to be small.

The decoding apparatus executes the same encoding process as the lossless encoding method and the description thereof will not be repeated.

6. Sixth Embodiment

[Configuration of Encoding Apparatus]

In general, the value of the bit near the highest-order bit is apt to become zero, as the bit depth becomes higher. Since a bit (zero bit) with the zero value on the side of the high-order bits continued from the highest-order bit is generally unnecessary information (information with a low importance), encoding of this bit may be omitted in order to improve the encoding efficiency.

Figure 26:
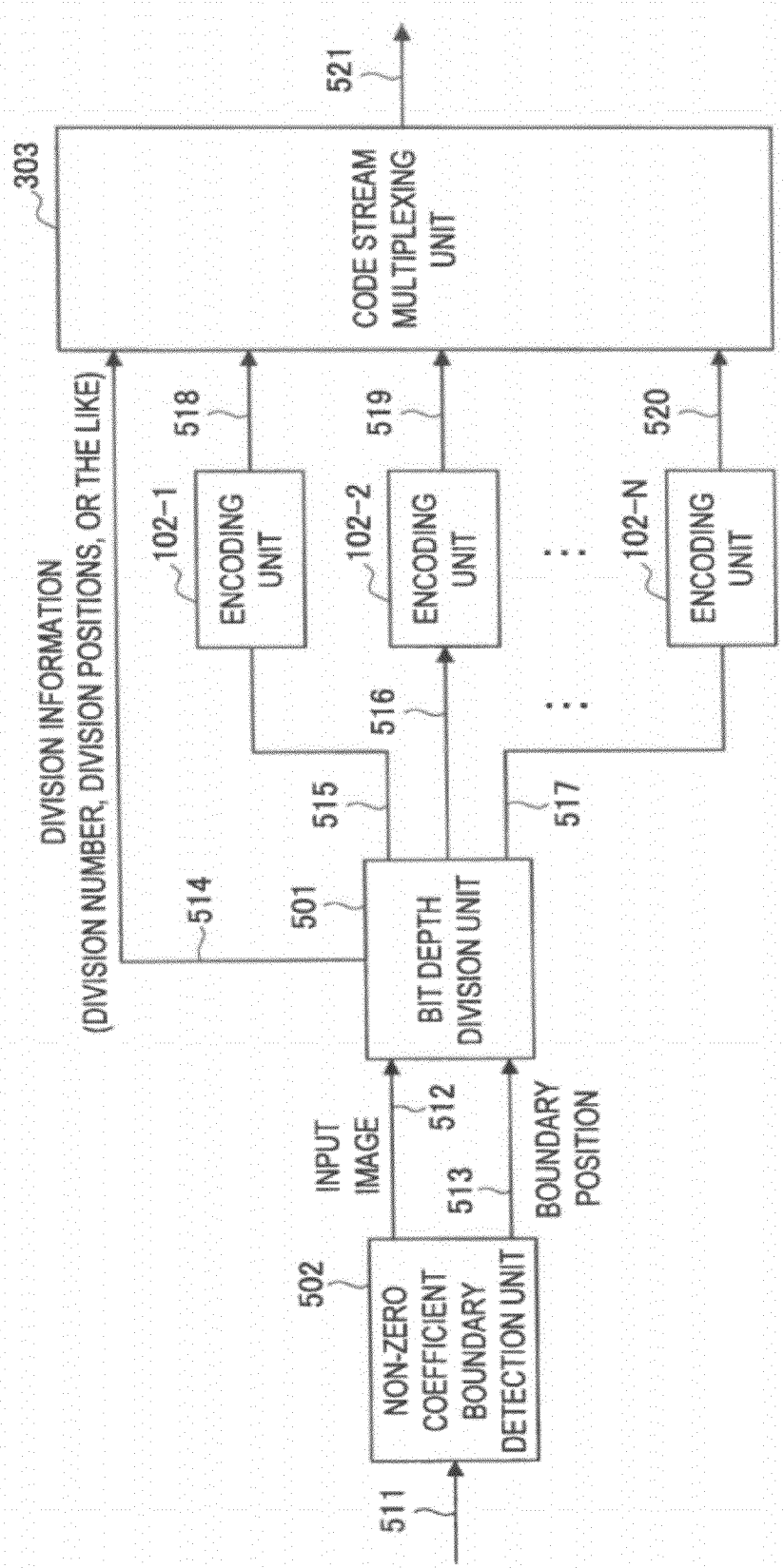
FIG. 26 is a block diagram illustrating an example of the main configuration of an encoding apparatus to which an embodiment of the disclosure is applied.

FIG. 26 is a block diagram illustrating an example of the main configuration of an encoding apparatus to which an embodiment of the disclosure is applied. An encoding apparatus 500 shown in FIG. 26 is basically the same encoding apparatus as the encoding apparatus 300 described with reference to FIG. 20, but includes a bit depth division unit 501 instead of the bit depth division unit 301, and a non-zero coefficient boundary detection unit 502.

The non-zero coefficient boundary detection unit 502 analyzes an input image 511 to detect a bit (non-zero coefficient boundary) which is the first bit to disconnect the continuous zero bits from the highest-order bit of the bit depth in each pixel. That is, the non-zero coefficient boundary detection unit 502 detects the highest-order bit among the non-zero bits, in which the value of each pixel is not zero, as a non-zero coefficient boundary.

When the non-zero coefficient boundary is detected, a plurality of pixels may be set as a processing unit. That is, the non-zero coefficient boundary detection unit 502 may execute the detecting process on a predetermined pixel group such as a macro-block, a slice, or the entire frame for, as the non-zero coefficient boundary, the highest-order bit of the non-zero bit (i.e., the bit with a non-zero value) appeared at least in one pixel among the pixel group of the processing unit.

The non-zero coefficient boundary detection unit 502 supplies an input image (input image 512) and the position (boundary position 513) of the detected non-zero coefficient to the bit depth division unit 501.

The bit depth division unit 501 determines the division positions based on the non-zero coefficient boundaries detected by the non-zero coefficient boundary detection unit 502 and divides the input image into (N+1) images in the bit depth direction. That is, the bit depth division unit 501 divides the non-zero coefficient boundary as one division position and divides the image with a part (the low-order bits of the non-zero coefficient boundary) other than the zero-bits continuous from the highest-order bit into N images.

When the non-zero coefficient boundary becomes the highest-order bit, that is, when the highest-order bit is the non-zero bit, there is no highest-order image (zero coefficient image) with the zero bits. Therefore, the process of dividing the non-zero coefficient boundary as the division position is not performed and the input image is divided into the N images in the bit depth direction.

The bit depth division unit 501 supplies division information 514 indicating the division number or the division positions to the code stream multiplexing unit 303 and supplies, to the encoding units 102, N images (images 515 to 517) from the low-order side excluding the highest-order image (the zero coefficient image) with the zero bits among the (N+1) images obtained through the dividing in the bit depth direction.

The encoding units 102 encode the supplied images and supply code streams (code streams 518 to 520) to the code stream multiplexing unit 303.

The code stream multiplexing unit 303 multiplexes the N code streams and the division information, and outputs the code streams as a code stream of one system, as in the third embodiment.

[Flow of Bit Depth Division Encoding Process]

Figure 27:
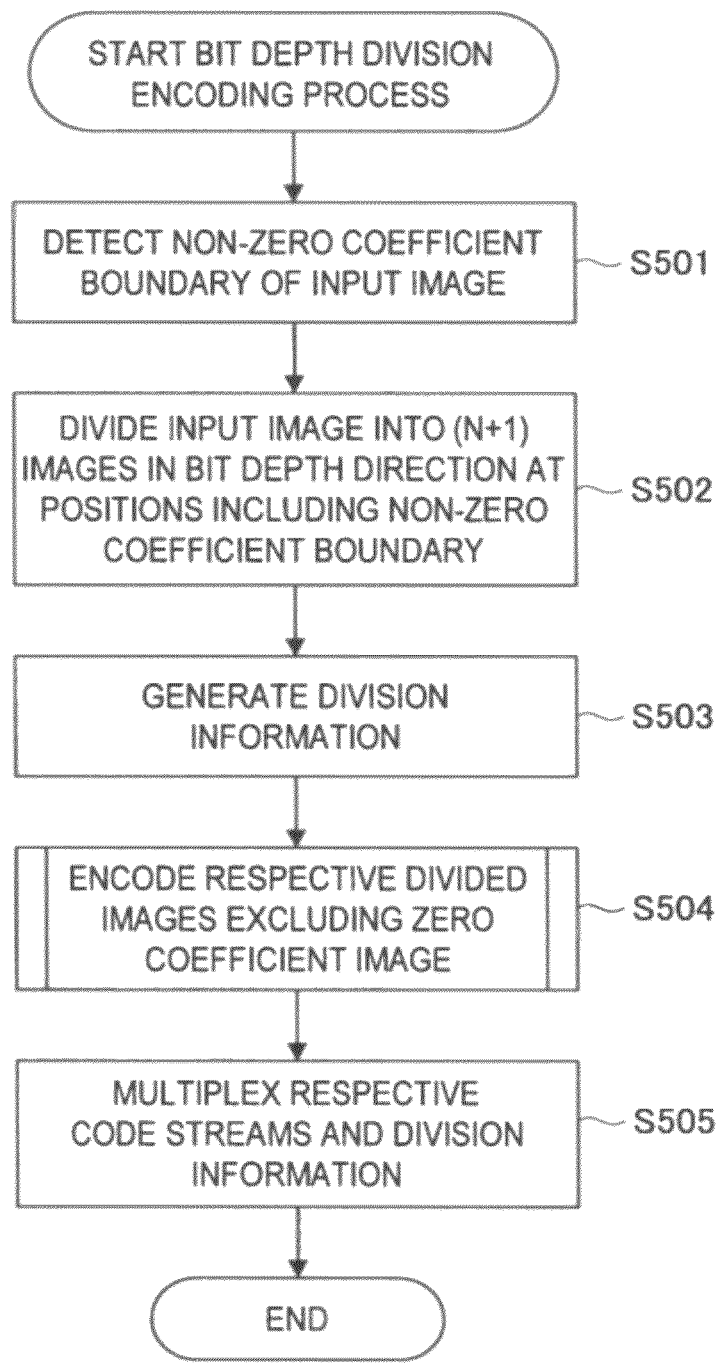
FIG. 27 is a flowchart illustrating an example of the flow of a bit depth division encoding process.

An example of the flow of this bit depth division encoding process will be described with reference to the flowchart of FIG. 27.

When the bit depth division encoding process starts, the non-zero coefficient boundary detection unit 502 detects the non-zero coefficient boundaries of the input image in step S501. In step S502, the bit depth division unit 301 divides the input image into (N+1) images in the bit depth direction at the positions including the non-zero coefficient boundary detected in the process of step S501. In step S503, the bit depth division unit 301 generates the division information.

When the non-zero coefficient boundary becomes the highest-order bit, as described above, the bit depth division unit 301 divides the input image into N images in the bit depth direction at the positions excluding the non-zero coefficient boundary in step S502.

In step S504, the encoding units 102 encode the divided images excluding the highest-order image (zero coefficient image) among the divided images, respectively. In step S505, the code stream multiplexing unit 303 multiplexes the code streams generated through the process of step S504 and the division information. When the process of step S505 ends, the code stream multiplexing unit 303 ends the bit depth division encoding process.

In this way, the encoding apparatus 500 does not perform the encoding process on the zero bits and thus can execute the encoding process more efficiently.

7. Seventh Embodiment

[Configuration of Decoding Apparatus]

Figure 28:
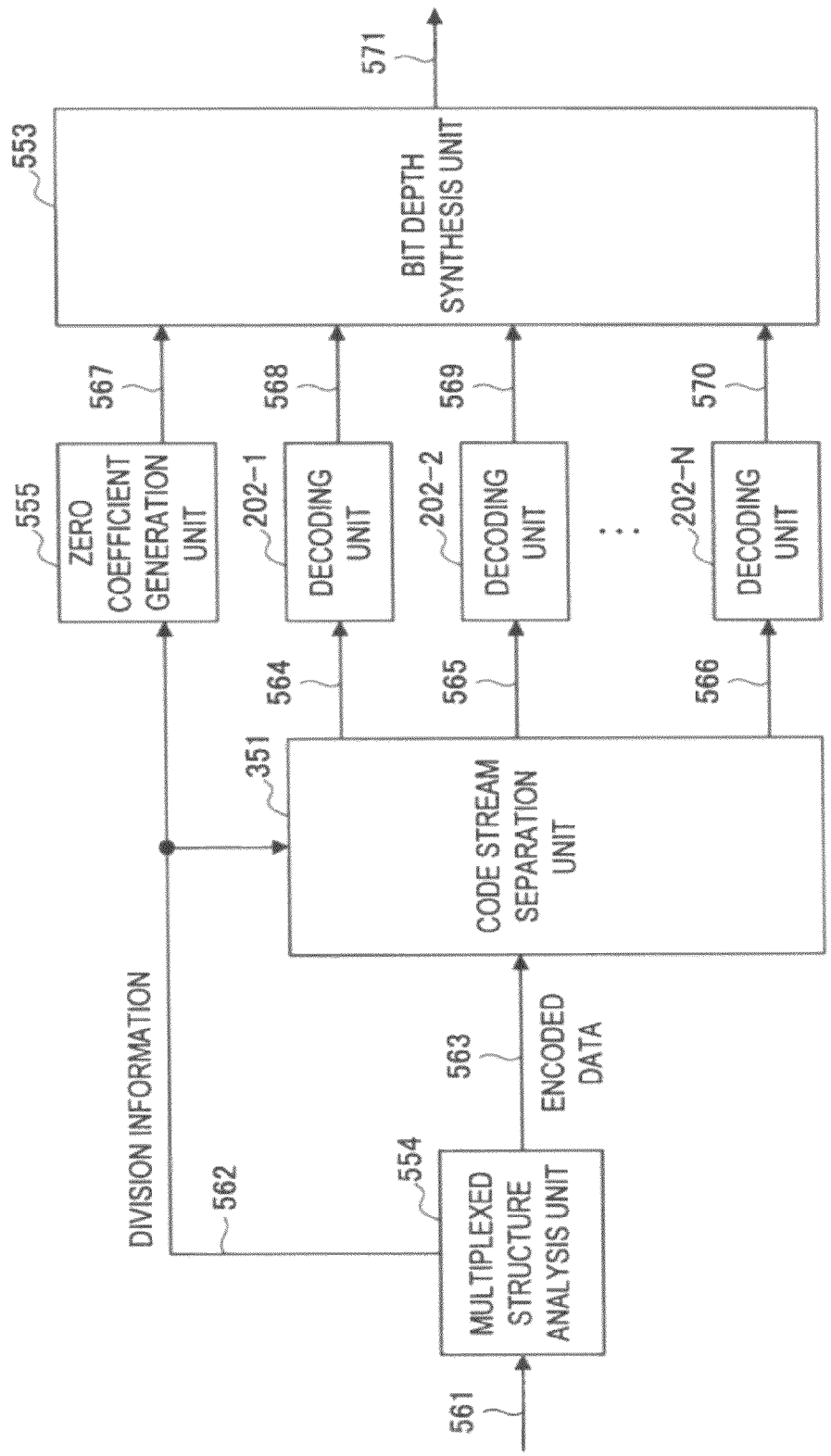
FIG. 28 is a block diagram illustrating an example of the main configuration of a decoding apparatus to which an embodiment of the disclosure is applied.

Next, a decoding apparatus corresponding to the encoding apparatus 500 will be described. FIG. 28 is a block diagram illustrating an example of the main configuration of the decoding apparatus to which an embodiment of the disclosure is applied. A decoding apparatus 550 shown in FIG. 28 corresponds to the encoding apparatus 500 and appropriately decodes the code stream generated by the encoding apparatus 500.

As shown in FIG. 22, the decoding apparatus 550 basically has the same configuration as that of the decoding apparatus 350 described with reference to FIG. 22 according to the fourth embodiment and executes the same processes.

However, the decoding apparatus 550 includes a bit depth synthesis unit 553 instead of the bit depth synthesis unit 353, a multiplexed structure analysis unit 554 instead of the multiplexed structure analysis unit 354, and a zero coefficient generation unit 555.

The multiplexed structure analysis unit 554 analyzes the structure of a code stream 561 supplied from the encoding apparatus 500, extracts division information 562, and supplies the division information 562 to the code stream separation unit 351 and the zero coefficient generation unit 555. Further, the multiplexed structure analysis unit 554 supplies encoded data 563, which is the code stream from which the division information 562 is extracted, to the code stream separation unit 351.

The code stream separation unit 351 divides the encoded data 563 based on the division information 562 to generate a plurality (N systems) of code streams before the multiplexing. The code stream separation unit 351 supplies the divided code streams to the corresponding decoding units 202, respectively.

For example, the code stream separation unit 351 supplies, to the decoding unit 202-1, a code stream 564 generated from an image with the first bit group from the high-order side among the code streams of the N systems and supplies, to the decoding unit 202-2, a code stream 565 generated from an image with the second bit group from the high-order side among the code streams. Further, the code stream separation unit 351 supplies, to the decoding unit 202-N, a code stream 566 generated from an image with the N-th bit group from the high-order side.

The decoding units 202 decode the supplied code streams, respectively, and supply the decoded image (decoded images 568 to 570) to the bit depth synthesis unit 353.

The zero coefficient generation unit 555 generates a zero coefficient image based on the division information supplied from the multiplexing structure analysis unit 554. The zero coefficient generation unit 555 generates an image with the upper-order bits from the highest-order division position among the division positions designated in the division information.

As described in the sixth embodiment, the encoding apparatus 500 does not perform the encoding process on the zero bits continuous from the highest-order bit in the bit depth direction. The zero coefficient generation unit 555 generates the zero coefficient image without executing the encoding process.

The zero coefficient generation unit 555 supplies a generated zero coefficient image 567 to the bit depth synthesis unit 553.

The bit depth synthesis unit 553 synthesizes the respectively supplied decoded images and the zero coefficient images in the bit depth direction and generates a decoded image 571 of one system with the same bit depth as that of the input image of the encoding apparatus 500.

[Flow of Bit Depth Division Decoding Process]

Figure 29:
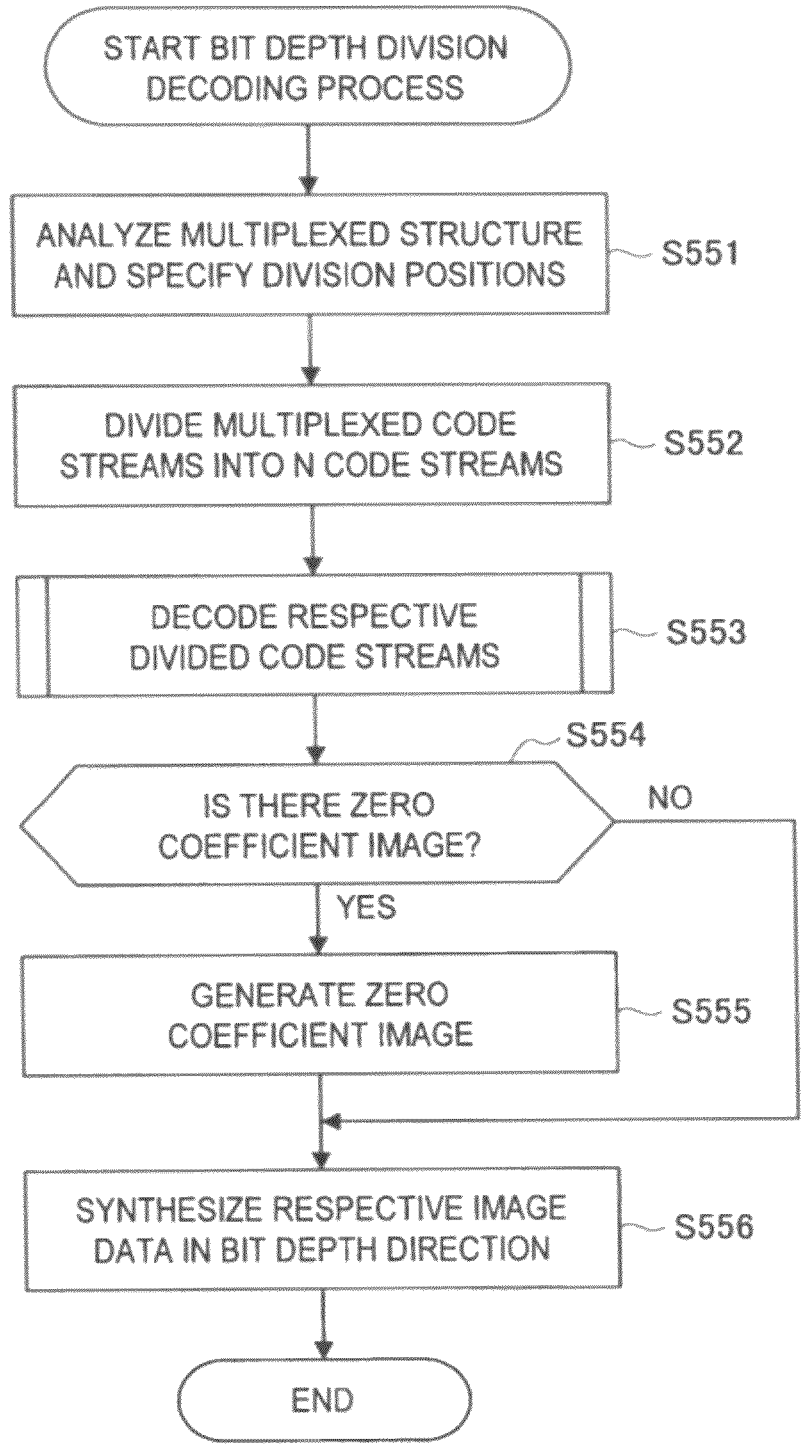
FIG. 29 is a flowchart illustrating an example of a bit depth division decoding process.

Next, an example of the flow of this bit depth division decoding process will be described with reference to the flowchart of FIG. 29.

When the bit depth division decoding process starts, the multiplexed structure analysis unit 554 analyzes the multiplexed structure and identifies the division positions in step S551. In step S552, the code stream separation unit 351 divides the multiplexed code stream into N based on the division positions identified in step S551.

In step S553, the decoding units 202 decode the divided code streams, respectively. In step S554, the zero coefficient generation unit 555 determines whether there is a zero coefficient image before the encoding process based on the division information.

When the zero coefficient generation unit 555 determines that the highest-order division position is not the highest-order bit and there is the zero coefficient image, the zero coefficient generation unit 555 allows the process to proceed to step S555 and generates the zero coefficient image with the high-order bits (zero bits) of the highest-order division position. When the zero coefficient generation unit 555 generates the zero coefficient image, the zero coefficient generation unit 555 allows the process to proceed to step S556.

On the other hand, when the zero coefficient generation unit 555 determines that the highest-order division position is the highest-order bit and there is no zero coefficient image in step S554, the zero coefficient generation unit 555 allows the process to proceed to step S556 without executing the process of step S555.

In step S556, the bit depth synthesis unit 553 synthesizes the respective image data in the bit depth direction and ends the bit depth division decoding process.

In this way, the decoding apparatus 550 can appropriately decode the code stream which is generated by the encoding apparatus 500 and is not subjected to the encoding process of the zero coefficient image. Accordingly, the decoding apparatus 550 can improve the encoding efficiency in the encoding process of the image.

When the encoding units 102 of the encoding apparatus 500 executes the encoding process in accordance with the JPEG 2000 scheme, the coefficient in which the values continuous from the highest-order bit are zero is set as the zero bit plane and the encoding process is not performed. Accordingly, even when all of the coefficients including the zero data are encoded, there is rarely a large overhead to complete the decoding process compared to a case where the decoding process is skipped.

8. Eighth Embodiment

[Configuration of Encoding Apparatus]

The case has hitherto been described in which all of the divided bit depth images are encoded, but the disclosure is not limited thereto. It may be selected whether each of the divided images is encoded.

For example, an image with the lower-order bits has a higher possibility of including a lot of noise and tends to be rarely improved in the encoding efficiency (that is, achieves less compression effect). Even when the image with low encoding efficiency is encoded, the processing load or the processing time may unnecessarily increase. Moreover, the amount of data may increase when the image is encoded in some cases.

Accordingly, by allowing the selection of whether each of the divided images is encoded, the unnecessary encoding process in which the effect is less may be skipped.

Figure 30:
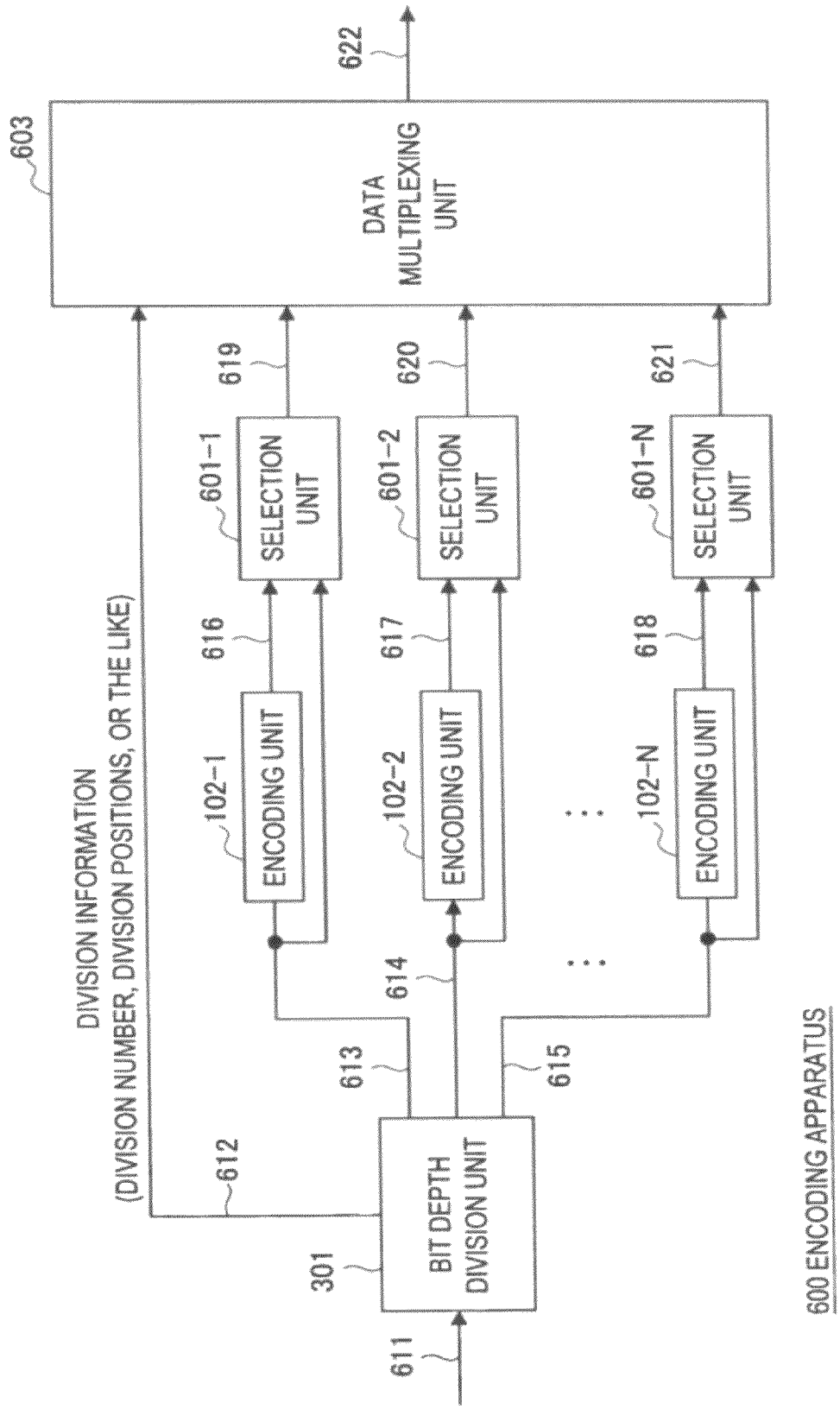
FIG. 30 is a block diagram illustrating an example of the main configuration of an encoding apparatus to which an embodiment of the disclosure is applied.

FIG. 30 is a block diagram illustrating an example of the main configuration of an encoding apparatus to which an embodiment of the disclosure is applied. An encoding apparatus 600 shown in FIG. 30 is basically the same encoding apparatus as the encoding apparatus 300 described with reference to FIG. 20, but includes selection units 601 that select one of data before and after the encoding process executed by the encoding units 102. The encoding apparatus 600 further includes a data multiplexing unit 603 instead of the code stream multiplexing unit 303.

When the bit depth division unit 301 divides an input image 611 into N images in the bit depth direction, the bit depth division unit 301 supplies division information 612 to the data multiplexing unit 603 and supplies the divided images to the corresponding encoding units 102 and the corresponding selection units 601.

For example, the bit depth division unit 301 supplies the first image 613 from the high-order side among the divided images of N systems to the encoding unit 102-1 and the selection unit 601-1 and supplies the second image 614 from the high-order side among the divided images to the encoding unit 102-2 and the selection unit 602-2. Further, the bit depth division unit 301 supplies the N-th image 615 from the high-order side to the encoding unit 102-N.

The encoding units 102 encode the supplied image data and supply the generated code streams (code streams 616 to 618) to the corresponding selection units 601 (selection units 601-1 to 601-N).

The selection units 601-1 to 601-N select one of the image data before the encoding process executed by the encoding units 102 and the code streams after the encoding process executed by the encoding units 102 and supply the selected image data or code streams to the data multiplexing unit 603. Hereinafter, when it is not necessary to distinguish the selection units 601-1 to 601-N from each other, the selection units 601-1 to 601-N are simply referred to as the selection units 601.

The selection units 601 compare the amounts of data before and after the encoding process to each other and select one of the data based on the comparison result. For example, when the data size of the code stream after the encoding process is equal to or greater than the data size of the image data before the encoding process, the selection unit 601 selects the image data before the encoding process.

On the other hand, for example, when the data size of the code stream after the encoding process is less than the data size of the image data before the encoding process, the selection unit 601 selects the code stream after the encoding process.

The data multiplexing unit 603 multiplexes the supplied data and outputs the multiplexed data as data of one system.

[Flow of Bit Depth Division Encoding Process]

Figure 31:
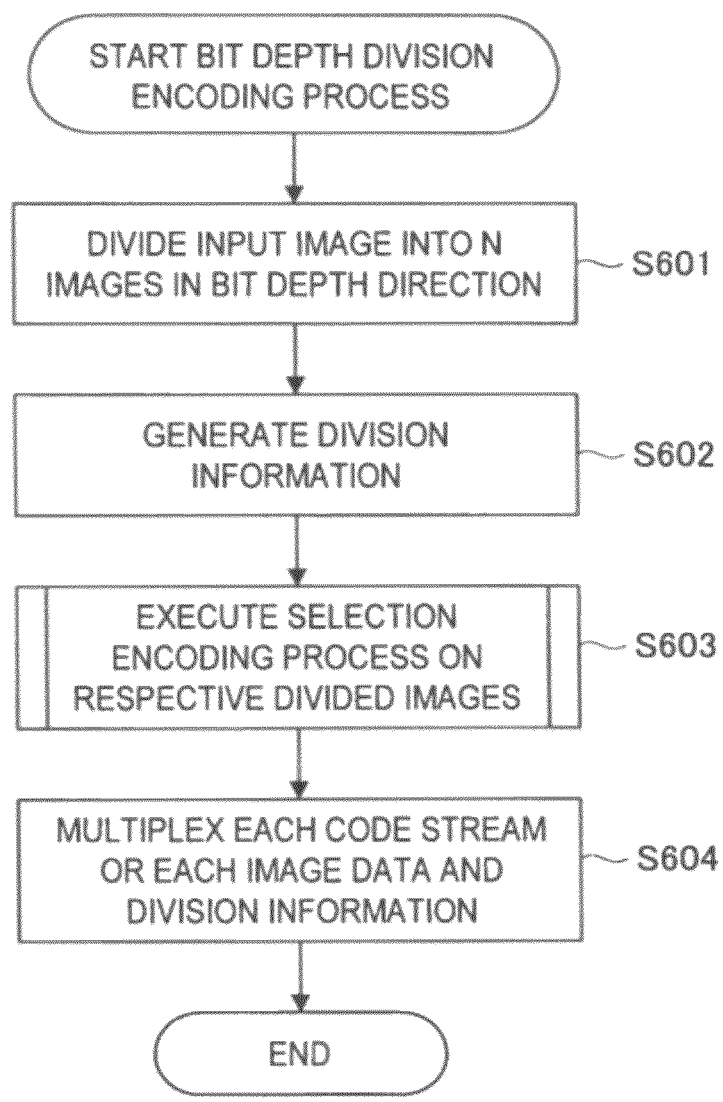
FIG. 31 is a flowchart illustrating an example of the flow of a bit depth division encoding process.

An example of the flow of this bit depth division encoding process will be described with reference to the flowchart of FIG. 31.

When the bit depth division encoding process starts, the bit depth division unit 301 divides the input image into N images in the bit depth direction in step S601 and generates the division information in step S602.

In step S603, the encoding units 102 encode the divided images and the selection units 601 execute the selection encoding process of selecting one of the image data before the encoding process and the code stream after the encoding process.

In step S604, the data multiplexing unit 603 multiplexes each code stream or each image data selected in the process of step S603 and the division information, and then the bit depth division encoding process ends.

[Flow of Selection Encoding Process]

Figure 32:
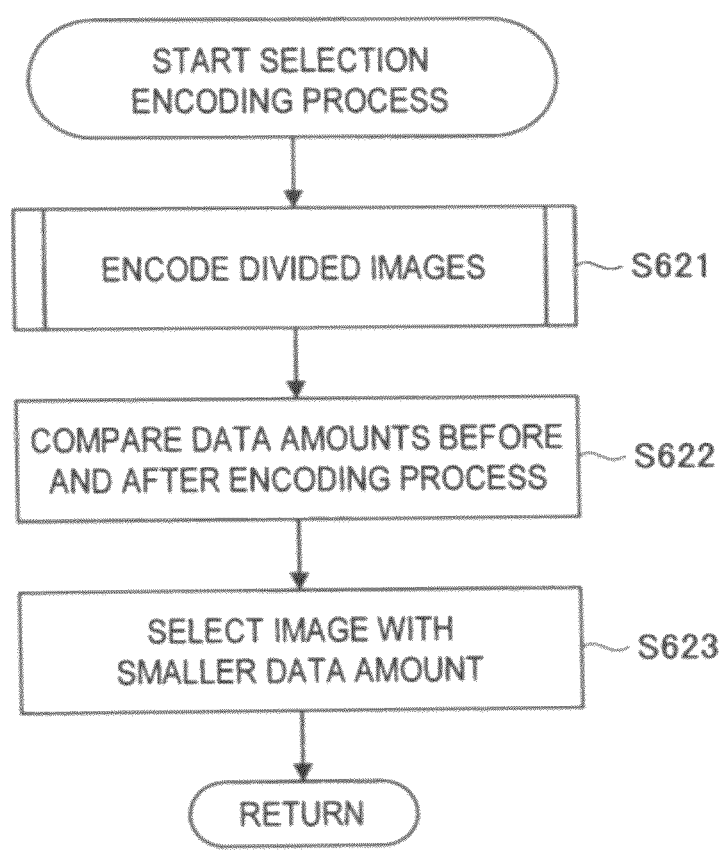
FIG. 32 is a flowchart illustrating an example of the flow of a selection encoding process.

Next, an example of the flow of the selection encoding process executed in step S603 of FIG. 31 will be described with reference to the flowchart of FIG. 32.

When the selection encoding process starts, the encoding units 102 encode the supplied divided images in step S621. The selection units 601 compare the amount of data before and after the encoding process to each other in step S622 and select the image with the smaller amount of data in step S623.

When the process of step S623 ends, the selection units 601 end the selection encoding process. Then, the process returns to step S603 of FIG. 31 to execute the processes subsequent to step S604.

In this way, since the encoding apparatus 600 does not perform the unnecessary encoding process in which the effect is less, it is possible to reduce the load of the encoding process. Moreover, it is possible to reduce the encoding amount of code stream depending on the images. That is, the encoding apparatus 600 can improve the encoding efficiency more easily.

9. Ninth Embodiment

[Configuration of Decoding Apparatus]

Figure 33:
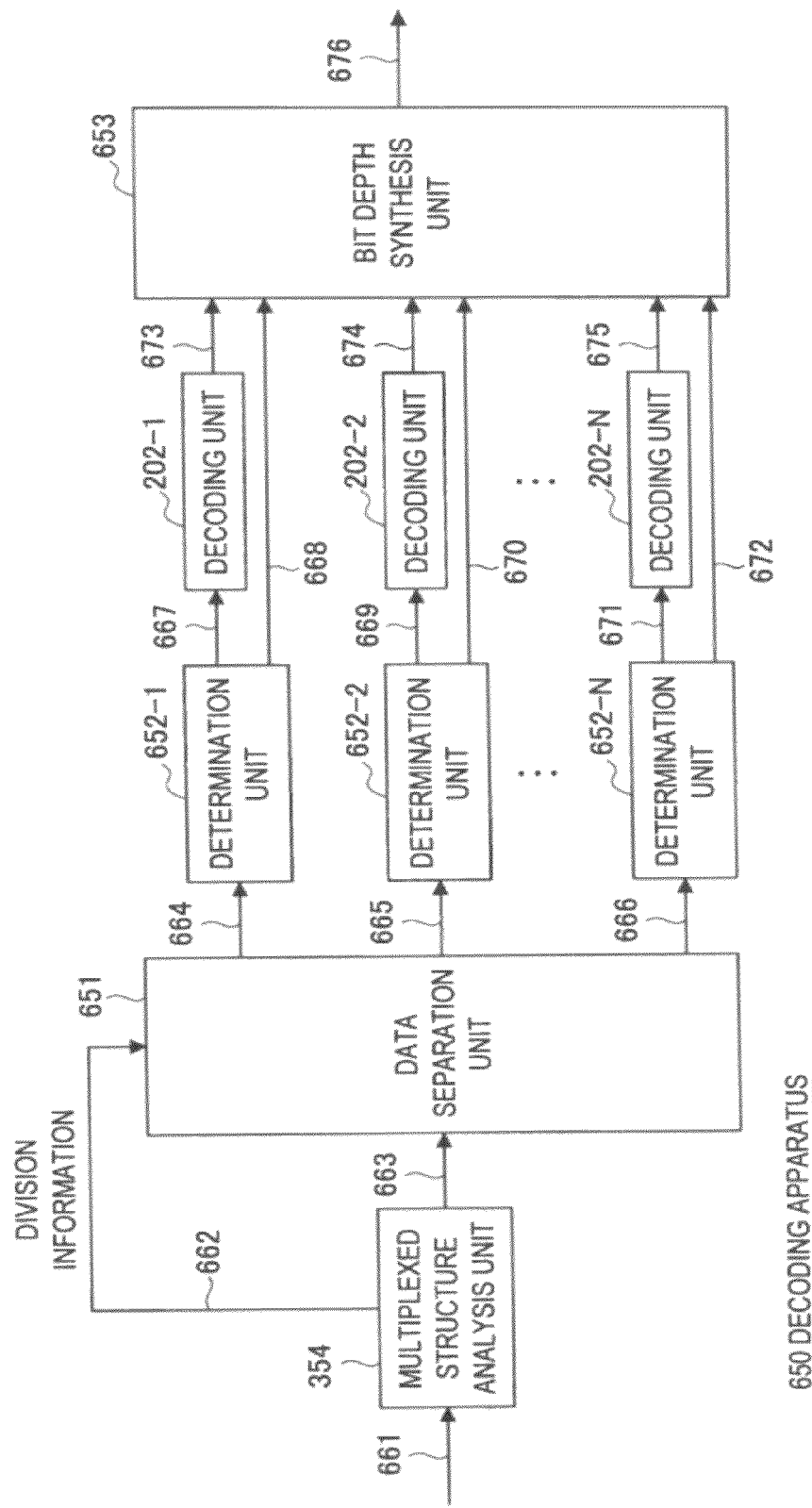
FIG. 33 is a block diagram illustrating an example of the main configuration of a decoding apparatus to which an embodiment of the disclosure is applied.

Next, a decoding apparatus corresponding to the encoding apparatus 600 will be described. FIG. 33 is a block diagram illustrating an example of the main configuration of the decoding apparatus to which an embodiment of the disclosure is applied. A decoding apparatus 650 shown in FIG. 33 corresponds to the encoding apparatus 600 and appropriately decodes the code stream generated by the encoding apparatus 600.

As shown in FIG. 33, the decoding apparatus 650 basically has the same configuration as that of the decoding apparatus 350 described with reference to FIG. 22 according to the fourth embodiment and executes the same processes.

However, the decoding apparatus 650 includes a data separation unit 651 instead of the code stream separation unit 351, a bit depth synthesis unit 653 instead of the bit depth synthesis unit 353, and determination units 652-1 to 652-N. Hereinafter, when it is not necessary to distinguish the determination unit 652-1 to 652-N from each other, the determination units 652-1 to 652-N are simply referred to as the determination units 652.

The data separation unit 651 separates data 663, from which division information 662 is extracted, from data 661 (code stream) supplied from the encoding apparatus 600 based on the division information 662 and generates a plurality (N systems) of data before the multiplexing process. The data separation unit 651 supplies the separated data (data 664 to data 666) to the corresponding determination units 652.

The determination units 652 each determine whether the supplied data (the data 664 to 666) are the encoded code streams or the image data not subjected to the encoding process. When the determination units 652 determine that the supplied data are the encoded code streams, the determination units 652 supply the encoded code streams 202 (code streams 667, 669, or 671) to the corresponding decoding units 202, respectively. On the other hand, when the determination units 652 determine that the supplied data are the image data not subjected to the encoding process, the determination units 652 supply the image data (image data 668, 670, and 672) to the bit depth synthesis unit 653, respectively.

The decoding units 202 decode the supplied code streams (the code streams 667, 669, and 671), respectively, and supply decoded images (decoded images 673, 674, and 675) to the bit depth synthesis unit 653, respectively.

The bit depth synthesis unit 653 synthesizes the various kinds of supplied data in the bit depth direction and outputs the synthesized data as data 676 of one system.

[Flow of Bit Depth Division Decoding Process]

Next, an example of the flow of the bit depth division decoding process will be described with reference to the flowchart of FIG. 34.

When the bit depth division decoding process starts, the multiplexed structure analysis unit 554 analyzes the multiplexed structure of the data 661 supplied from the encoding apparatus 600, extracts the division information 662, and identifies the division positions or the like in step S651. In step S652, the data separation unit 651 divides the data 663, from which the division information 662 is extracted, into N pieces of data based on the division information 662 extracted in step S651.

In step S653, the determination units 652 determine whether the divided data (the data 664 to 666) are the encoded code streams. Only when the determination units 652 determine that the data are the encoded code streams, the decoding units 202 execute a determination decoding process of decoding the code stream.

In step S654, the bit depth synthesis unit 653 synthesizes the image data obtained in the process of step S653 in the bit depth direction, generates a decoded image 676 of one system, and then ends the bit depth division decoding process.

[Flow of Determination Decoding Process]

Next, an example of the flow of the determination decoding process executed in step S653 of FIG. 34 will be described with reference to the flowchart of FIG. 35.

When the determination decoding process starts, the determination unit 652 determines whether the supplied data are encoded in step S671. When the determination unit 652 determines that the data are encoded, the process proceeds to step S672. In step S672, the decoding units 202 decode the divided code streams, and then, the determination decoding process ends.

On the other hand, when the determination unit 652 determines that the supplied data are not encoded in step S671, the determination unit 652 does not perform the process of step S672. Then, the determination decoding process ends.

Figure 34:
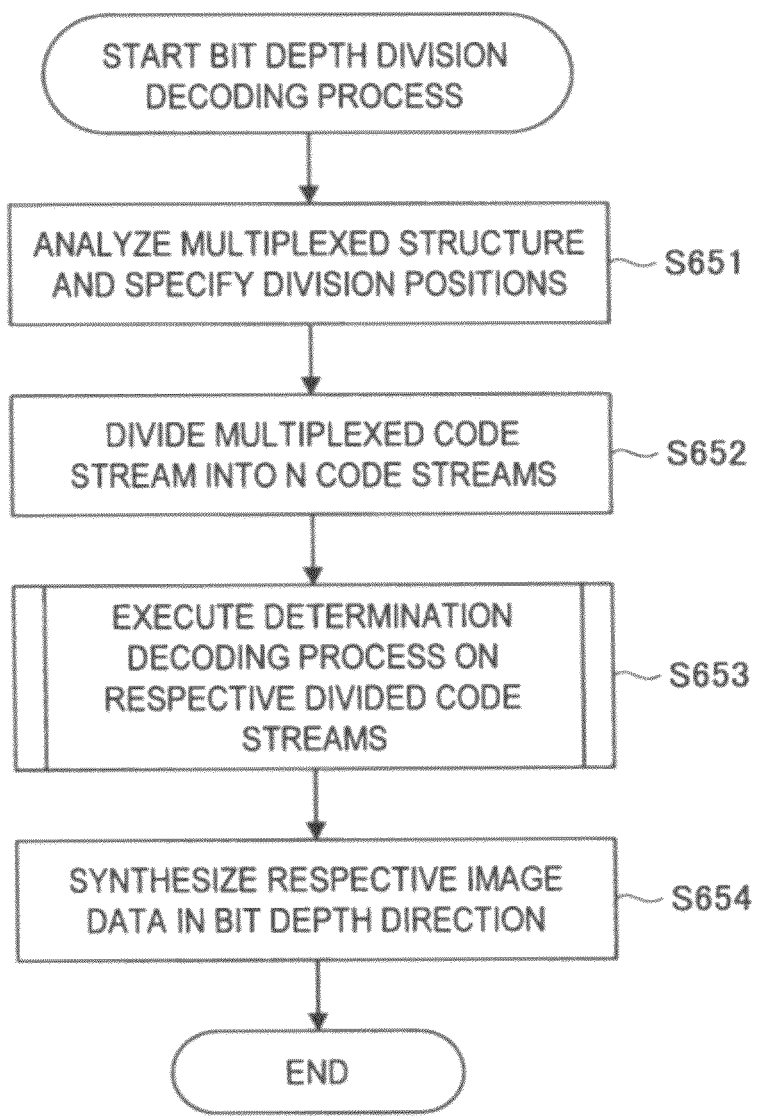
FIG. 34 is a flowchart illustrating an example of the flow of a bit depth division decoding process.
Figure 35:
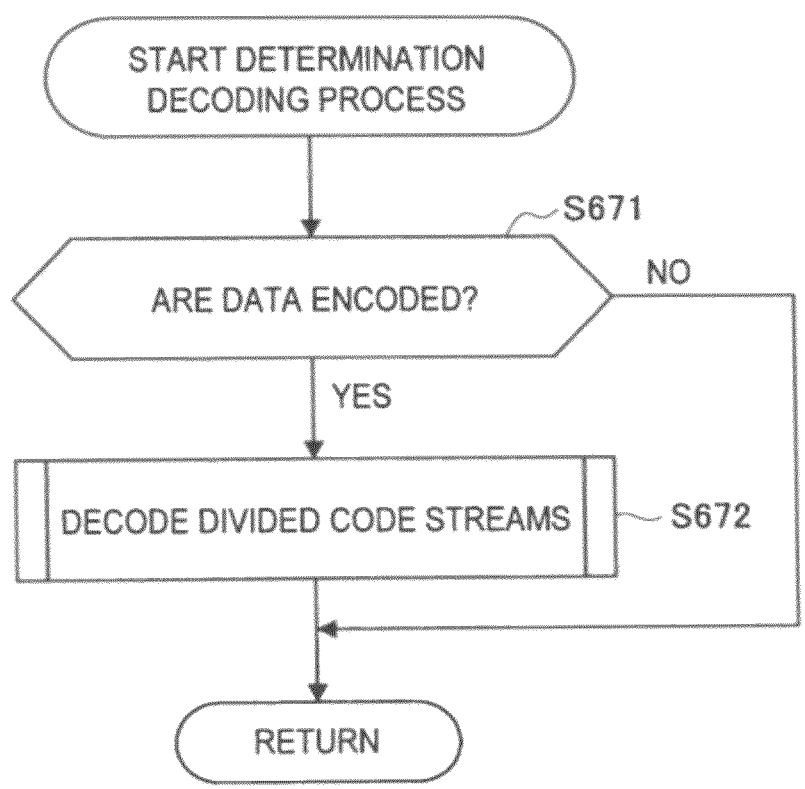
FIG. 35 is a flowchart illustrating an example of the flow of a determination decoding process.

When the determination decoding process ends, the determination unit 652 returns the process to step S653 of FIG. 34, and then the subsequent processes are repeated.

In this way, the decoding apparatus 650 can appropriately decode the data generated by the encoding apparatus 600. Accordingly, the decoding apparatus 650 can improve the encoding efficiency in the encoding process of the image more easily.

10. Tenth Embodiment

[Configuration of Encoding Apparatus]

The case has hitherto been described in which the encoding method is determined in advance in each encoding unit 102 and each encoding unit 102 includes one encoder (for example, the JPEG 2000 encoder), but the disclosure is not limited thereto. Instead, each encoding unit 102 may include a plurality of encoders of different encoding methods so that the encoding method to be used can be appropriately selected.

Currently, as the encoding method, there are various encoding methods. For example, JPEG-LS and LZ77 techniques are used as the Lossless compression method as well as the JPEG 2000. Further, for example, MPEG and JPEG techniques are used as the lossy compression methods. Since the respective encoding methods have different characteristics, the encoding process may be efficiently executed or may not be efficiently executed depending on an image to be encoded or various kinds of conditions such as encoding parameters.

The encoding apparatus may be configured to select the most efficient encoding method among the encoding methods for each of the divided images in order to execute the encoding process more efficiently.

Figure 36:
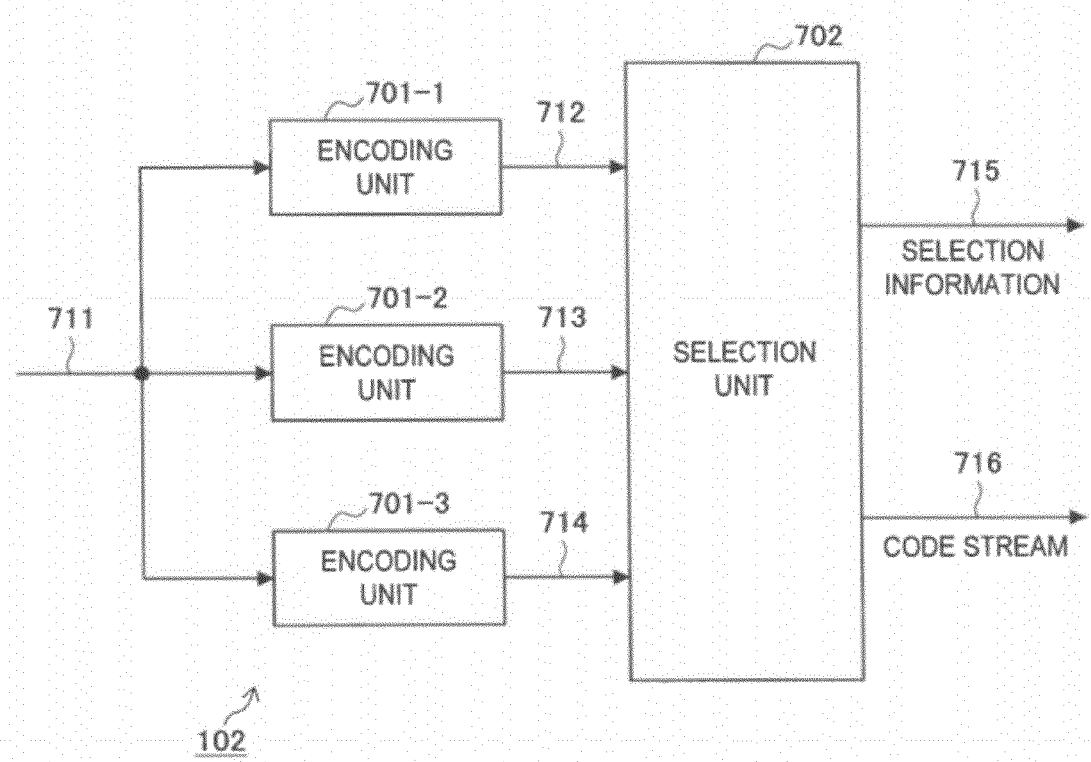
FIG. 36 is a block diagram illustrating an example of the main configuration of a JPEG 2000 encoding unit.

FIG. 36 is a block diagram illustrating an example of the main configuration of the encoding unit 102 of the encoding apparatus to which an embodiment of the disclosure is applied. As shown in FIG. 36, this encoding unit 102 includes encoding units 701-1 to 701-3 and a selection unit 702.

The encoding units 701-1 to 701-3 execute the encoding process in accordance with different encoding methods. The encoding units 701-1 to 701-3 encode the supplied image data 711 in accordance with the encoding methods, respectively, and supply the generated code streams (code streams 712 to 714) to the selection unit 702.

Hereinafter, when it is not necessary to distinguish the encoding units 701-1 to 701-3 from each other, the encoding units 701-1 to 701-3 are simply referred to as the encoding unit 701.

When the code streams are generated in accordance with three encoding methods, the selection unit 702 compares the data sizes of the three code streams to each other and selects the code stream with the smallest data size.

The selection unit 702 supplies the selected code stream 716 to the code stream multiplexing unit 103, the code stream multiplexing unit 303, or the selection unit 601. Further, the selection unit 702 supplies selection information 715, which indicates the used encoding method, together with the code stream to the code stream multiplexing unit 103, the code stream multiplexing unit 303, or the selection unit 601. The selection information 715 is multiplexed together with the code stream.

The number (number of prepared encoding methods) of encoding unit 701 is arbitrary. Two encoding methods or at least four encoding methods may be used. Further, the number of encoding unit 701 may be set independently for each encoding unit 102.

[Flow of Selection Encoding Process]

Figure 37:
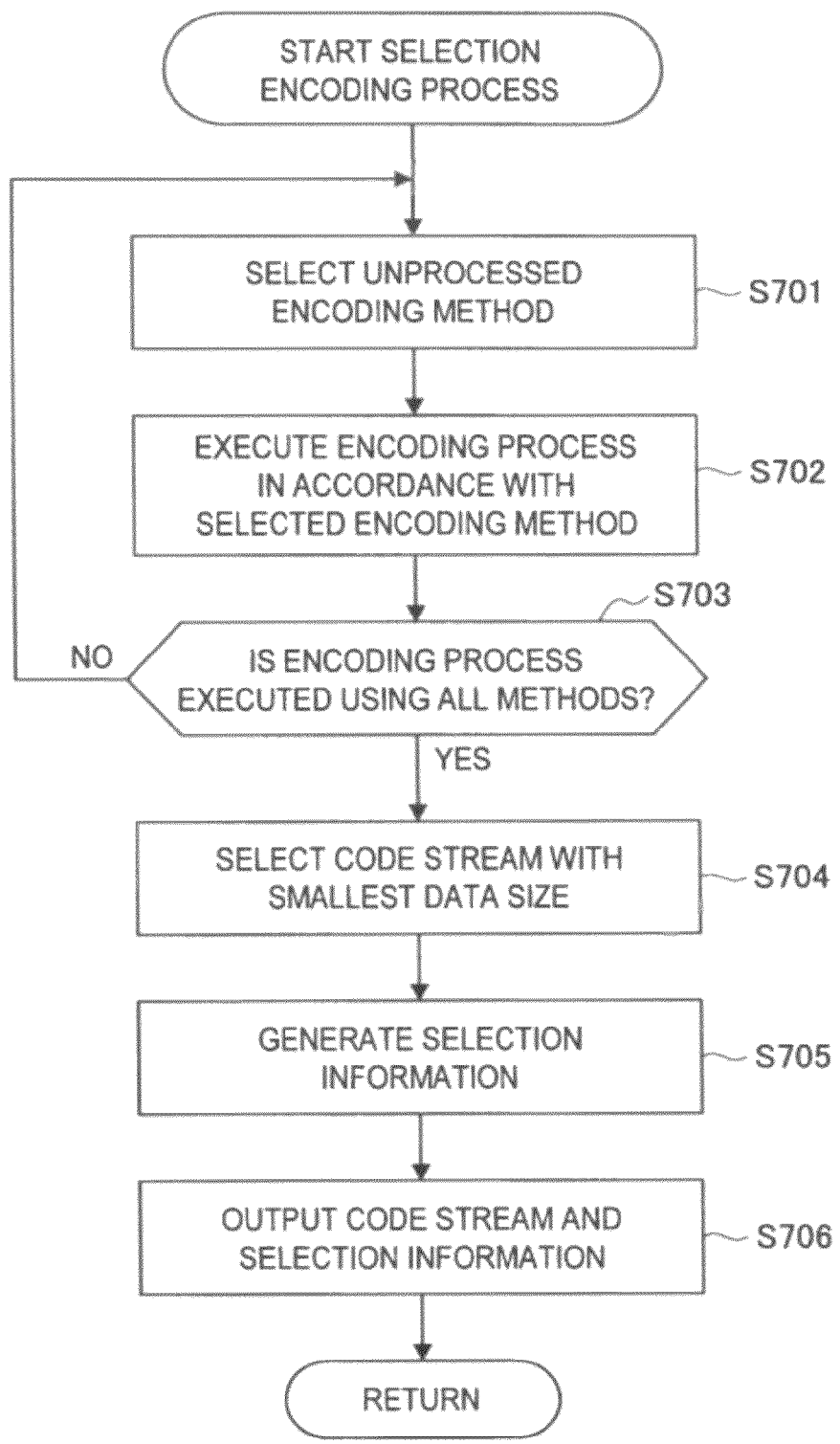
FIG. 37 is a flowchart illustrating an example of the flow of a selection encoding process.

An example of the flow of the selection encoding process executed by these encoding units 102 will be described with reference to the flowchart of FIG. 37.

When the selection encoding process starts, each of the encoding unit 701 selects an unprocessed encoding method among the prepared encoding methods in step S701. In step S702, the encoding unit 701 encodes the image data 711 in accordance with the selected encoding methods, respectively. In step S703, the encoding unit 701 determines whether the encoding process has been executed by using all of the prepared encoding methods. When it is determined that there is an unprocessed encoding method, the process returns to step S701 to repeat the subsequent processes.

In step S703, when it is determined that the encoding process is executed using all of the encoding methods, the encoding unit 701 allow the process to proceed to step S704.

In step S704, the selection unit 702 compares the data sizes of the generated code streams to each other and selects the code stream (encoding method) with the smallest data size. In step S705, the selection unit 702 generates the selection information. In step S706, the selection unit 702 outputs the code stream selected through the process of step S704 and the selection information generated through the process of step S705, and then the selection encoding process ends.

In this way, the encoding units 102 can execute the encoding process more efficiently. That is, when the above-described encoding apparatuses 100, 300, 400, 500, and 600 use such encoding units 102, the encoding process can be executed on various images or with various encoding conditions more efficiently.

11. Eleventh Embodiment

[Configuration of Decoding Apparatus]

Figure 38:
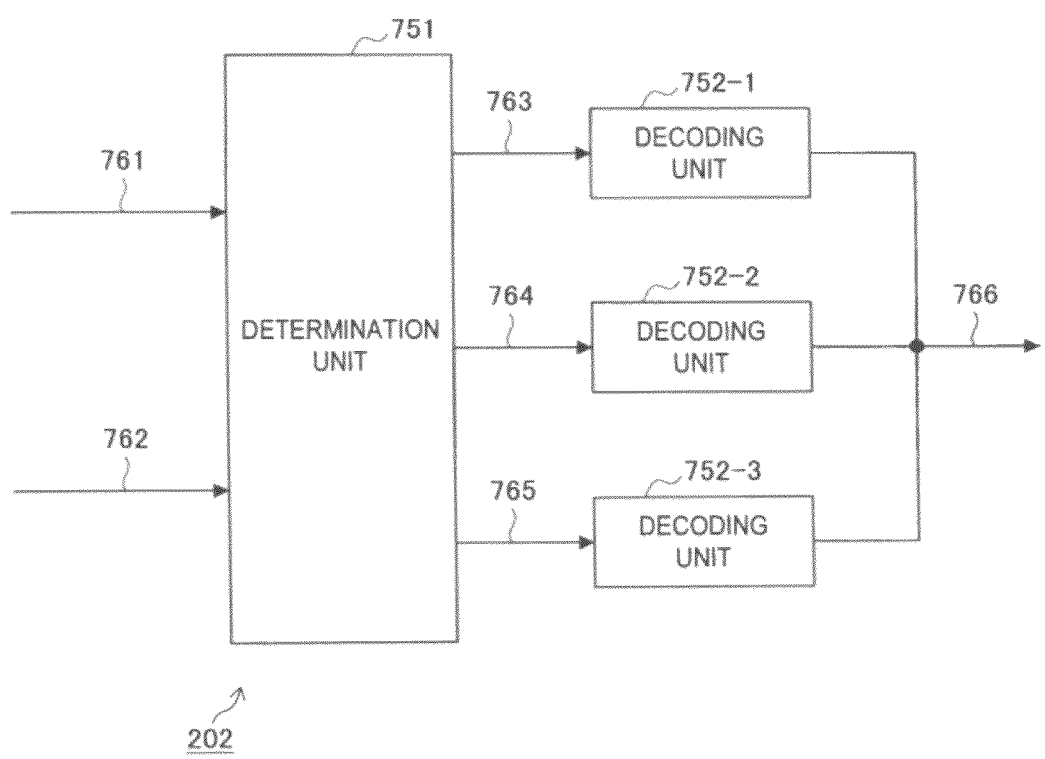
FIG. 38 is a block diagram illustrating an example of the main configuration of a JPEG 2000 decoding unit.

Next, the decoding unit 202 corresponding to the encoding unit 102 will be described. FIG. 38 is a block diagram illustrating an example of the main configuration of the decoding unit 202 of the decoding apparatus to which an embodiment of the disclosure is applied. The decoding unit 202 shown in FIG. 38 corresponds to the encoding unit 102 shown in FIG. 36 and appropriately decodes the code stream generated by the encoding unit 102 shown in FIG. 36.

As shown in FIG. 38, the decoding unit 202 includes a determination unit 751 and decoding units 752-1 to 752-3.

In this case, the above-described selection information is also multiplexed in the code stream supplied from the encoding apparatus. Accordingly, the code stream separation unit on the previous stage also extracts the selection information, when dividing the code stream. The determination unit 751 determines the encoding method for a supplied code stream 762 based on the selection information 761 supplied via the code stream separation unit.

The decoding units 752-1 to 752-3 decode the code streams in accordance with different decoding methods. Hereinafter, when it is not necessary to distinguish the decoding units 752-1 to 752-3 from each other, the decoding units 752-1 to 752-3 are simply referred to as the decoding unit 752.

When the determination unit 751 determines the encoding method of the supplied code stream 762, the determination unit 751 supplies this code stream to the decoding unit 752 using the decoding method corresponding to the encoding method among the decoding units 752-1 to 752-3 (code streams 763 or 765).

The decoding unit 752 supplied with the code stream decodes the supplied code stream and outputs a generated decoded image 766.

The number (number of prepared decoding methods) of decoding unit 752 is arbitrary. Two decoding methods or at least four decoding methods may be used. Further, the number of decoding unit 752 may be set independently for each decoding unit 202.

[Flow of Determination Decoding Process]

Next, an example of the flow of the determination decoding process executed by this decoding unit 202 will be described with reference to the flowchart of FIG. 39.

When the determination decoding process starts, the determination unit 751 determines the encoding method of the supplied code stream based on the selection information in step S751. In step S752, the decoding unit 752 decodes the code stream in accordance with the decoding method corresponding to the encoding method determined through the process of step S751, and then the determination decoding process ends.

In this way, the decoding unit 202 can decode the code stream encoded by the encoding unit 102 shown in FIG. 36 in accordance with the suitable decoding method. Further, the decoding unit 202 can easily determine the suitable decoding method based on the selection information supplied from the encoding unit 102.

That is, when the above-described decoding apparatuses 200, 350, 550, and 650 use such decoding units 202, the encoding efficiency can be improved for various images or various encoding conditions.

12. Twelfth Embodiment

[Personal Computer]

The above-described series of processes may be executed by hardware or software. In this case, for example, a personal computer shown in FIG. 40 may be configured.

In FIG. 40, a central processing unit (CPU) 801 of a personal computer 800 executes a program stored in a read-only memory (ROM) 802 or various kinds of processes according to a program loaded from a storage unit 813 to a random access memory (RAM) 803. The RAM 803 appropriately stores data or the like necessary for the CPU 801 to execute various kinds of processes.

The CPU 801, the ROM 802, and the RAM 803 are connected to each other via a bus 804. An input/output interface 810 is also connected to the bus 804.

An input unit 811 formed by a keyboard, a mouse, and the like, a display formed by a cathode ray tube (CRT), a liquid crystal display (LCD), or the like, an output unit 812 formed by a speaker or the like, a storage unit 813 formed by a solid state drive (SSD) such as a flash memory, a hard disk, or the like, and a communication unit 814 formed by an interface and a modem for a wired local area network (LAN), a wireless LAN, a modem, or the like are connected to the input/output interface 810. The communication unit 814 executes communication through a network including the Internet.

A drive 815 is connected to the input/output interface 810, as necessary, and a removable medium 821 such as a magnetic disc, an optical disc, a magneto-optical disc, or a semiconductor memory is appropriately mounted to the input/output interface 810, so that a computer program that is read therefrom is installed into the storage unit 813, as necessary.

When the above-described series of processes are executed by software, a program implementing the software is installed from a network or a recording medium.

For example, as shown in FIG. 40, the recording medium includes, independently from the apparatus main body, the removable medium 821, which is distributed to users to deliver a program and stores a program, and is formed by a magnetic disc (including a flexible disc), an optical disc (including a compact disc-read only memory (CD-ROM) and a digital versatile disc (DVD)), a magneto-optical disc (including a mini disc (MD)), a semiconductor memory, or the like. Moreover, the recording medium includes the ROM 802 storing a program and incorporated in advance in the apparatus main body so as to be delivered to users and a hard disc included in the storage unit 813.

A program executed by a computer may be a program executing the processes in time series in the sequence described in the specification, in parallel, or at timing necessary when called.

In the specification, steps of describing the program recorded in the recording medium may include processes executed in time series in the described sequence. Of course, the steps may include processes executed in parallel or individually, not necessarily in time series.

In the specification, the system indicates the entire apparatus including a plurality of devices (apparatuses).

The configuration described above as one apparatus (or processing unit) may be separated into a plurality of apparatuses (or processing units). On the contrary, the configurations described above as a plurality of apparatuses (or processing units) may be integrated into one apparatus (or processing unit). Configurations other than the above-described configuration may be added to the configuration of each apparatus (or processing unit). Moreover, when the configuration or operation of the entire system is substantially the same, a part of the configuration of an apparatus (or processing unit) may be included in the configuration of another apparatus (or another processing unit). That is, the embodiments of the disclosure are not limited to the above-described embodiments, but may be modified in various forms without departing from the scope of the disclosure.

The embodiments of the disclosure are applicable to an arbitrary apparatus or system including a 3D digital cinema editing apparatus, a 3D archive system, a 3D broadcast image transmission apparatus, a 3D image database, a 3D medical image recording system, 3D game console, a television receiver system, a 3D Blu-ray disc recorder or player, a free viewpoint television, a realistic-sensation TV conference system, an authoring tool on a PC or a software module thereof, and the like.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-199270 filed in the Japan Patent Office on Sep. 6, 2010, the entire content of which is hereby incorporated by reference.

What is claimed is:

1. An image processing apparatus comprising:
  circuitry configured to
    divide an image into a plurality of bit-depth-reduced images;
    generate division information indicating information regarding division of the image or synthesis of the plurality of bit-depth-reduced images;
    encode some or all of the plurality of bit-depth-reduced images; and
    output the division information and the encoded some or all of the plurality of bit-depth-reduced images.

2. The image processing apparatus according to claim 1, wherein
  the division information indicates at least a number of images divided and division positions indicating bit positions at which the image is divided.

3. The image processing apparatus according to claim 1, wherein
  the circuitry is configured to encode the some or all of the plurality of bit-depth-reduced images in accordance with encoding methods respectively set for the images.

4. The image processing apparatus according to claim 1, wherein
  the circuitry is configured to encode coefficient data acquired by executing, with a level number set in each image, a wavelet transform process on the some or all of the plurality of bit-depth-reduced images.

5. The image processing apparatus according to claim 1, wherein the circuitry is configured to:
  allocate a target bit rate to an encoding process of encoding the some or all of the plurality of bit-depth-reduced images; and
  execute rate control in the encoding process.

6. An image processing apparatus comprising:
  circuitry configured to
    divide an image into a plurality of images in a bit depth direction;
    encode some or all of the plurality of images acquired by dividing the image in the bit depth direction;

detect a non-zero coefficient boundary, which is a boundary between a bit with a zero value continuous from a highest-order bit and a bit with a non-zero value, in a bit depth of the image; and not encode an image that is formed by high-order bits of the non-zero boundary.

7. The image processing apparatus according to claim 1, wherein:

the circuitry is configured to determine whether each bit-depth-reduced image is encoded or not based depending on data sizes before and after the encoding for each of the bit-depth-reduced images.

8. The image processing apparatus according to claim 1, wherein the circuitry is configured to:

select an encoding method for encoding each of the bit-depth-reduced images.

9. The image processing apparatus according to claim 1, wherein the circuitry is further configured to:

multiplex code streams acquired by encoding the some or all of the plurality of bit-depth-reduced images.

10. An image processing method of an image processing apparatus comprising:

dividing, by circuitry, an image into a plurality of bit-depth-reduced images;

generating, by the circuitry, division information indicating information regarding division of the image or synthesis of the plurality of bit-depth-reduced images;

encoding, by the circuitry, some or all of the plurality of bit-depth-reduced images; and outputting, by the circuitry, the division information and the encoded some or all of the plurality of bit-depth-reduced images.

11. An image processing apparatus comprising:
circuitry configured to extract division information included in a code stream of one system, the division information indicating information regarding division of an image or synthesis of a plurality of bit-depth-reduced images generating by dividing the image;

separate a code stream of one system, which is formed by encoding the plurality of bit-depth-reduced images and multiplexing code streams of the encoded plurality of bit-depth-reduced images, for each code stream of each of the bit-depth-reduced images based on the extracted division information; and decode the separated code stream of each of the plurality of bit-depth-reduced images.

12. The image processing apparatus according to claim 11, wherein the circuitry is configured to:

analyze a structure of the code stream of one system; and separate the code stream of one system based on the analysis result.

13. The image processing apparatus according to claim 12, wherein the division information indicates at least a number of images divided and division positions indicating bit positions at which the images are divided, and the circuitry is configured to separate the code stream of one system based on the division information.

14. The image processing apparatus according to claim 11, wherein the code stream of each bit-depth-reduced image is encoded in accordance with an encoding method set for each image, and the circuitry is configured to decode the code stream of each bit-depth-reduced image in accordance with a decoding method corresponding to the encoding method.

15. The image processing apparatus according to claim 11, wherein in the code stream of each bit-depth-reduced image, coefficient data acquired through wavelet transform by a level number set for each bit-depth-reduced image is encoded, and the circuitry is configured to decode the code stream of each bit-depth-reduced image and execute reverse-wavelet transform by the level number set for each bit-depth-reduced image.

16. The image processing apparatus according to claim 11, wherein the circuitry is configured to:

generate a bit with a zero value which is deleted in the encoding of the code stream of each bit-depth-reduced image and is continuous from a highest-order bit in the bit depth of the bit-depth-reduced image.

17. The image processing apparatus according to claim 11, wherein the circuitry is configured to:

separates separate data of one system, which is formed by multiplexing data of the respective bit-depth-reduced images generated from the plurality of images acquired by dividing the same image, for the data of each image;

determine whether the data of the respective bit-depth-reduced images are encoded or not; and decode the data of the respective bit-depth-reduced images determined to be encoded.

18. The image processing apparatus according to claim 11, wherein the circuitry is configured to:

determine a decoding method of the code stream of each bit-depth-reduced image based on encoding method information indicating an encoding method of the code stream of each bit-depth-reduced image; and decode the code stream of each bit-depth-reduced image in accordance with the determined decoding method.

19. The image processing apparatus according to claim 11, wherein the circuitry is configured to:

synthesize the respective decoded bit-depth-reduced images in the bit depth direction.

20. An image processing method of an image processing apparatus, comprising:

extracting, by circuitry of the image processing apparatus, division information included in a code stream of one system, the division information indicating information regarding division of an image or synthesis of a plurality of bit-depth-reduced images generating by dividing the image;

separating, by the circuitry, a code stream of one system, which is formed by encoding the plurality of bit-depth-reduced images and multiplexing code streams of the encoded plurality of bit-depth-reduced images, for each code stream of each of the bit-depth-reduced images based on the extracted division information; and decoding, by the circuitry, the separated code stream of each of the plurality of bit-depth-reduced images.

* * * * *